(12) United States Patent
Dellinger et al.

(10) Patent No.: US 12,477,061 B2
(45) Date of Patent: Nov. 18, 2025

(54) PROVIDING USER INTERFACES BASED ON USE CONTEXTS AND MANAGING PLAYBACK OF MEDIA

(71) Applicant: Apple Inc., Cupertino, CA (US)

(72) Inventors: Richard R. Dellinger, San Jose, CA (US); Andre M.J. Boule, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/510,050

(22) Filed: Nov. 15, 2023

(65) Prior Publication Data

US 2024/0089366 A1 Mar. 14, 2024

Related U.S. Application Data

(63) Continuation of application No. 16/533,540, filed on Aug. 6, 2019, now Pat. No. 11,863,700.

(60) Provisional application No. 62/844,111, filed on May 6, 2019.

(51) Int. Cl.
| | |
|---|---|
| H04M 1/72469 | (2021.01) |
| B60K 35/10 | (2024.01) |
| B60K 35/22 | (2024.01) |
| B60K 35/28 | (2024.01) |
| H04M 1/72451 | (2021.01) |
| H04M 1/72454 | (2021.01) |

(52) U.S. Cl.
CPC ......... *H04M 1/72469* (2021.01); *B60K 35/10* (2024.01); *B60K 35/22* (2024.01); *B60K 35/28* (2024.01); *H04M 1/72451* (2021.01); *H04M 1/72454* (2021.01)

(58) Field of Classification Search
CPC ......... H04M 1/72469; H04M 1/72451; H04M 1/72454; B60K 35/00; B60K 35/28; B60K 35/10; B60K 35/22
See application file for complete search history.

(56) References Cited

U.S. PATENT DOCUMENTS

| | | |
|---|---|---|
| 5,864,337 A | 1/1999 | Marvin |
| 5,874,905 A | 2/1999 | Nanba et al. |
| 6,097,371 A | 8/2000 | Siddiqui et al. |
| 6,199,012 B1 | 3/2001 | Hasegawa |

(Continued)

FOREIGN PATENT DOCUMENTS

| | | |
|---|---|---|
| CN | 1782685 A | 6/2006 |
| CN | 1786906 A | 6/2006 |

(Continued)

OTHER PUBLICATIONS

Office Action received for Chinese Patent Application No. 202111392782.4, mailed on Mar. 28, 2024, 15 pages (8 pages of English Translation and 7 pages of Official Copy).

(Continued)

*Primary Examiner* — Jeremy L Stanley
(74) *Attorney, Agent, or Firm* — DLA Piper LLP (US)

(57) ABSTRACT

The present disclosure generally relates to providing user interfaces based on one or more use contexts and using a receiving device as a hub between the transmitting device and an accessory, where the receiving device establishes a secure connection with the transmitting device and the accessory and provides identifying information to the transmitting device that is typically associated with the accessory.

24 Claims, 49 Drawing Sheets

(56) References Cited

U.S. PATENT DOCUMENTS

| | | |
|---|---|---|
| 6,256,577 B1 | 7/2001 | Graunke |
| 6,416,471 B1 | 7/2002 | Kumar et al. |
| 6,693,523 B1 | 2/2004 | Abel et al. |
| 6,847,387 B2 | 1/2005 | Roth |
| 7,406,666 B2 | 7/2008 | Davis et al. |
| 8,105,208 B2 | 1/2012 | Oleson et al. |
| 8,467,770 B1 | 6/2013 | Ben |
| 8,627,385 B2 * | 1/2014 | Davies ............ H04N 21/42204 725/74 |
| 8,819,745 B2 * | 8/2014 | Sizelove ......... H04N 21/41422 725/77 |
| 8,825,445 B2 | 9/2014 | Hoffman et al. |
| 9,152,312 B1 | 10/2015 | Terleski et al. |
| 9,164,663 B1 | 10/2015 | Berard |
| 9,389,090 B1 | 7/2016 | Levine et al. |
| 9,508,194 B1 * | 11/2016 | Worley, III ........... G06F 3/0304 |
| 9,580,073 B1 | 2/2017 | Nehmad et al. |
| 9,800,525 B1 | 10/2017 | Lerner et al. |
| 10,019,136 B1 | 7/2018 | Ozog |
| 10,251,034 B2 | 4/2019 | Langlois et al. |
| 10,282,451 B1 | 5/2019 | Ho et al. |
| 10,425,284 B2 | 9/2019 | Dellinger et al. |
| 10,684,972 B2 * | 6/2020 | Renard .................. H04L 12/12 |
| 11,178,522 B2 * | 11/2021 | Kim ...................... H04W 76/11 |
| 11,312,207 B1 | 4/2022 | Sanders et al. |
| 11,470,375 B2 * | 10/2022 | Lee .................. H04N 21/43615 |
| 11,489,726 B2 | 11/2022 | Ichieda et al. |
| 11,511,756 B2 | 11/2022 | Brown et al. |
| 11,656,586 B1 | 5/2023 | Puskarich |
| 11,678,386 B2 | 6/2023 | Ichieda et al. |
| 2002/0087262 A1 | 7/2002 | Bullock et al. |
| 2003/0001898 A1 | 1/2003 | Bernhardson |
| 2003/0093419 A1 | 5/2003 | Bangalore et al. |
| 2003/0169302 A1 | 9/2003 | Davidsson et al. |
| 2003/0182628 A1 | 9/2003 | Lira |
| 2004/0077462 A1 | 4/2004 | Brown et al. |
| 2004/0246607 A1 | 12/2004 | Watson et al. |
| 2005/0015803 A1 | 1/2005 | Macrae et al. |
| 2005/0197063 A1 | 9/2005 | White et al. |
| 2006/0025923 A1 | 2/2006 | Dotan et al. |
| 2006/0122748 A1 | 6/2006 | Nou |
| 2006/0123353 A1 | 6/2006 | Matthews et al. |
| 2006/0271605 A1 | 11/2006 | Petruzzo |
| 2007/0004387 A1 * | 1/2007 | Gadamsetty ....... H04N 21/4126 455/414.1 |
| 2007/0188409 A1 | 8/2007 | Repetto et al. |
| 2007/0233369 A1 | 10/2007 | Ng et al. |
| 2008/0016443 A1 | 1/2008 | Hiroshima et al. |
| 2008/0027586 A1 | 1/2008 | Hern et al. |
| 2008/0076637 A1 | 3/2008 | Gilley et al. |
| 2008/0183909 A1 | 7/2008 | Lim et al. |
| 2008/0211652 A1 | 9/2008 | Cope et al. |
| 2008/0250408 A1 * | 10/2008 | Tsui ........................ H02J 7/32 718/100 |
| 2009/0005080 A1 | 1/2009 | Forstall et al. |
| 2009/0006994 A1 | 1/2009 | Forstall et al. |
| 2009/0027495 A1 | 1/2009 | Oskin et al. |
| 2009/0089689 A1 | 4/2009 | Clark et al. |
| 2009/0144639 A1 | 6/2009 | Nims et al. |
| 2009/0178008 A1 | 7/2009 | Herz et al. |
| 2009/0192702 A1 | 7/2009 | Bourne |
| 2009/0216556 A1 | 8/2009 | Martin et al. |
| 2009/0262088 A1 | 10/2009 | Moll-Carrillo et al. |
| 2009/0267753 A1 | 10/2009 | Kim |
| 2010/0019990 A1 | 1/2010 | Lee |
| 2010/0048358 A1 | 2/2010 | Tchao et al. |
| 2010/0054519 A1 | 3/2010 | Mulvey et al. |
| 2010/0131190 A1 | 5/2010 | Terauchi et al. |
| 2010/0151908 A1 | 6/2010 | Skarby et al. |
| 2010/0151918 A1 | 6/2010 | Annambhotla et al. |
| 2010/0185446 A1 | 7/2010 | Homma et al. |
| 2010/0194692 A1 | 8/2010 | Orr et al. |
| 2010/0198453 A1 | 8/2010 | Dorogusker et al. |
| 2010/0211685 A1 | 8/2010 | Mcdowall et al. |
| 2010/0223563 A1 | 9/2010 | Green |
| 2010/0225962 A1 | 9/2010 | Okigami et al. |
| 2010/0281374 A1 | 11/2010 | Schulz et al. |
| 2010/0291950 A1 | 11/2010 | Lin et al. |
| 2010/0292600 A1 | 11/2010 | Dibenedetto et al. |
| 2010/0295795 A1 | 11/2010 | Wilairat |
| 2010/0332497 A1 | 12/2010 | Valliani et al. |
| 2011/0003665 A1 | 1/2011 | Burton et al. |
| 2011/0040657 A1 | 2/2011 | Roswell |
| 2011/0061010 A1 | 3/2011 | Wasko et al. |
| 2011/0074699 A1 | 3/2011 | Marr et al. |
| 2011/0082620 A1 | 4/2011 | Small et al. |
| 2011/0093728 A1 | 4/2011 | Das |
| 2011/0098928 A1 | 4/2011 | Hoffman et al. |
| 2011/0106954 A1 | 5/2011 | Chatterjee et al. |
| 2011/0126116 A1 * | 5/2011 | Lee ...................... H04N 21/485 715/739 |
| 2011/0166777 A1 | 7/2011 | Chavakula |
| 2011/0167058 A1 | 7/2011 | Van Os |
| 2011/0167369 A1 | 7/2011 | Van |
| 2011/0177845 A1 | 7/2011 | Fasold |
| 2011/0225549 A1 | 9/2011 | Kim |
| 2011/0227872 A1 | 9/2011 | Huska et al. |
| 2011/0309924 A1 | 12/2011 | Dybalski et al. |
| 2012/0015779 A1 | 1/2012 | Powch et al. |
| 2012/0035924 A1 | 2/2012 | Jitkoff et al. |
| 2012/0036460 A1 | 2/2012 | Cieplinski et al. |
| 2012/0059664 A1 | 3/2012 | Georgiev et al. |
| 2012/0060092 A1 | 3/2012 | Hill et al. |
| 2012/0066630 A1 | 3/2012 | Kim et al. |
| 2012/0071770 A1 | 3/2012 | Grey et al. |
| 2012/0077586 A1 * | 3/2012 | Pishevar .................. A63F 13/26 463/31 |
| 2012/0079080 A1 * | 3/2012 | Pishevar ............... A63F 13/332 709/220 |
| 2012/0079122 A1 | 3/2012 | Brown et al. |
| 2012/0083258 A1 | 4/2012 | Rabii et al. |
| 2012/0092383 A1 | 4/2012 | Hysek et al. |
| 2012/0116669 A1 | 5/2012 | Lee et al. |
| 2012/0151331 A1 | 6/2012 | Pallakoff et al. |
| 2012/0169608 A1 | 7/2012 | Forutanpour et al. |
| 2012/0169617 A1 | 7/2012 | Mäenpää |
| 2012/0173622 A1 * | 7/2012 | Toledano .............. H04L 65/611 709/204 |
| 2012/0216146 A1 | 8/2012 | Korkonen |
| 2012/0245944 A1 | 9/2012 | Gruber et al. |
| 2012/0254263 A1 | 10/2012 | Hiestermann et al. |
| 2012/0290109 A1 | 11/2012 | Engelberg et al. |
| 2012/0303268 A1 | 11/2012 | Su et al. |
| 2013/0093715 A1 | 4/2013 | Marsden et al. |
| 2013/0137073 A1 | 5/2013 | Nacey et al. |
| 2013/0141331 A1 * | 6/2013 | Shiu ...................... G06F 3/1454 345/158 |
| 2013/0142495 A1 | 6/2013 | Terai |
| 2013/0179784 A1 | 7/2013 | Bang |
| 2013/0197679 A1 | 8/2013 | Balakrishnan et al. |
| 2013/0209972 A1 | 8/2013 | Carter et al. |
| 2013/0253980 A1 | 9/2013 | Blom et al. |
| 2013/0295961 A1 | 11/2013 | Lehtiniemi et al. |
| 2013/0304276 A1 | 11/2013 | Flies |
| 2013/0321340 A1 | 12/2013 | Seo et al. |
| 2013/0322665 A1 | 12/2013 | Bennett et al. |
| 2013/0332113 A1 | 12/2013 | Piemonte et al. |
| 2013/0344905 A1 | 12/2013 | Kim et al. |
| 2013/0345961 A1 | 12/2013 | Leader et al. |
| 2013/0345971 A1 | 12/2013 | Stamm et al. |
| 2013/0345975 A1 | 12/2013 | Vulcano et al. |
| 2013/0345978 A1 | 12/2013 | Lush et al. |
| 2013/0346408 A1 | 12/2013 | Duarte et al. |
| 2014/0006769 A1 | 1/2014 | Chory et al. |
| 2014/0011481 A1 | 1/2014 | Kho |
| 2014/0013014 A1 * | 1/2014 | Huang .................. G06F 1/1632 710/19 |
| 2014/0019522 A1 | 1/2014 | Weng et al. |
| 2014/0026088 A1 | 1/2014 | Monte |
| 2014/0059125 A1 | 2/2014 | Hillier |
| 2014/0068520 A1 | 3/2014 | Missig et al. |
| 2014/0075234 A1 | 3/2014 | Stekkelpak et al. |
| 2014/0082383 A1 | 3/2014 | De Cesare et al. |
| 2014/0082384 A1 | 3/2014 | De Cesare et al. |

(56) References Cited

U.S. PATENT DOCUMENTS

| | | |
|---|---|---|
| 2014/0108978 A1 | 4/2014 | Yu et al. |
| 2014/0128021 A1 | 5/2014 | Walker et al. |
| 2014/0152235 A1* | 6/2014 | Huang .................. G06F 1/1632 320/107 |
| 2014/0153557 A1* | 6/2014 | Kim ..................... H04W 76/14 370/338 |
| 2014/0167986 A1 | 6/2014 | Parada et al. |
| 2014/0176475 A1 | 6/2014 | Myers et al. |
| 2014/0181558 A1 | 6/2014 | Taha et al. |
| 2014/0189584 A1 | 7/2014 | Weng et al. |
| 2014/0195826 A1 | 7/2014 | Wojcik et al. |
| 2014/0195972 A1 | 7/2014 | Lee et al. |
| 2014/0196112 A1* | 7/2014 | Huang .................. H04W 12/06 726/3 |
| 2014/0208250 A1 | 7/2014 | Ording et al. |
| 2014/0236459 A1 | 8/2014 | Boesch et al. |
| 2014/0240122 A1 | 8/2014 | Roberts et al. |
| 2014/0277843 A1 | 9/2014 | Langlois et al. |
| 2014/0278028 A1 | 9/2014 | Nye et al. |
| 2014/0278051 A1 | 9/2014 | Mcgavran et al. |
| 2014/0280580 A1 | 9/2014 | Langlois et al. |
| 2014/0281957 A1 | 9/2014 | Weng et al. |
| 2014/0298266 A1 | 10/2014 | Lapp |
| 2014/0304635 A1 | 10/2014 | Kristinsson et al. |
| 2014/0317555 A1 | 10/2014 | Choi et al. |
| 2014/0330951 A1 | 11/2014 | Sukoff et al. |
| 2014/0336931 A1 | 11/2014 | Wilkins |
| 2014/0337450 A1 | 11/2014 | Choudhary et al. |
| 2014/0362056 A1 | 12/2014 | Zambetti et al. |
| 2014/0365126 A1 | 12/2014 | Vulcano et al. |
| 2014/0373123 A1* | 12/2014 | Kang ..................... H04L 41/22 715/736 |
| 2015/0057945 A1 | 2/2015 | White et al. |
| 2015/0067513 A1 | 3/2015 | Zambetti et al. |
| 2015/0070362 A1 | 3/2015 | Hirai |
| 2015/0098309 A1 | 4/2015 | Adams et al. |
| 2015/0100982 A1 | 4/2015 | Sirpal et al. |
| 2015/0112990 A1 | 4/2015 | Van Os et al. |
| 2015/0130830 A1 | 5/2015 | Nagasaki et al. |
| 2015/0169477 A1* | 6/2015 | Beel .................... H04L 12/1813 710/10 |
| 2015/0217163 A1 | 8/2015 | Amis et al. |
| 2015/0241920 A1* | 8/2015 | Kakani ................... H04W 4/80 710/303 |
| 2015/0244805 A1 | 8/2015 | Hampiholi et al. |
| 2015/0250021 A1* | 9/2015 | Stice ...................... H04W 8/20 710/16 |
| 2015/0254041 A1 | 9/2015 | Hoshihara et al. |
| 2015/0269848 A1 | 9/2015 | Yuen et al. |
| 2015/0295901 A1 | 10/2015 | Woodward et al. |
| 2015/0324751 A1 | 11/2015 | Orenstein et al. |
| 2015/0351004 A1* | 12/2015 | Ko ......................... H04W 4/80 455/434 |
| 2016/0012294 A1 | 1/2016 | Bouck |
| 2016/0040996 A1 | 2/2016 | Skillman et al. |
| 2016/0050280 A1* | 2/2016 | Ong ...................... H04W 76/12 709/201 |
| 2016/0058336 A1 | 3/2016 | Blahnik et al. |
| 2016/0061613 A1 | 3/2016 | Jung et al. |
| 2016/0061623 A1 | 3/2016 | Pahwa et al. |
| 2016/0063748 A1 | 3/2016 | Kim et al. |
| 2016/0065505 A1 | 3/2016 | Iskander |
| 2016/0073437 A1* | 3/2016 | John ...................... H04W 76/14 455/420 |
| 2016/0081132 A1* | 3/2016 | Lee ....................... H04W 48/14 370/338 |
| 2016/0103970 A1 | 4/2016 | Liu et al. |
| 2016/0189444 A1 | 6/2016 | Madhok et al. |
| 2016/0196760 A1 | 7/2016 | Koo et al. |
| 2016/0205238 A1 | 7/2016 | Abramson et al. |
| 2016/0210568 A1 | 7/2016 | Krupa et al. |
| 2016/0224211 A1 | 8/2016 | Xu et al. |
| 2016/0226713 A1* | 8/2016 | Dellinger ................ H04W 4/80 |
| 2016/0256741 A1 | 9/2016 | Holma et al. |
| 2016/0270717 A1 | 9/2016 | Luna et al. |
| 2016/0366206 A1* | 12/2016 | Shemer ................... H04L 67/10 |
| 2016/0370879 A1 | 12/2016 | Sharma |
| 2016/0370984 A1 | 12/2016 | Kuhn et al. |
| 2017/0013408 A1 | 1/2017 | Grzywaczewski et al. |
| 2017/0019443 A1* | 1/2017 | Conan ................ H04N 21/6181 |
| 2017/0041847 A1* | 2/2017 | Cho ....................... H04N 7/148 |
| 2017/0046957 A1 | 2/2017 | Jördens |
| 2017/0048373 A1* | 2/2017 | Dees .................. H04N 21/41407 |
| 2017/0087469 A1 | 3/2017 | Hardee et al. |
| 2017/0169185 A1 | 6/2017 | Weng |
| 2017/0180915 A1* | 6/2017 | Adhikari ................ H04W 4/80 |
| 2017/0187773 A1* | 6/2017 | Chowdhury .......... H04L 65/612 |
| 2017/0239524 A1 | 8/2017 | Lee et al. |
| 2017/0243508 A1 | 8/2017 | Cheng et al. |
| 2017/0262158 A1 | 9/2017 | Webb |
| 2017/0269792 A1 | 9/2017 | Xu et al. |
| 2017/0277396 A1 | 9/2017 | Chung et al. |
| 2017/0281060 A1* | 10/2017 | Wedekind ............ A61B 5/4839 |
| 2017/0295260 A1* | 10/2017 | Pierce ................ G06F 16/24547 |
| 2017/0336920 A1 | 11/2017 | Chan et al. |
| 2017/0337027 A1 | 11/2017 | Chan et al. |
| 2017/0344329 A1 | 11/2017 | Oh et al. |
| 2017/0353815 A1 | 12/2017 | Jagannathan et al. |
| 2017/0354845 A1 | 12/2017 | Williams et al. |
| 2017/0357411 A1 | 12/2017 | Williams et al. |
| 2017/0357433 A1 | 12/2017 | Boule et al. |
| 2017/0357439 A1 | 12/2017 | Lemay et al. |
| 2018/0001767 A1 | 1/2018 | Hall |
| 2018/0004540 A1* | 1/2018 | Edmonds .............. G06F 9/4411 |
| 2018/0081515 A1 | 3/2018 | Block et al. |
| 2018/0108243 A1 | 4/2018 | Scherer |
| 2018/0160463 A1* | 6/2018 | Huttunen ................ G06F 3/023 |
| 2018/0164974 A1 | 6/2018 | Park |
| 2018/0184152 A1* | 6/2018 | Kirkpatrick ...... H04N 21/43637 |
| 2018/0192122 A1* | 7/2018 | Rajapakse ........ H04N 21/44227 |
| 2018/0225297 A1 | 8/2018 | Andrew et al. |
| 2018/0260092 A1* | 9/2018 | Alsante .................. G06F 3/041 |
| 2018/0287958 A1* | 10/2018 | Sukoff ............. H04N 21/43615 |
| 2018/0321843 A1 | 11/2018 | Giannotti et al. |
| 2018/0350144 A1 | 12/2018 | Rathod |
| 2018/0356243 A1 | 12/2018 | Mehta et al. |
| 2018/0364648 A1 | 12/2018 | Chi et al. |
| 2019/0003849 A1 | 1/2019 | Pahwa et al. |
| 2019/0026011 A1 | 1/2019 | Wang et al. |
| 2019/0114128 A1* | 4/2019 | Nagahara ................ H04W 4/80 |
| 2019/0191206 A1 | 6/2019 | Stachewicz et al. |
| 2019/0232110 A1 | 8/2019 | Williams et al. |
| 2019/0232111 A1 | 8/2019 | Williams et al. |
| 2019/0297478 A1 | 9/2019 | Langlois et al. |
| 2019/0298315 A1* | 10/2019 | Dickie ................ G06K 7/10237 |
| 2019/0334782 A1* | 10/2019 | Dellinger .......... H04W 52/0254 |
| 2019/0334927 A1 | 10/2019 | Rodden et al. |
| 2020/0073620 A1* | 3/2020 | Bai ........................ G06F 3/1454 |
| 2020/0120170 A1 | 4/2020 | Amitay et al. |
| 2020/0149921 A1 | 5/2020 | Hoffman et al. |
| 2020/0159894 A1 | 5/2020 | Keen et al. |
| 2020/0182643 A1 | 6/2020 | Ludwig |
| 2020/0272404 A1* | 8/2020 | Mu ....................... G06F 13/4282 |
| 2020/0358897 A1 | 11/2020 | Dellinger et al. |
| 2020/0371968 A1* | 11/2020 | Beel .................... G06F 13/102 |
| 2020/0394010 A1* | 12/2020 | Cooper ................. G09G 3/002 |
| 2021/0044853 A1* | 2/2021 | Alsante ............. H04N 21/4788 |
| 2021/0095987 A1 | 4/2021 | Pahwa et al. |
| 2021/0289067 A1 | 9/2021 | Dellinger et al. |
| 2022/0047918 A1 | 2/2022 | Williams et al. |
| 2023/0066552 A1 | 3/2023 | Van Os et al. |
| 2023/0366691 A1 | 11/2023 | Pahwa et al. |
| 2023/0391194 A1 | 12/2023 | Dellinger |
| 2024/0051391 A1 | 2/2024 | Crick et al. |
| 2024/0316404 A1 | 9/2024 | Williams et al. |
| 2025/0153004 A1 | 5/2025 | Williams et al. |
| 2025/0222766 A1 | 7/2025 | Crick et al. |

FOREIGN PATENT DOCUMENTS

| | | |
|---|---|---|
| CN | 101822020 A | 9/2010 |
| CN | 101827363 A | 9/2010 |
| CN | 101828411 A | 9/2010 |

(56) References Cited

FOREIGN PATENT DOCUMENTS

| | | | |
|---|---|---|---|
| CN | 101910992 | A | 12/2010 |
| CN | 101978374 | A | 2/2011 |
| CN | 102081502 | A | 6/2011 |
| CN | 102449560 | A | 5/2012 |
| CN | 102449561 | A | 5/2012 |
| CN | 102646081 | A | 8/2012 |
| CN | 102801649 | A | 11/2012 |
| CN | 102989159 | A | 3/2013 |
| CN | 103003668 | A | 3/2013 |
| CN | 103876721 | A | 6/2014 |
| CN | 104288983 | A | 1/2015 |
| CN | 104464010 | A | 3/2015 |
| CN | 104508426 | A | 4/2015 |
| CN | 104917794 | A | 9/2015 |
| CN | 105260078 | A | 1/2016 |
| CN | 109314735 | A | 2/2019 |
| CN | 110696587 | A | 1/2020 |
| DE | 102017112064 | A1 | 12/2018 |
| EP | 2341315 | A1 | 7/2011 |
| EP | 2407219 | A2 | 1/2012 |
| EP | 2672377 | A2 | 12/2013 |
| EP | 2993602 | A1 | 3/2016 |
| EP | 3409526 | A1 | 12/2018 |
| EP | 3828017 | A1 | 6/2021 |
| JP | 3830956 | B1 | 10/2006 |
| JP | 2009-50471 | A | 3/2009 |
| KR | 10-2012-0032596 | A | 4/2012 |
| WO | 03/093765 | A2 | 11/2003 |
| WO | 2004/047440 | A2 | 6/2004 |
| WO | 2007/100944 | A3 | 8/2008 |
| WO | 2010/129221 | A1 | 11/2010 |
| WO | 2012/127484 | A1 | 9/2012 |
| WO | 2015/183828 | A1 | 12/2015 |
| WO | 2016/126733 | A1 | 8/2016 |

OTHER PUBLICATIONS

Brief Communication Regarding Oral Proceedings received for European Patent Application No. 21165295.3, mailed on Feb. 27, 2024, 1 page.
International Search Report and Written Opinion received for PCT Patent Application No. PCT/US2023/030104, mailed on Nov. 24, 2023, 11 pages.
Notice of Allowance received for U.S. Appl. No. 15/411,110, mailed on Aug. 2, 2023, 2 pages.
Notice of Allowance received for U.S. Appl. No. 17/951,875, mailed on Oct. 20, 2023, 8 pages.
Summons to Attend Oral Proceedings received for European Patent Application No. 21165295.3, mailed on Jul. 25, 2023, 14 pages.
Supplemental Notice of Allowance received for U.S. Appl. No. 17/951,875, mailed on Aug. 25, 2023, 2 pages.
Office Action received for Australian Patent Application No. 2023214377, mailed on Jun. 5, 2024, 4 pages.
International Search Report and Written Opinion received for PCT Patent Application No. PCT/US2023/024293, mailed on Dec. 11, 2023, 21 pages.
Invitation to Pay Additional Fees and Partial International Search Report received for PCT Patent Application No. PCT/US2023/024293, mailed on Oct. 10, 2023, 13 pages.
Notice of Allowance received for U.S. Appl. No. 17/951,875, mailed on Dec. 26, 2023, 7 pages.
Advisory Action received for U.S. Appl. No. 15/411,110, mailed on Jun. 29, 2021, 4 pages.
Advisory Action received for U.S. Appl. No. 16/377,892, mailed on Apr. 9, 2021, 4 pages.
Advisory Action received for U.S. Appl. No. 16/378,136, mailed on Apr. 12, 2021, 4 pages.
Applicant-Initiated Interview Summary received for U.S. Appl. No. 15/411,110, mailed on Apr. 21, 2020, 5 pages.
Applicant-Initiated Interview Summary received for U.S. Appl. No. 15/411,110, mailed on May 3, 2023, 3 pages.
Applicant-Initiated Interview Summary received for U.S. Appl. No. 15/411,110, mailed on Nov. 17, 2020, 7 pages.
Applicant-Initiated Interview Summary received for U.S. Appl. No. 15/411,110, mailed on Oct. 28, 2019, 6 pages.
Applicant-Initiated Interview Summary received for U.S. Appl. No. 15/411,110, mailed on Oct. 31, 2022, 6 pages.
Applicant-Initiated Interview Summary received for U.S. Appl. No. 16/102,146, mailed on Aug. 31, 2020, 4 pages.
Applicant-Initiated Interview Summary received for U.S. Appl. No. 16/377,892, mailed on Mar. 26, 2021, 2 pages.
Applicant-Initiated Interview Summary received for U.S. Appl. No. 16/377,892, mailed on Oct. 13, 2020, 5 pages.
Applicant-Initiated Interview Summary received for U.S. Appl. No. 16/378,136, mailed on Mar. 26, 2021, 2 pages.
Applicant-Initiated Interview Summary received for U.S. Appl. No. 16/378,136, mailed on Oct. 13, 2020, 4 pages.
Applicant-Initiated Interview Summary received for U.S. Appl. No. 16/407,590, mailed on Jun. 5, 2020, 3 pages.
Applicant-Initiated Interview Summary received for U.S. Appl. No. 16/407,590, mailed on Nov. 17, 2020, 6 pages.
Applicant-Initiated Interview Summary received for U.S. Appl. No. 16/533,540, mailed on Apr. 19, 2023, 7 pages.
Applicant-Initiated Interview Summary received for U.S. Appl. No. 16/533,540, mailed on Aug. 16, 2021, 6 pages.
Applicant-Initiated Interview Summary received for U.S. Appl. No. 16/533,540, mailed on Aug. 25, 2022, 8 pages.
Applicant-Initiated Interview Summary received for U.S. Appl. No. 16/533,540, mailed on Dec. 21, 2020, 4 pages.
Applicant-Initiated Interview Summary received for U.S. Appl. No. 16/533,540, mailed on Feb. 28, 2022, 6 pages.
Applicant-Initiated Interview Summary received for U.S. Appl. No. 17/118,144, mailed on Feb. 3, 2023, 2 pages.
Applicant-Initiated Interview Summary received for U.S. Appl. No. 17/327,204, mailed on Jan. 25, 2022, 5 pages.
Applicant-Initiated Interview Summary received for U.S. Appl. No. 17/516,537, mailed on Jul. 5, 2022, 4 pages.
Applicant-Initiated Interview Summary received for U.S. Appl. No. 17/516,537, mailed on Nov. 22, 2022, 2 pages.
Applicant-Initiated Interview Summary received for U.S. Appl. No. 17/951,875, mailed on Feb. 28, 2023, 2 pages.
Applicant-Initiated Interview Summary received for U.S. Appl. No. 17/951,875, mailed on Jun. 27, 2023, 2 pages.
Cazlar, "[iOS] MapsGPS (formerly PebbGPS) is now available—now with colour turn-by-turn directions!", Online Available at <https://forums.pebble.com/t/ios-mapsgps-formerly-pebbgps-is-now-available-now-with-colour-turn-by-turn-directions/5584>, 2013, 31 pages.
Certificate of Examination received for Australian Patent Application No. 2018100158, mailed on Oct. 23, 2018, 2 pages.
Certificate of Examination received for Australian Patent Application No. 2018101855, mailed on Aug. 6, 2019, 2 pages.
Codrington Simon, "Intuitive Scrolling Interfaces with CSS Scroll Snap Points", Online Available at: https://www.sitepoint.com/intuitive-scrolling-interfaces-with-css-scroll-snap-points/, Dec. 8, 2015, 14 pages.
Corrected Notice of Allowance received for U.S. Appl. No. 14/836,754, mailed on May 23, 2018, 2 pages.
Corrected Notice of Allowance received for U.S. Appl. No. 16/377,892, mailed on Aug. 11, 2021, 3 pages.
Corrected Notice of Allowance received for U.S. Appl. No. 16/378,136, mailed on Aug. 11, 2021, 2 pages.
Corrected Notice of Allowance received for U.S. Appl. No. 16/378,136, mailed on Jun. 11, 2021, 2 pages.
Corrected Notice of Allowance received for U.S. Appl. No. 16/533,540, mailed on Aug. 18, 2023, 3 pages.
Decision to Grant received for Danish Patent Application No. PA201570665, mailed on Apr. 26, 2017, 2 pages.
Decision to Grant received for European Patent Application No. 16706081.3, mailed on Nov. 29, 2018, 2 pages.
Decision to Grant received for European Patent Application No. 18213157.3, mailed on Feb. 24, 2022, 2 pages.
Decision to Refuse received for European Patent Application No. 17810749.6, mailed on Jan. 29, 2021, 24 pages.

(56) References Cited

OTHER PUBLICATIONS

Easyvideoguides, "Mapquest", available on: https://www.youtube.com/watch?v=7sDIDNM2bCI, Dec. 26, 2007, 4 pages.
Ehowtech, "How to Get Written Directions on a Garmin: Using a Garmin", available online at: https://www.youtube.com/watch?v=s_EKT6qH4LI, Dec. 2, 2012, 1 page.
European Search Report received for European Patent Application No. 21165295.3, mailed on Jun. 18, 2021, 4 pages.
Examiner's Answer to Appeal Brief received for U.S. Appl. No. 15/411,110, mailed on Feb. 1, 2022, 9 pages.
Extended European Search Report received for European Patent Application No. 17813879.8, mailed on Jan. 8, 2020, 8 pages.
Extended European Search Report received for European Patent Application No. 18213157.3, mailed on Apr. 12, 2019, 8 pages.
Extended European Search Report received for European Patent Application No. 22150207.3, mailed on Apr. 11, 2022, 11 pages.
Final Office Action received for U.S. Appl. No. 14/836,754, mailed on Jun. 14, 2017, 23 pages.
Final Office Action received for U.S. Appl. No. 14/836,754, mailed on Mar. 22, 2016, 17 pages.
Final Office Action received for U.S. Appl. No. 14/836,754, mailed on Mar. 31, 2017, 24 pages.
Final Office Action received for U.S. Appl. No. 14/863,069, mailed on Jul. 5, 2018, 19 pages.
Final Office Action received for U.S. Appl. No. 15/411,110, mailed on Apr. 12, 2023, 27 pages.
Final Office Action received for U.S. Appl. No. 15/411,110, mailed on Mar. 5, 2020, 30 pages.
Final Office Action received for U.S. Appl. No. 15/411,110, mailed on Mar. 15, 2021, 28 pages.
Final Office Action received for U.S. Appl. No. 16/377,892, mailed on Jan. 28, 2021, 11 pages.
Final Office Action received for U.S. Appl. No. 16/378,136, mailed on Jan. 28, 2021, 9 pages.
Final Office Action received for U.S. Appl. No. 16/407,590, mailed on Aug. 25, 2020, 14 pages.
Final Office Action received for U.S. Appl. No. 16/533,540, mailed on Apr. 19, 2021, 38 pages.
Final Office Action received for U.S. Appl. No. 16/533,540, mailed on Jun. 15, 2022, 38 pages.
Final Office Action received for U.S. Appl. No. 17/516,537, mailed on Oct. 11, 2022, 9 pages.
Final Office Action received for U.S. Appl. No. 17/951,875, mailed on May 30, 2023, 12 pages.
Google, "How to create a "My Map" in Google Maps", Available Online at: https://www.youtube.com/watch?v=TftFnot5uXw, Dec. 8, 2008, 2 pages.
Haris, "Google Maps Navigation on Android 2.0", Sizzled Core, online available at <http://www.sizzledcore.com/2009/10/29/google-maps-navigation-on-android-20/>, Oct. 29, 2009, 6 pages.
Intention to Grant received for Danish Patent Application No. PA201570665, mailed on Feb. 28, 2017, 2 pages.
Intention to Grant received for European Patent Application No. 16706081.3, mailed on Jul. 18, 2018, 8 pages.
Intention to Grant received for European Patent Application No. 16706081.3, mailed on Jun. 11, 2018, 7 pages.
Intention to Grant received for European Patent Application No. 18213157.3, mailed on May 19, 2021, 8 pages.
Intention to Grant received for European Patent Application No. 18213157.3, mailed on Oct. 27, 2021, 8 pages.
International Preliminary Report on Patentability received for PCT Patent Application No. PCT/US2015/046892, mailed on Mar. 16, 2017, 14 pages.
International Preliminary Report on Patentability received for PCT Patent Application No. PCT/US2016/016216, mailed on May 4, 2017, 14 pages.
International Preliminary Report on Patentability received for PCT Patent Application No. PCT/US2017/035554, mailed on Dec. 20, 2018, 39 pages.
International Preliminary Report on Patentability received for PCT Patent Application No. PCT/US2017/037057, mailed on Dec. 27, 2018, 24 pages.
International Preliminary Report on Patentability received for PCT Patent Application No. PCT/US2020/031528, mailed on Nov. 18, 2021, 13 pages.
International Search Report and Written Opinion received for PCT Patent Application No. PCT/US2015/046892, mailed on Jan. 27, 2016, 20 pages.
International Search Report and Written Opinion received for PCT Patent Application No. PCT/US2016/016216, mailed on Jun. 27, 2016, 18 pages.
International Search Report and Written Opinion received for PCT Patent Application No. PCT/US2017/035554, mailed on Sep. 22, 2017, 42 pages.
International Search Report and Written Opinion received for PCT Patent Application No. PCT/US2017/037057, mailed on Aug. 29, 2017, 26 pages.
International Search Report and Written Opinion received for PCT Patent Application No. PCT/US2020/031528, mailed on Sep. 23, 2020, 18 pages.
Invitation to Pay Additional Fees received for PCT Patent Application No. PCT/US2015/046892, mailed on Nov. 4, 2015, 5 pages.
Invitation to Pay Additional Fees received for PCT Patent Application No. PCT/US2016/016216, mailed on Apr. 20, 2016, 6 pages.
Invitation to Pay Additional Fees received for PCT Patent Application No. PCT/US2017/035554, mailed on Jul. 20, 2017, 2 pages.
Invitation to Pay Additional Fees received for PCT Patent Application No. PCT/US2020/031528, mailed on Jul. 30, 2020, 11 pages.
Invitation to Restrict or Pay Additional Fees received for PCT Patent Application No. PCT/US2016/016216, mailed on Dec. 19, 2016, 9 pages.
Minutes of the Oral Proceedings received for European Patent Application No. 17810749.6, mailed on Jan. 26, 2021, 8 pages.
Mugs, Online Available at: https://web.archive.org/web/20151029034349/http://le-mugs.com/, Oct. 29, 2015, 14 pages.
Non-Final Office Action received for U.S. Appl. No. 14/836,754, mailed on Nov. 17, 2015, 15 pages.
Non-Final Office Action received for U.S. Appl. No. 14/836,754, mailed on Aug. 16, 2017, 25 pages.
Non-Final Office Action received for U.S. Appl. No. 14/836,754, mailed on Oct. 21, 2016., 18 pages.
Non-Final Office Action received for U.S. Appl. No. 14/863,069, mailed on Oct. 5, 2017, 19 pages.
Non-Final Office Action received for U.S. Appl. No. 15/411,110, mailed on Dec. 13, 2018, 23 pages.
Non-Final Office Action received for U.S. Appl. No. 15/411,110, mailed on Jul. 14, 2022, 28 pages.
Non-Final Office Action received for U.S. Appl. No. 15/411,110, mailed on Jul. 22, 2019, 29 pages.
Non-Final Office Action received for U.S. Appl. No. 15/411,110, mailed on Jun. 26, 2020, 32 pages.
Non-Final Office Action received for U.S. Appl. No. 16/102,146, mailed on Jul. 27, 2020, 16 pages.
Non-Final Office Action received for U.S. Appl. No. 16/377,892, mailed on May 21, 2020, 9 pages.
Non-Final Office Action received for U.S. Appl. No. 16/378,136, mailed on Jun. 2, 2020, 8 pages.
Non-Final Office Action received for U.S. Appl. No. 16/407,590, mailed on Apr. 10, 2020, 12 pages.
Non-Final Office Action received for U.S. Appl. No. 16/533,540, mailed on Feb. 16, 2023, 39 pages.
Non-Final Office Action received for U.S. Appl. No. 16/533,540, mailed on Oct. 15, 2021, 40 pages.
Non-Final Office Action received for U.S. Appl. No. 16/533,540, mailed on Oct. 23, 2020, 34 pages.
Non-Final Office Action received for U.S. Appl. No. 17/118,144, mailed on Nov. 14, 2022, 21 pages.
Non-Final Office Action received for U.S. Appl. No. 17/327,204, mailed on Nov. 26, 2021, 13 pages.
Non-Final Office Action received for U.S. Appl. No. 17/516,537, mailed on May 5, 2022, 8 pages.

(56) References Cited

OTHER PUBLICATIONS

Non-Final Office Action received for U.S. Appl. No. 17/951,875, mailed on Jan. 23, 2023, 12 pages.
Notice of Acceptance received for Australian Patent Application No. 2016215440, mailed on Feb. 28, 2019, 3 pages.
Notice of Acceptance received for Australian Patent Application No. 2017277971, mailed on Feb. 17, 2021, 3 pages.
Notice of Acceptance received for Australian Patent Application No. 2021203636, mailed on Apr. 14, 2022, 3 pages.
Notice of Acceptance received for Australian Patent Application No. 2022209277, mailed on Apr. 28, 2023, 3 pages.
Notice of Allowance received for Chinese Patent Application No. 201680008151.9, mailed on Jun. 16, 2020, 2 pages.
Notice of Allowance received for Chinese Patent Application No. 201710439448.7, mailed on Jan. 26, 2021, 2 pages.
Notice of Allowance received for Chinese Patent Application No. 201780033621.1, mailed on Mar. 10, 2022, 2 pages.
Notice of Allowance received for Chinese Patent Application No. 201780034203.4, mailed on Jan. 17, 2022, 2 pages.
Notice of Allowance received for Taiwanese Patent Application No. 104128689, mailed on Aug. 28, 2018, 5 pages.
Notice of Allowance received for U.S. Appl. No. 14/836,754, mailed on May 10, 2018, 27 pages.
Notice of Allowance received for U.S. Appl. No. 14/863,069, mailed on Feb. 6, 2019, 6 pages.
Notice of Allowance received for U.S. Appl. No. 14/863,069, mailed on Jun. 18, 2019, 6 pages.
Notice of Allowance received for U.S. Appl. No. 15/411,110, mailed on May 23, 2023, 8 pages.
Notice of Allowance received for U.S. Appl. No. 15/616,480, mailed on Jan. 3, 2019, 8 pages.
Notice of Allowance received for U.S. Appl. No. 16/102,146, mailed Dec. 17, 2020, 5 pages.
Notice of Allowance received for U.S. Appl. No. 16/102,146, mailed on Oct. 5, 2020, 5 pages.
Notice of Allowance received for U.S. Appl. No. 16/377,892, mailed on May 24, 2021, 9 pages.
Notice of Allowance received for U.S. Appl. No. 16/377,892, mailed on Sep. 9, 2021, 9 pages.
Notice of Allowance received for U.S. Appl. No. 16/378,136, mailed on Jun. 3, 2021, 7 pages.
Notice of Allowance received for U.S. Appl. No. 16/378,136, mailed on Sep. 22, 2021, 7 pages.
Notice of Allowance received for U.S. Appl. No. 16/407,590, mailed on Apr. 9, 2021, 3 pages.
Notice of Allowance received for U.S. Appl. No. 16/407,590, mailed on Dec. 16, 2020, 6 pages.
Notice of Allowance received for U.S. Appl. No. 16/407,590, mailed on Mar. 22, 2021, 6 pages.
Notice of Allowance received for U.S. Appl. No. 16/533,540, mailed on Aug. 15, 2023, 17 pages.
Notice of Allowance received for U.S. Appl. No. 17/118,144, mailed on Feb. 28, 2023, 10 pages.
Notice of Allowance received for U.S. Appl. No. 17/118,144, mailed on Jul. 18, 2023, 9 pages.
Notice of Allowance received for U.S. Appl. No. 17/327,204, mailed on May 18, 2022, 18 pages.
Notice of Allowance received for U.S. Appl. No. 17/516,537, mailed on Apr. 17, 2023, 8 pages.
Notice of Allowance received for U.S. Appl. No. 17/516,537, mailed on Dec. 27, 2022, 7 pages.
Notice of Allowance received for U.S. Appl. No. 17/951,875, mailed on Jul. 26, 2023, 7 pages.
NPASQUA, "Maps: ability to swipe step by step in turn-by-turn mode", 2012, Apple Support Communities, https://discussions.apple.com/thread/4424256?start=O&tstart=0, Oct. 12, 2012, 4 pages.
Oates Nathan, "PebbGPS", Available online at: https://pebble.devpost.com/submissions/21694-pebbgps, Mar. 16, 2014, 2 pages.
Office Action received for Australian Patent Application No. 2016215440, mailed on Jan. 22, 2019, 2 pages.
Office Action received for Australian Patent Application No. 2016215440, mailed on Mar. 13, 2018, 3 pages.
Office Action received for Australian Patent Application No. 2017100667, mailed on Aug. 3, 2017, 9 pages.
Office Action received for Australian Patent Application No. 2017277971, mailed on Aug. 12, 2020, 3 pages.
Office Action received for Australian Patent Application No. 2017277971, mailed on Jun. 3, 2020, 3 pages.
Office Action received for Australian Patent Application No. 2018100158, mailed on Apr. 23, 2018, 5 pages.
Office Action received for Australian Patent Application No. 2018101855, mailed on Feb. 22, 2019, 4 pages.
Office Action received for Australian Patent Application No. 2021203636, mailed on Mar. 23, 2022, 3 pages.
Office Action received for Australian Patent Application No. 2022209277, mailed on Mar. 10, 2023, 6 pages.
Office Action received for Chinese Patent Application No. 201680008151.9, mailed on Apr. 20, 2020, 6 pages.
Office Action received for Chinese Patent Application No. 201680008151.9, mailed on Aug. 27, 2019, 24 pages.
Office Action received for Chinese Patent Application No. 201710439448.7, mailed on Mar. 27, 2020, 13 pages.
Office Action received for Chinese Patent Application No. 201710439448.7, mailed on Oct. 10, 2020, 19 pages.
Office Action received for Chinese Patent Application No. 201780033621.1, mailed on Dec. 14, 2021, 8 pages.
Office Action received for Chinese Patent Application No. 201780033621.1, mailed on Dec. 22, 2020, 30 pages.
Office Action received for Chinese Patent Application No. 201780033621.1, mailed on May 24, 2021, 18 pages.
Office Action received for Chinese Patent Application No. 201780034203.4, mailed on Jul. 14, 2021, 12 pages.
Office Action received for Chinese Patent Application No. 201780034203.4, mailed on Sep. 24, 2021, 7 pages.
Office Action received for Danish Patent Application No. PA201570665, mailed on Mar. 31, 2016, 9 pages.
Office Action received for Danish Patent Application No. PA201570665, mailed on Sep. 5, 2016, 3 pages.
Office Action received for Danish Patent Application No. PA201770423, mailed on Jun. 12, 2018, 7 pages.
Office Action received for Danish Patent Application No. PA201770423, mailed on Mar. 29, 2019, 6 pages.
Office Action received for European Patent Application No. 17810749.6, mailed on Aug. 20, 2019, 9 pages.
Office Action received for European Patent Application No. 17813879.8, mailed on Jun. 22, 2023, 7 pages.
Office Action received for European Patent Application No. 17813879.8, mailed on Oct. 20, 2021, 7 pages.
Office Action received for European Patent Application No. 18213157.3, mailed on May 15, 2020, 7 pages.
Office Action received for European Patent Application No. 20729345.7, mailed on Jul. 13, 2023, 9 pages.
Office Action received for European Patent Application No. 21165295.3, mailed on Jul. 1, 2021, 10 pages.
Office Action received for Taiwanese Patent Application No. 104128689, mailed on Aug. 21, 2017, 8 pages.
Office Action received for Taiwanese Patent Application No. 104128689, mailed on Nov. 14, 2016, 12 pages.
Partial Supplementary European Search Report received for European Patent Application No. 17810749.6, mailed on Apr. 25, 2019, 8 pages.
Razykdreviews, "In Depth Review of Apple Watch Activity and Workout App", available at <URL: https://www.youtube.com/watch?v=GkKI3qIK0ow>, Category: X Claims: 1-5, Category: L Reason: Internet citation/video, May 11, 2015, 1 page.
Result of Consultation received for European Patent Application No. 17810749.6, mailed on Dec. 15, 2020, 3 pages.
Result of Consultation received for European Patent Application No. 17810749.6, mailed on Jan. 18, 2021, 3 pages.
Result of Consultation received for European Patent Application No. 17810749.6, mailed on Jan. 21, 2021, 18 pages.

(56) References Cited

OTHER PUBLICATIONS

Rizknows, "Garmin Connect Mobile App—Review #2", https://www.youtube.com/watch?v=7my3wMpeRbE, Category: X Claims: 1-5 Category: L Reason: Internet citation/video, Oct. 22, 2015, 1 page.
Search Report and Opinion received for Danish Patent Application No. PA201770423, mailed on Oct. 4, 2017, 10 pages.
Summons to Attend Oral Proceedings received for European Patent Application No. 17810749.6, mailed on Aug. 12, 2020, 11 pages.
Supplemental Notice of Allowance received for U.S. Appl. No. 14/863,069, mailed on Aug. 15, 2019, 3 pages.
Supplemental Notice of Allowance received for U.S. Appl. No. 14/863,069, mailed on Mar. 29, 2019, 3 pages.
Supplemental Notice of Allowance received for U.S. Appl. No. 14/863,069, mailed on Mar. 1, 2019, 3 pages.
Supplemental Notice of Allowance received for U.S. Appl. No. 15/616,480, mailed on Mar. 28, 2019, 2 pages.
Supplementary European Search Report received for European Patent Application No. 17810749.6, mailed on Aug. 6, 2019, 6 pages.
The Gadget Pill, "Sygic for Android Navigation with HUD", Available online at: https://www.youtube.com/watch?v=fGqrycRevGU, Mar. 23, 2014, 1 page.
Written Opinion Issued from International Preliminary Examining Authority for PCT Application No. PCT/US2016/016216, mailed on Feb. 20, 2017, 12 pages.
Decision to Refuse received for European Patent Application No. 21165295.3, mailed on Apr. 29, 2024, 14 pages.
Minutes of Oral Proceedings received for European Patent Application No. 21165295.3, mailed on Apr. 26, 2024, 6 pages.
Result of Consultation received for European Patent Application No. 21165295.3, mailed on Apr. 18, 2024, 3 pages.
Intention to Grant received for European Patent Application No. 22150207.3, mailed on Mar. 21, 2024, 9 pages.
Office Action received for Australian Patent Application No. 2023214377, mailed on Mar. 27, 2024, 3 pages.
Office Action received for Chinese Patent Application No. 202111392782.4, mailed on Jul. 26, 2024, 12 pages (6 pages of English Translation and 6 pages of Official Copy).
2009-50471, JP, A, Cited by the Chinese Patent Office in an Office Action for related Patent Application No. 202210326960.1 on Jun. 21, 2024.
Extended European Search Report received for European Patent Application No. 24179066.6, mailed on Aug. 8, 2024, 10 pages.
Decision to Grant received for European Patent Application No. 22150207.3, mailed on Jul. 11, 2024, 2 pages.
Notice of Allowance received for Chinese Patent Application No. 202210326960.1, mailed on Jun. 21, 2024, 5 pages (1 page of English Translation and 4 pages of Official Copy).
Office Action received for Chinese Patent Application No. 202210312775.7, mailed on Jun. 19, 2024, 13 pages (6 pages of English Translation and 7 pages of Official Copy).
Corrected Notice of Allowance received for U.S. Appl. No. 18/103,376, mailed on Dec. 20, 2024, 5 pages.
International Preliminary Report on Patentability received for PCT Patent Application No. PCT/US2023/024293, mailed on Dec. 19, 2024, 15 pages.
Notice of Allowance received for Chinese Patent Application No. 202210312598.2, mailed on Nov. 6, 2024, 4 pages (1 page of English Translation and 3 pages of Official Copy).
Notice of Allowance received for Chinese Patent Application No. 202210312775.7, mailed on Sep. 23, 2024, 5 pages (1 page of English Translation and 4 pages of Official Copy).
Notice of Allowance received for U.S. Appl. No. 18/103,376, mailed on Dec. 17, 2024, 8 pages.
Notice of Allowance received for U.S. Appl. No. 18/589,265, mailed on Dec. 6, 2024, 9 pages.
Office Action received for Australian Patent Application No. 2023214377, mailed on Sep. 25, 2024, 4 pages.
Office Action received for Chinese Patent Application No. 202210312598.2, mailed on Jun. 27, 2024, 22 pages (7 pages of English Translation and 15 pages of Official Copy).
Supplemental Notice of Allowance received for U.S. Appl. No. 18/103,376, mailed on Dec. 23, 2024, 2 pages.
Supplemental Notice of Allowance received for U.S. Appl. No. 18/589,265, mailed on Dec. 18, 2024, 2 pages.
Notice of Allowance received for Chinese Patent Application No. 202111392782.4, mailed on Oct. 30, 2024, 4 pages (1 page of English Translation and 3 pages of Official Copy).
Non-Final Office Action received for U.S. Appl. No. 18/204,876, mailed on Jan. 27, 2025, 14 pages.
Notice of Allowance received for U.S. Appl. No. 18/589,265, mailed on Feb. 18, 2025, 10 pages.
Office Action received for Australian Patent Application No. 2023214377, mailed on Jan. 17, 2025, 3 pages.
Supplemental Notice of Allowance received for U.S. Appl. No. 18/103,376, mailed on Feb. 10, 2025, 4 pages.
Applicant-Initiated Interview Summary received for U.S. Appl. No. 18/204,876, mailed on Apr. 2, 2025, 5 pages.
Corrected Notice of Allowance received for U.S. Appl. No. 18/589,265, mailed on Feb. 26, 2025, 2 pages.
Intention to Grant received for European Patent Application No. 20729345.7, mailed on Feb. 27, 2025, 9 pages.
International Preliminary Report on Patentability received for PCT Patent Application No. PCT/US2023/030104, mailed on Feb. 27, 2025, 8 pages.
Intention to Grant received for European Patent Application No. 17813879.8, mailed on Apr. 28, 2025, 9 pages.
Non-Final Office Action received for U.S. Appl. No. 18/226,965, mailed on Apr. 25, 2025, 15 pages.
Applicant-Initiated Interview Summary received for U.S. Appl. No. 18/226,965, mailed on Jun. 27, 2025, 3 pages.
Final Office Action received for U.S. Appl. No. 18/204,876, mailed on Jun. 25, 2025, 9 pages.
Intention to Grant received for European Patent Application No. 20729345.7, mailed on May 27, 2025, 8 pages.
Final Office Action received for U.S. Appl. No. 18/226,965, mailed on Aug. 6, 2025, 22 pages.
Summons to Oral Proceedings received for European Patent Application No. 21165295.3, mailed on Jul. 21, 2025, 11 pages.
Applicant-Initiated Interview Summary received for U.S. Appl. No. 18/204,876, mailed on Jul. 24, 2025, 2 pages.
Decision to Grant received for European Patent Application No. 20729345.7, mailed on Jul. 3, 2025, 2 pages.
Extended European Search Report received for European Patent Application No. 25181857.1, mailed on Sep. 18, 2025, 9 pages.

\* cited by examiner

900

902
While the first electronic device is connected to an accessory that includes one or more output devices, provide, via the one or more antennas, information to a second electronic device that indicates that the first electronic device is available to retransmit content from the second electronic device to the accessory.

904
Prior to transmitting the media to the accessory for presentation via the one or more output devices of the accessory:

906
Receive, from the second electronic device, a request to connect to the accessory as the receiving source

908
In response to receiving the request to connect the accessory as the receiving source, cause to displayed, on at least one of the one or more output devices of the accessory, a user interface that includes a confirmation screen to allow or deny the connection to the accessory as the receiving source (A)

*FIG. 9A*

PROVIDING USER INTERFACES BASED ON USE CONTEXTS AND MANAGING PLAYBACK OF MEDIA

CROSS-REFERENCE TO RELATED APPLICATIONS

This application is a continuation of U.S. patent application Ser. No. 16/533,540, entitled "PROVIDING USER INTERFACES BASED ON USE CONTEXTS AND MANAGING PLAYBACK OF MEDIA," filed Aug. 6, 2019, which claims priority to U.S. Provisional Patent Application Ser. No. 62/844,111, entitled "PROVIDING USER INTERFACES BASED ON USE CONTEXTS AND MANAGING PLAYBACK OF MEDIA," filed May 6, 2019, the entire contents of each of which are hereby incorporated by reference.

FIELD

The present disclosure relates generally to computer user interfaces, and more specifically to techniques for user interfaces.

BACKGROUND

User interfaces can provide users with information and access to computing applications in a number of environments, including while driving. In a driving environment, user interfaces can provide access to driving-related applications.

BRIEF SUMMARY

Some techniques for providing applications to users exist. However, these techniques are often cumbersome and inefficient. In addition, these systems are also dangerous when users have to interact with them while participating in activities, such as driving. For example, some existing techniques use a complex and time-consuming user interface, which may include multiple key presses or keystrokes. Existing techniques require more time than necessary, wasting user time and device energy. This latter consideration is particularly important in battery-operated devices. The latter consideration is also particularly relevant in a driving context, when a user has limited time and attention to devote to user interface interactions and therefore require interfaces that are both time- and attention-efficient Accordingly, the present technique provides electronic devices with faster, more efficient methods and interfaces for providing the functionality of applications to users participating in activities, such as driving. Such methods and interfaces optionally complement or replace other methods for providing the functionality of applications to users. Such methods and interfaces reduce the cognitive burden on a user and produce a more efficient human-machine interface, while requiring less time and attention. For battery-operated computing devices, such methods and interfaces conserve power and increase the time between battery charges.

In some embodiments, a method performed at an electronic device that is in communication with a display screen is disclosed. The method includes receiving an input that corresponds to a request to display a user interface on the display screen. The method further includes, in response to receiving the input, causing the user interface to be displayed on the display screen. In accordance with a determination that the electronic device is in a first use context, the user interface that is caused to be displayed on the display screen includes: a first interface element that includes a map selected based on a current location of the electronic device; a second interface element that includes media playback controls; and a third interface element that includes a first control that, when selected, performs a first function selected based on the first use context. In accordance with a determination that the electronic device is in a second use context that is different from the first use context, the user interface that is caused to be displayed on the display screen includes: the first interface element that includes the map selected based on the current location of the electronic device; the second interface element that includes media playback controls; and the third interface element that includes a second control that, when selected, performs a second function selected based on the second use context without including the first control.

In some embodiments, a non-transitory computer-readable storage medium storing one or more programs configured to be executed by one or more processors of an electronic device that is in communication with a display screen is disclosed. The one or more processors include instructions for receiving an input that corresponds to a request to display a user interface on the display screen. The one or more processors further include instructions for, in response to receiving the input, causing the user interface to be displayed on the display screen. In accordance with a determination that the electronic device is in a first use context, the user interface that is caused to be displayed on the display screen includes: a first interface element that includes a map selected based on a current location of the electronic device; a second interface element that includes media playback controls; and a third interface element that includes a first control that, when selected, performs a first function selected based on the first use context. In accordance with a determination that the electronic device is in a second use context that is different from the first use context, the user interface that is caused to be displayed on the display screen includes: the first interface element that includes the map selected based on the current location of the electronic device; the second interface element that includes media playback controls; and the third interface element that includes a second control that, when selected, performs a second function selected based on the second use context without including the first control.

In some embodiments, a transitory computer-readable storage medium storing one or more programs configured to be executed by one or more processors of an electronic device that is in communication with a display screen is disclosed. The one or more processors include instructions for receiving an input that corresponds to a request to display a user interface on the display screen. The one or more processors further include instructions for, in response to receiving the input, causing the user interface to be displayed on the display screen. In accordance with a determination that the electronic device is in a first use context, the user interface that is caused to be displayed on the display screen includes: a first interface element that includes a map selected based on a current location of the electronic device; a second interface element that includes media playback controls; and a third interface element that includes a first control that, when selected, performs a first function selected based on the first use context. In accordance with a determination that the electronic device is in a second use context that is different from the first use context, the user interface that is caused to be displayed on the display screen includes: the first interface element that includes the map selected based on the current location of the electronic device; the second interface element that includes media playback controls; and the third interface element that includes a second control that, when selected, performs a second function selected based on the second use context without including the first control.

In some embodiments, an electronic device that is in communication with a display screen is disclosed. The electronic device includes one or more processors and memory storing one or more programs configured to be executed by the one or more processors. The one or more processors includes instructions for receiving an input that corresponds to a request to display a user interface on the display screen. The one or more processors further includes instructions for, in response to receiving the input, causing the user interface to be displayed on the display screen. In accordance with a determination that the electronic device is in a first use context, the user interface that is caused to be displayed on the display screen includes: a first interface element that includes a map selected based on a current location of the electronic device; a second interface element that includes media playback controls; and a third interface element that includes a first control that, when selected, performs a first function selected based on the first use context. In accordance with a determination that the electronic device is in a second use context that is different from the first use context, the user interface that is caused to be displayed on the display screen includes: the first interface element that includes the map selected based on the current location of the electronic device; the second interface element that includes media playback controls; and the third interface element that includes a second control that, when selected, performs a second function selected based on the second use context without including the first control.

In some embodiments, an electronic device that is in communication with a display screen is disclosed. The electronic device includes means for receiving an input that corresponds to a request to display a user interface on the display screen. The electronic device includes means, responsive to receiving the input, for causing the user interface to be displayed on the display screen. In accordance with a determination that the electronic device is in a first use context, the user interface that is caused to be displayed on the display screen includes: a first interface element that includes a map selected based on a current location of the electronic device; a second interface element that includes media playback controls; and a third interface element that includes a first control that, when selected, performs a first function selected based on the first use context. In accordance with a determination that the electronic device is in a second use context that is different from the first use context, the user interface that is caused to be displayed on the display screen includes: the first interface element that includes the map selected based on the current location of the electronic device; the second interface element that includes media playback controls; and the third interface element that includes a second control that, when selected, performs a second function selected based on the second use context without including the first control.

In some embodiments, a method performed at a first electronic device with one or more antennas is disclosed. The method includes, while the first electronic device is connected to an accessory that includes one or more output devices, providing, via the one or more antennas, information to a second electronic device that indicates that the first electronic device is available to retransmit content from the second electronic device to the accessory. The method further includes, after providing the information to the second electronic device, receiving, from the second electronic device, via the one or more antennas, media. The method also includes transmitting the media to the accessory for presentation via the one or more output devices of the accessory. Further, the method includes, after transmitting the media to the accessory for presentation via the one or more output devices, detecting that the first electronic device is no longer connected to the accessory. The method includes, in response to detecting that the first electronic device is no longer connected to the accessory, removing availability of information indicating that the first electronic device is available to retransmit content from remote devices to the accessory.

In some embodiments, a non-transitory computer-readable storage medium storing one or more programs configured to be executed by one or more processors of a first electronic device with one or more antennas is disclosed. The one or more processors include instructions for, while the first electronic device is connected to an accessory that includes one or more output devices, providing, via the one or more antennas, information to a second electronic device that indicates that the first electronic device is available to retransmit content from the second electronic device to the accessory. The one or more processors further include instructions for, after providing the information to the second electronic device, receiving, from the second electronic device, via the one or more antennas, media. The one or more processors also include instructions for transmitting the media to the accessory for presentation via the one or more output devices of the accessory. Further, the one or more processors include instructions for, after transmitting the media to the accessory for presentation via the one or more output devices, detecting that the first electronic device is no longer connected to the accessory. The one or more processors include instructions for, in response to detecting that the first electronic device is no longer connected to the accessory, removing availability of information indicating that the first electronic device is available to retransmit content from remote devices to the accessory.

In some embodiments, a transitory computer-readable storage medium storing one or more programs configured to be executed by one or more processors of a first electronic device with one or more antennas is disclosed. The one or more processors include instructions for, while the first electronic device is connected to an accessory that includes one or more output devices, providing, via the one or more antennas, information to a second electronic device that indicates that the first electronic device is available to retransmit content from the second electronic device to the accessory. The one or more processors further include instructions for, after providing the information to the second electronic device, receiving, from the second electronic device, via the one or more antennas, media. The one or more processors also include instructions for transmitting the media to the accessory for presentation via the one or more output devices of the accessory. Further, the one or more processors include instructions for, after transmitting the media to the accessory for presentation via the one or more output devices, detecting that the first electronic device is no longer connected to the accessory. The one or more processors include instructions for, in response to detecting that the first electronic device is no longer connected to the accessory, removing availability of information indicating that the first electronic device is available to retransmit content from remote devices to the accessory.

In some embodiments, a first electronic device with one or more antennas is disclosed. The first electronic device includes one or more processors and memory storing one or more programs configured to be executed by the one or more processors. The one or more processors include instructions for, while the first electronic device is connected to an accessory that includes one or more output devices, providing, via the one or more antennas, information to a second electronic device that indicates that the first electronic device is available to retransmit content from the second electronic device to the accessory. The one or more processors further include instructions for, after providing the information to the second electronic device, receiving, from the second electronic device, via the one or more antennas, media. The one or more processors also include instructions for transmitting the media to the accessory for presentation via the one or more output devices of the accessory. Further, the one or more processors include instructions for, after transmitting the media to the accessory for presentation via the one or more output devices, detecting that the first electronic device is no longer connected to the accessory. The one or more processors further include instructions for, in response to detecting that the first electronic device is no longer connected to the accessory, removing availability of information indicating that the first electronic device is available to retransmit content from remote devices to the accessory.

In some embodiments, a first electronic device with one or more antennas is disclosed. The first electronic device includes means for, while the first electronic device is connected to an accessory that includes one or more output devices, providing, via the one or more antennas, information to a second electronic device that indicates that the first electronic device is available to retransmit content from the second electronic device to the accessory. The first electronic device further includes means for, after providing the information to the second electronic device, receiving, from the second electronic device, via the one or more antennas, media. The first electronic device also includes means for transmitting the media to the accessory for presentation via the one or more output devices of the accessory. Further, the first electronic device includes means for, after transmitting the media to the accessory for presentation via the one or more output devices, detecting that the first electronic device is no longer connected to the accessory. The first electronic device includes means, responsive to detecting that the first electronic device is no longer connected to the accessory, for removing availability of information indicating that the first electronic device is available to retransmit content from remote devices to the accessory.

In some embodiments, a method performed at a first electronic device with a display device and one or more input devices is disclosed. The method includes receiving, via the one or more input devices, a request to display available wireless media receiver devices. The method further includes, in response to receiving the request, displaying, via the display device, a user interface for selecting a wireless media receiver for media from the first electronic device, including: in accordance with a determination that a wireless connection to an accessory for receiving media via a wireless connection is available, displaying an affordance for selecting the accessory to receive wireless media, wherein the affordance for selecting the accessory to receive wireless media establishes a connection between the first electronic device and a second electronic device that is connected to the accessory; and in accordance with a determination that a wireless connection to the accessory for receiving media via the wireless connection is not available, forgoing displaying the affordance for selecting the accessory to receive wireless media, wherein the connection to the accessory for receiving media via the wireless connection is not available when no devices are connected to the accessory.

In some embodiments, a non-transitory computer-readable storage medium storing one or more programs configured to be executed by one or more processors of a first electronic device with a display device and one or more input device is disclosed. The one or more processors include instructions for, receiving, via the one or more input devices, a request to display available wireless media receiver devices. The one or more processors further include instructions for, in response to receiving the request, displaying, via the display device, a user interface for selecting a wireless media receiver for media from the first electronic device, including: in accordance with a determination that a wireless connection to an accessory for receiving media via a wireless connection is available, displaying an affordance for selecting the accessory to receive wireless media, wherein the affordance for selecting the accessory to receive wireless media establishes a connection between the first electronic device and a second electronic device that is connected to the accessory; and in accordance with a determination that a wireless connection to the accessory for receiving media via the wireless connection is not available, forgoing displaying the affordance for selecting the accessory to receive wireless media, wherein the connection to the accessory for receiving media via the wireless connection is not available when no devices are connected to the accessory.

In some embodiments, a transitory computer-readable storage medium storing one or more programs configured to be executed by one or more processors of a first electronic device with a display device and one or more input device is disclosed. The one or more processors include instructions for, receiving, via the one or more input devices, a request to display available wireless media receiver devices. The one or more processors further include instructions for, in response to receiving the request, displaying, via the display device, a user interface for selecting a wireless media receiver for media from the first electronic device, including: in accordance with a determination that a wireless connection to an accessory for receiving media via a wireless connection is available, displaying an affordance for selecting the accessory to receive wireless media, wherein the affordance for selecting the accessory to receive wireless media establishes a connection between the first electronic device and a second electronic device that is connected to the accessory; and in accordance with a determination that a wireless connection to the accessory for receiving media via the wireless connection is not available, forgoing displaying the affordance for selecting the accessory to receive wireless media, wherein the connection to the accessory for receiving media via the wireless connection is not available when no devices are connected to the accessory.

In some embodiments, a first electronic device with a display device and one or more input devices is disclosed. The first electronic device includes one or more processors and memory storing one or more programs configured to be executed by the one or more processors. The one or more processors include instructions for, receiving, via the one or more input devices, a request to display available wireless media receiver devices. The one or more processors further include instructions for, in response to receiving the request, displaying, via the display device, a user interface for selecting a wireless media receiver for media from the first electronic device, including: in accordance with a determination that a wireless connection to an accessory for receiving media via a wireless connection is available, displaying an affordance for selecting the accessory to receive wireless media, wherein the affordance for selecting the accessory to receive wireless media establishes a connection between the first electronic device and a second electronic device that is connected to the accessory; and in accordance with a determination that a wireless connection to the accessory for receiving media via the wireless connection is not available, forgoing displaying the affordance for selecting the accessory to receive wireless media, wherein the connection to the accessory for receiving media via the wireless connection is not available when no devices are connected to the accessory.

In some embodiments, a first electronic device with a display device and one or more input devices is disclosed. The first electronic device includes means for receiving, via the one or more input devices, a request to display available wireless media receiver devices. The first electronic device also includes means, responsive to receiving the request, for displaying, via the display device, a user interface for selecting a wireless media receiver for media from the first electronic device, including: in accordance with a determination that a wireless connection to an accessory for receiving media via a wireless connection is available, displaying an affordance for selecting the accessory to receive wireless media, wherein the affordance for selecting the accessory to receive wireless media establishes a connection between the first electronic device and a second electronic device that is connected to the accessory; and in accordance with a determination that a wireless connection to the accessory for receiving media via the wireless connection is not available, forgoing displaying the affordance for selecting the accessory to receive wireless media, wherein the connection to the accessory for receiving media via the wireless connection is not available when no devices are connected to the accessory.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing the functionality of applications to users participating in activities, such as driving, thereby increasing the effectiveness, efficiency, and user satisfaction with such devices. Such methods and interfaces may complement or replace other methods for providing the functionality of applications to users participating in activities.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 9A-9B is a flow diagram illustrating a method for managing a connection between computing devices.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing applications for different use contexts. In one example, a user may be participating in active like driving, where such techniques can reduce the cognitive burden on a user who accesses applications while driving, thereby enhancing productivity. Further, such techniques can reduce processor and battery power otherwise wasted on redundant user inputs.

Figure 6A:
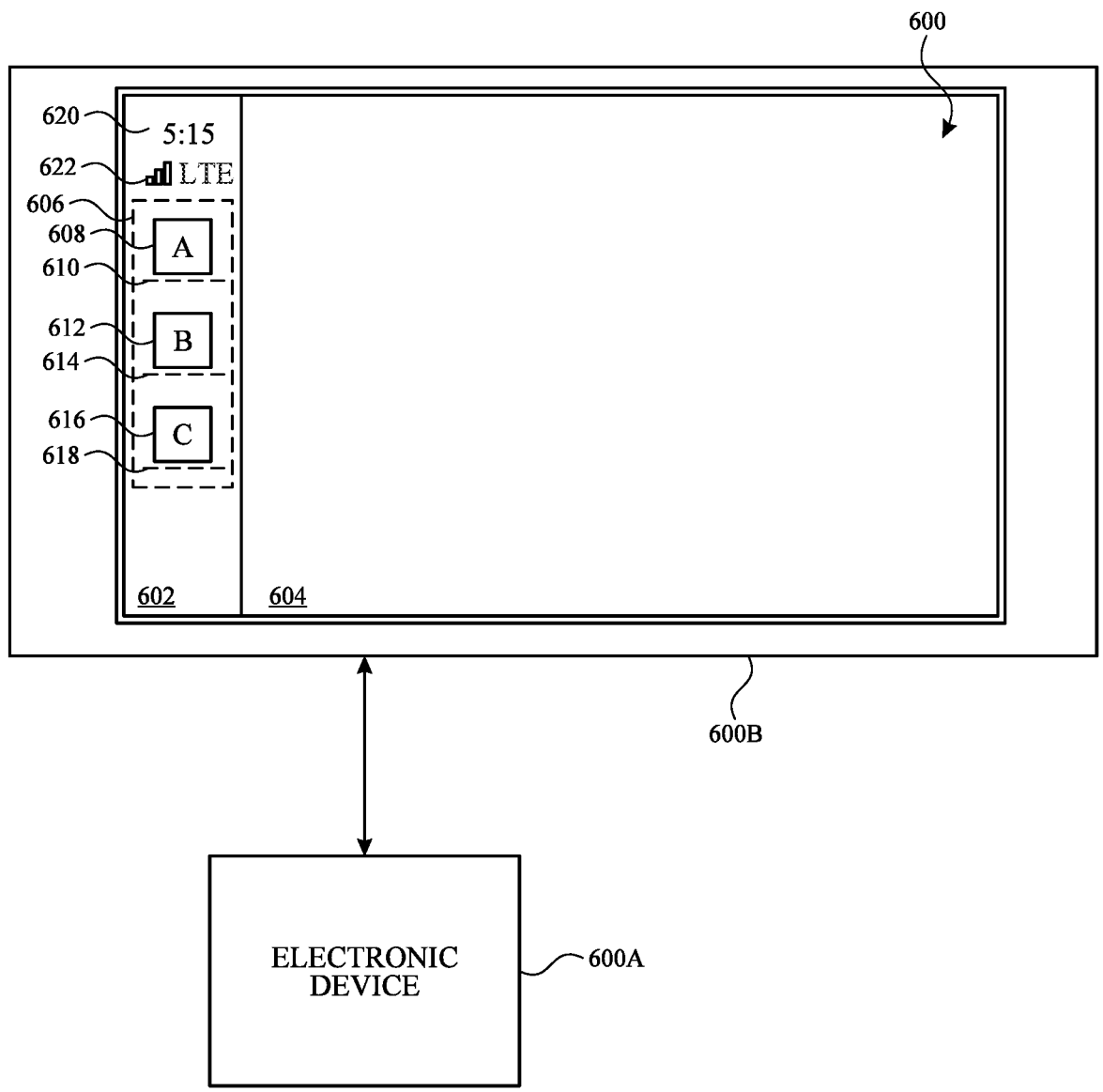
FIGS. 6A-6AE illustrate exemplary user interfaces managing applications for different use contexts in accordance with various embodiments presented herein.
Figure 7A:
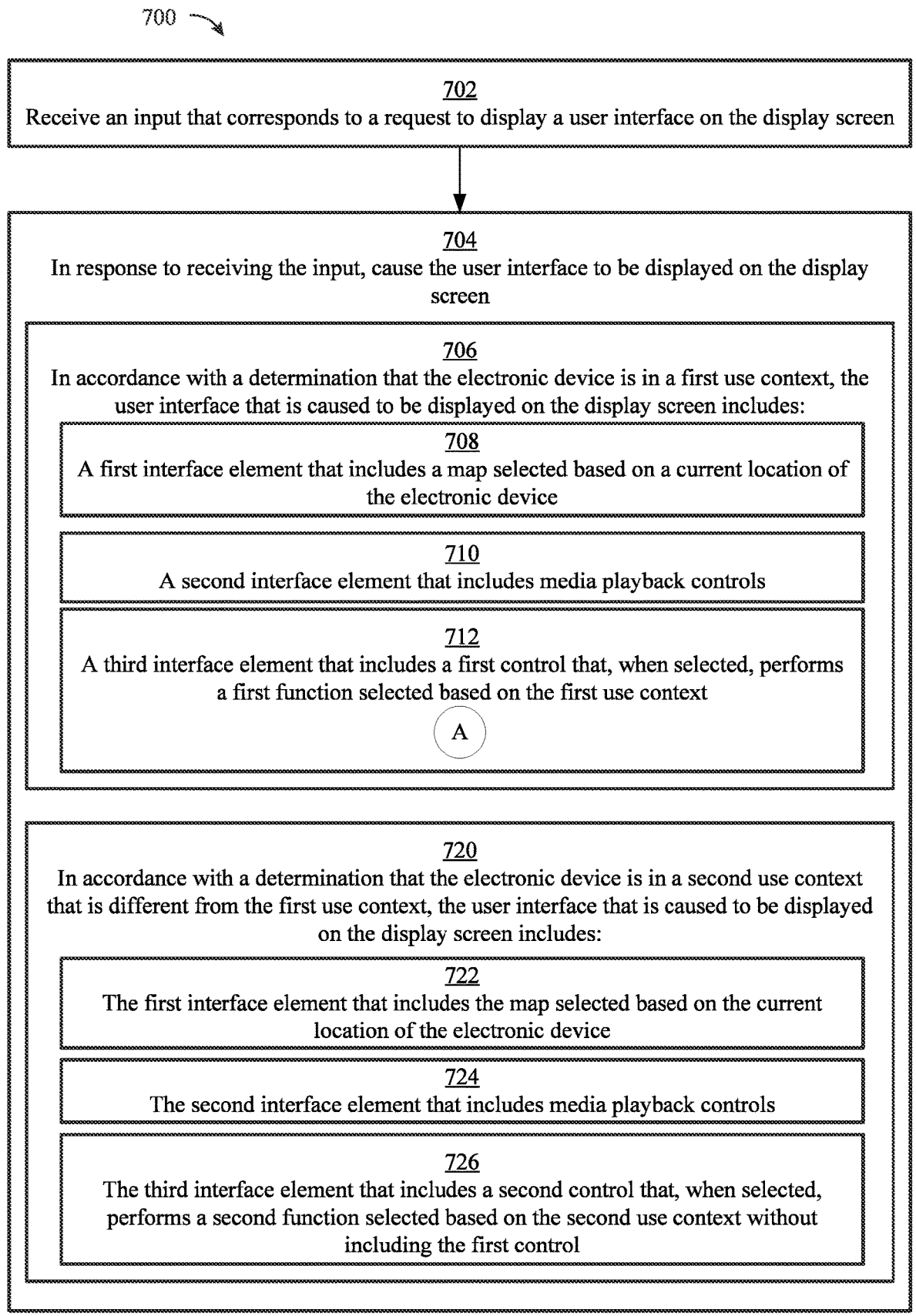
FIGS. 7A-7B is a flow diagram illustrating a method for providing user interfaces for managing applications for different use contexts.
Figure 7B:
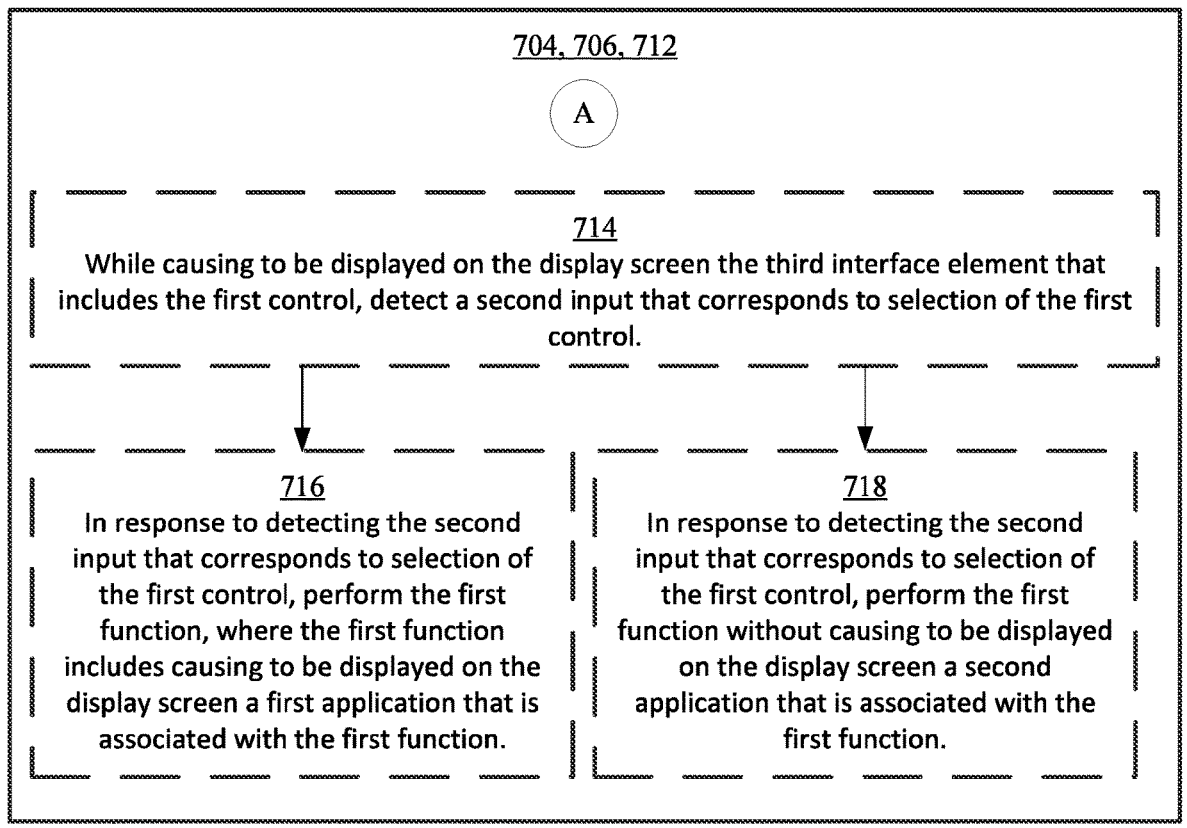
Figure 8A:
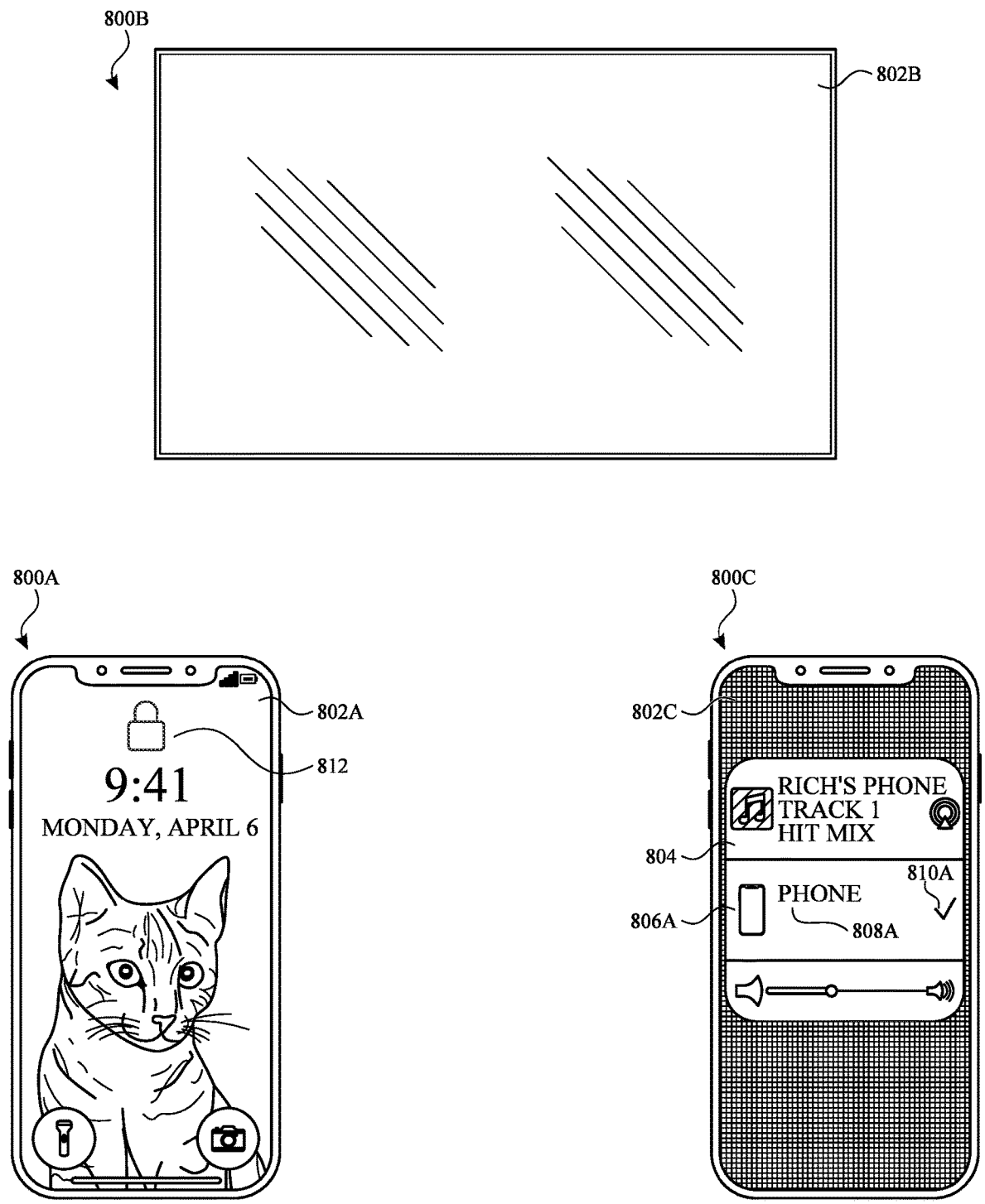
FIGS. 8A-8T illustrate exemplary user interfaces for managing a connection between computing devices.
Figure 8T:
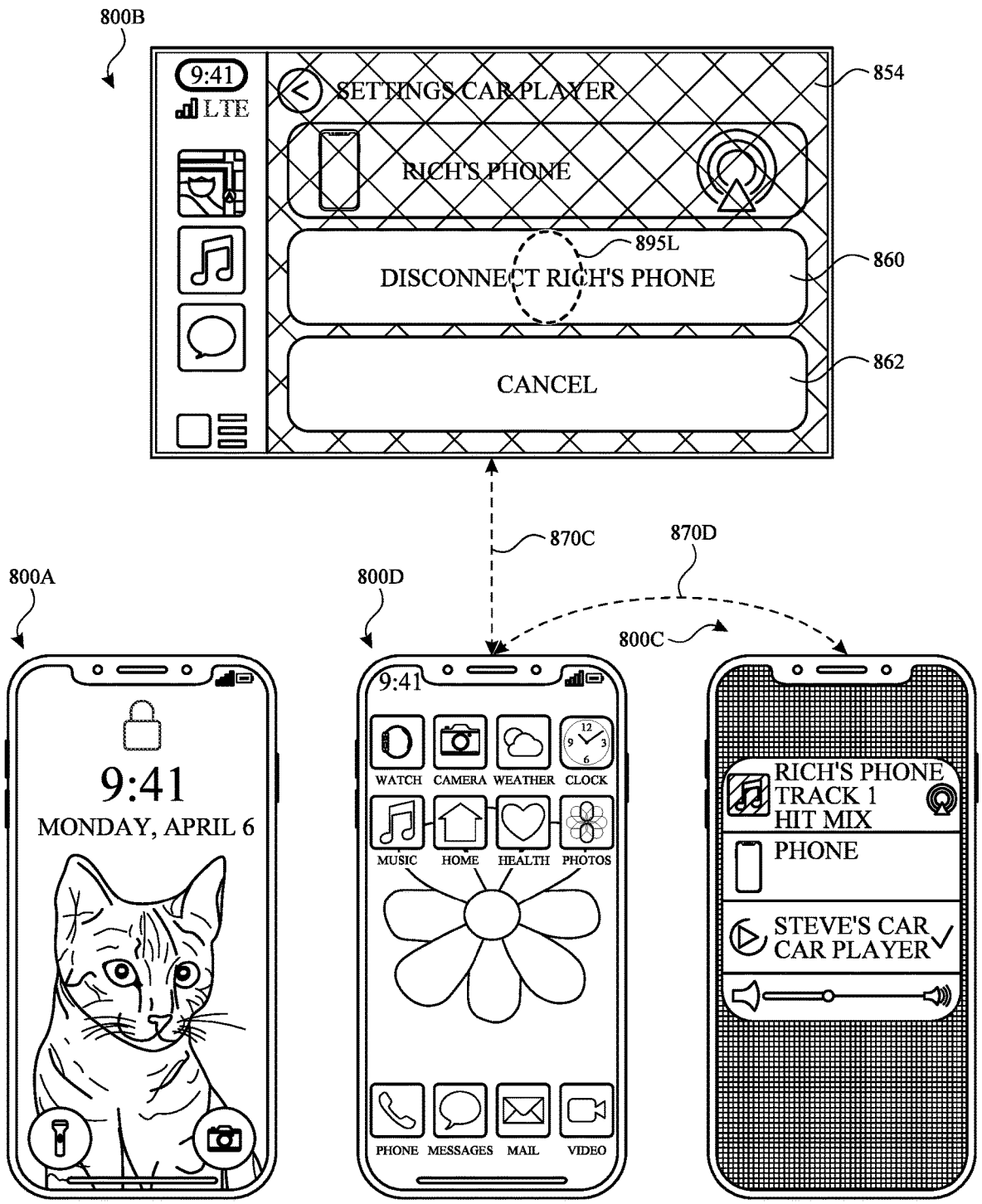
Figure 9B:
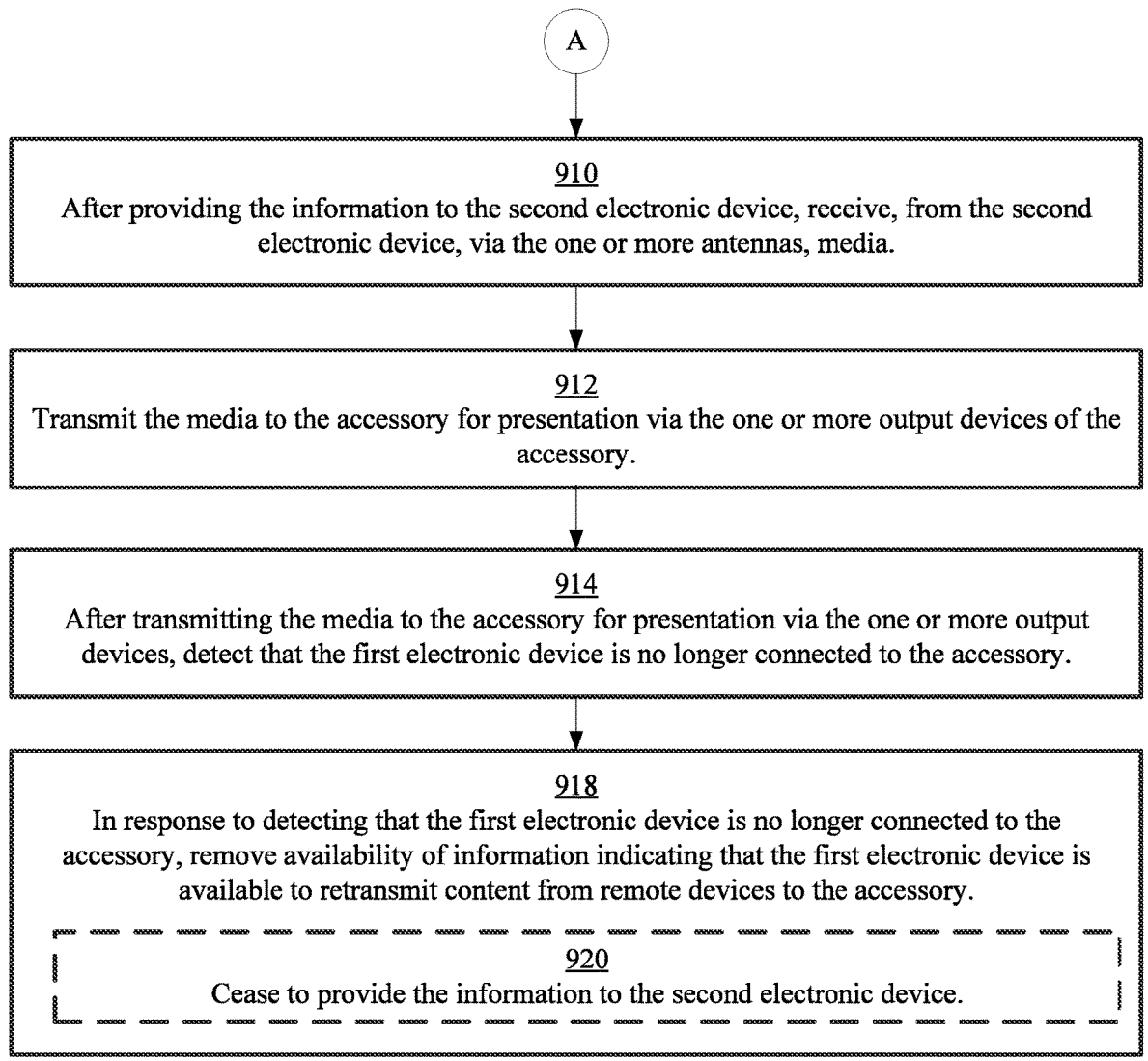
Figure 10:
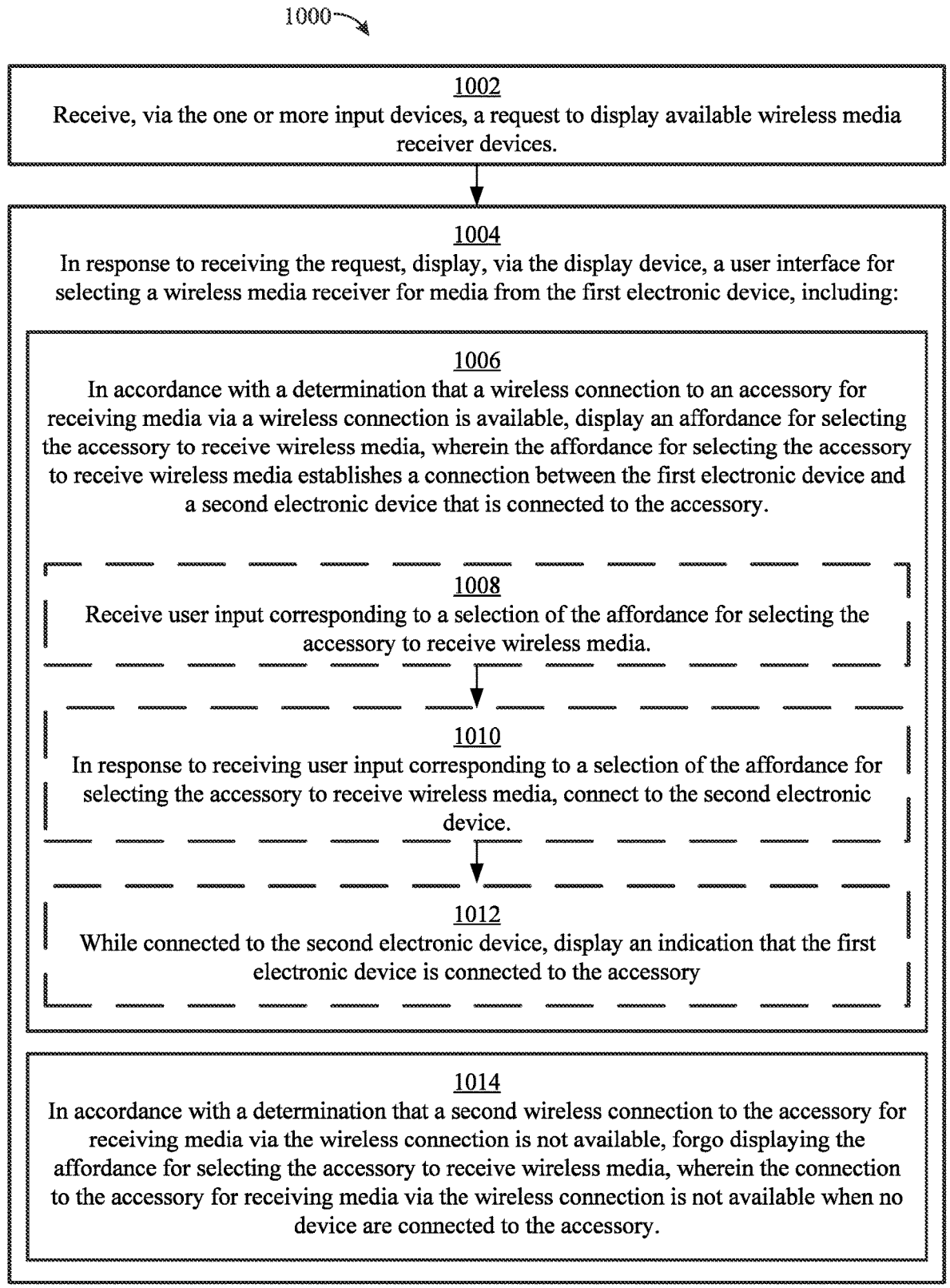
FIG. 10 is a flow diagram illustrating a method for managing a connection between computing devices.

Below, FIGS. 1A-1B, 2, 3, 4A-4B, and 5A-5B provide a description of exemplary devices for performing the techniques for managing applications for different use contexts. FIGS. 6A-6AE illustrate exemplary user interfaces for managing applications for different use contexts in accordance with various embodiments presented herein. FIGS. 7A-7B are flow diagrams illustrating a method for managing applications for different use contexts. The user interfaces in FIGS. 6A-6AE are used to illustrate the processes described below, including the processes in FIGS. 7A-7B. FIGS. 8A-8T illustrate exemplary user interfaces and transition thereof for managing a connection between computing devices 800A, 800B. 800C, and 800D. FIGS. 9A-9B are flow diagrams illustrating a method for managing a connection between computing devices. FIG. 10 is a flow diagram illustrating a method for managing a connection between computing devices. The user interfaces and transitions thereof in FIGS. 8A-8T are used to illustrate the processes described below, including the processes in FIGS. 9A-9B and 10.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
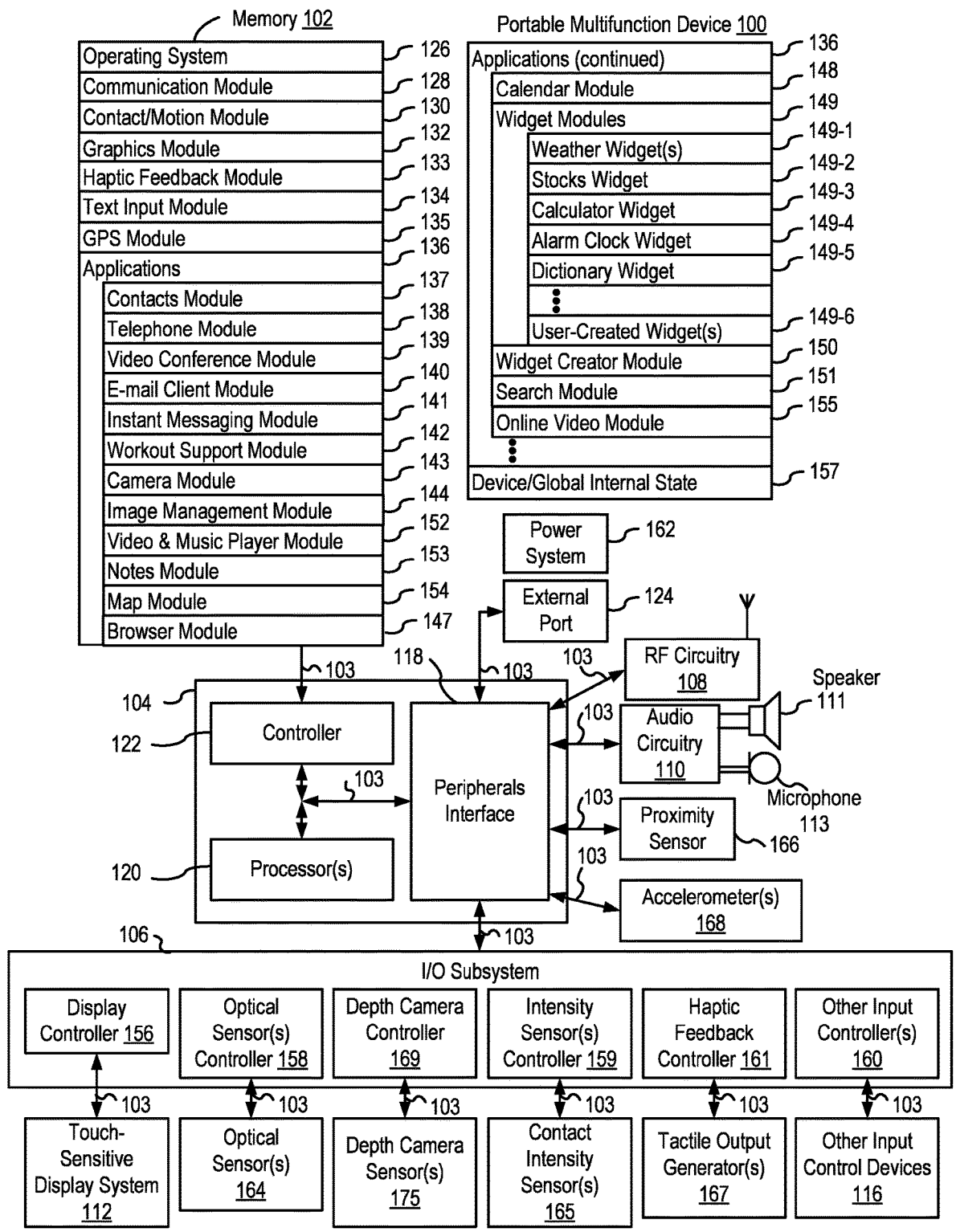
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
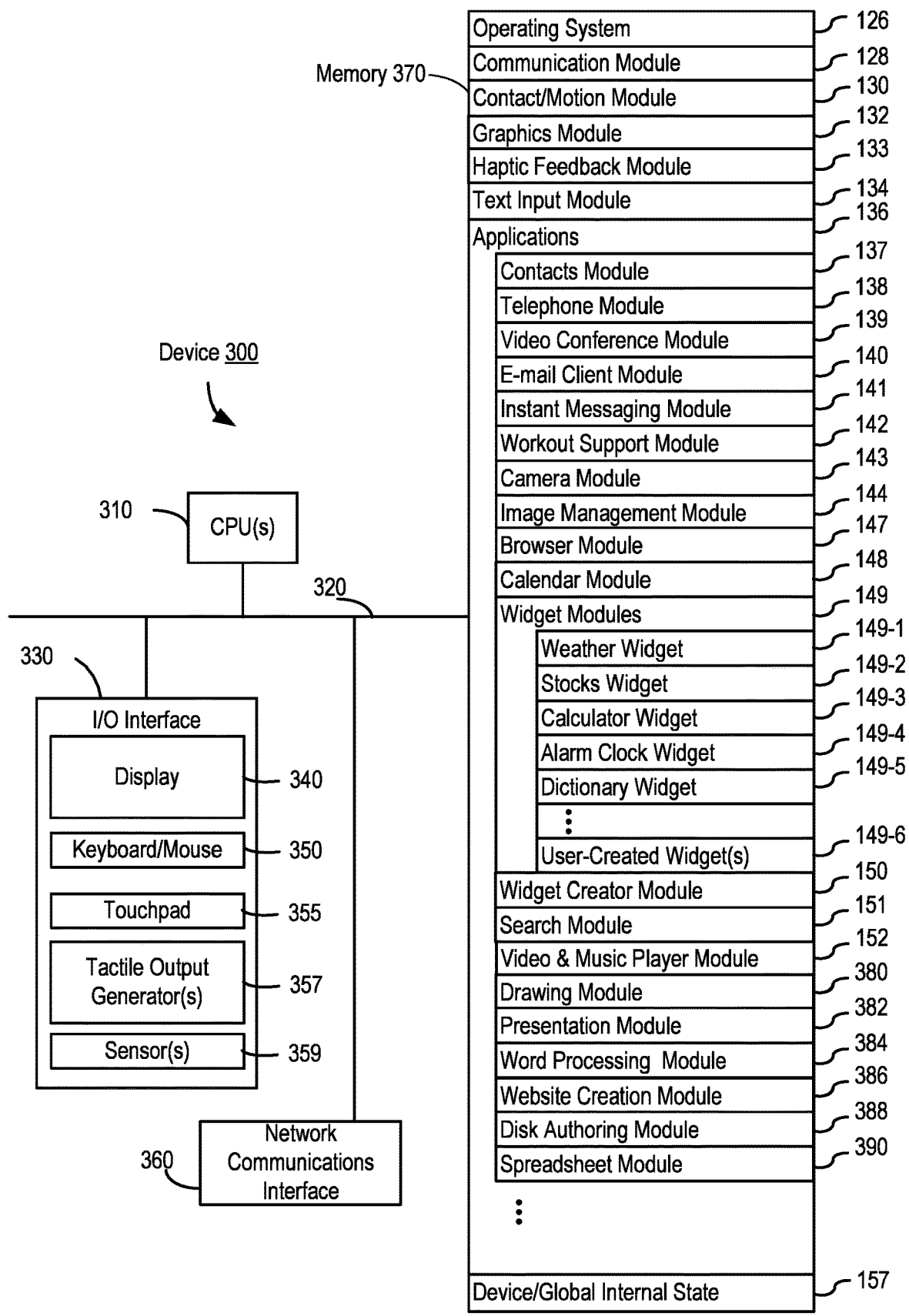
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
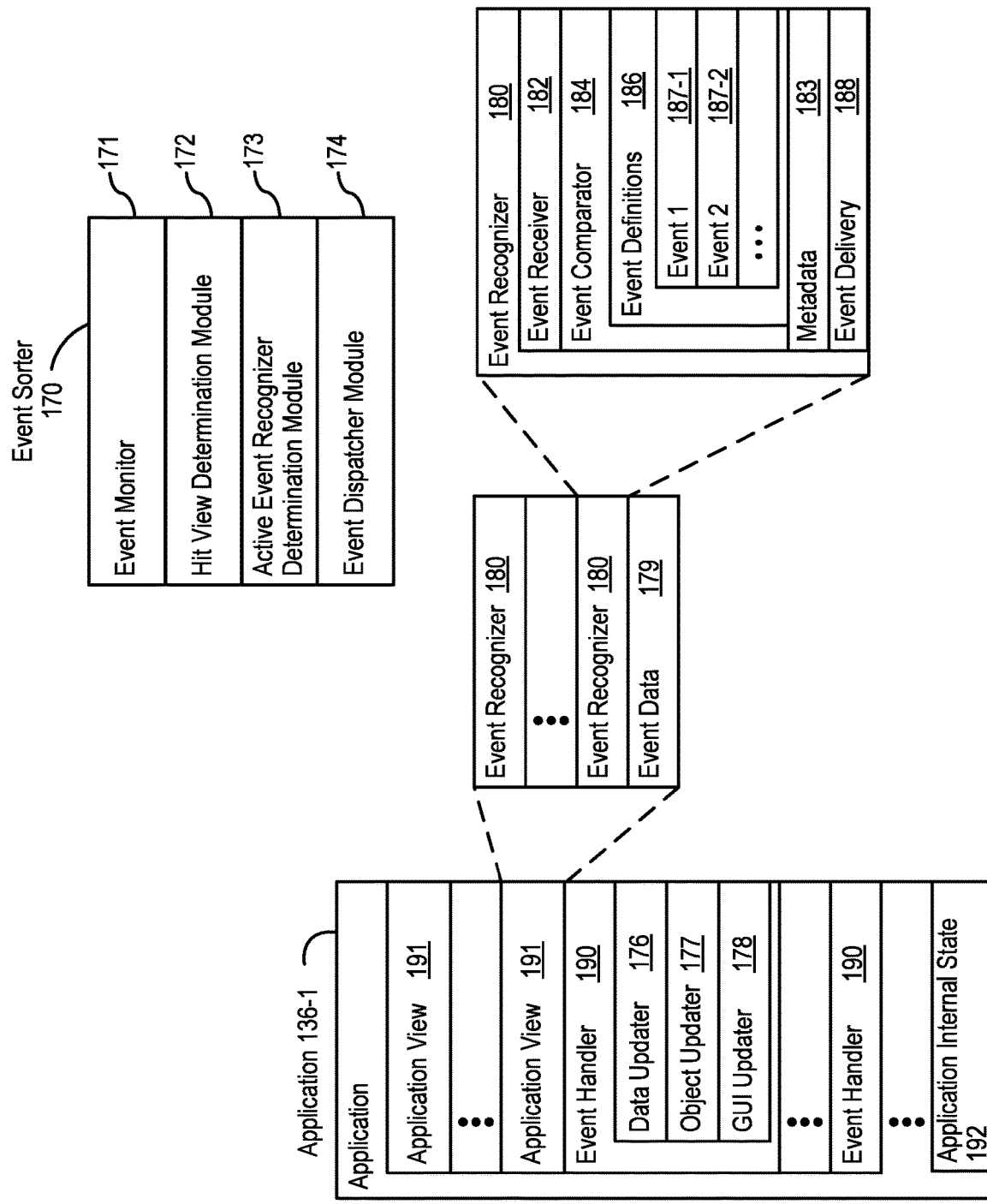
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
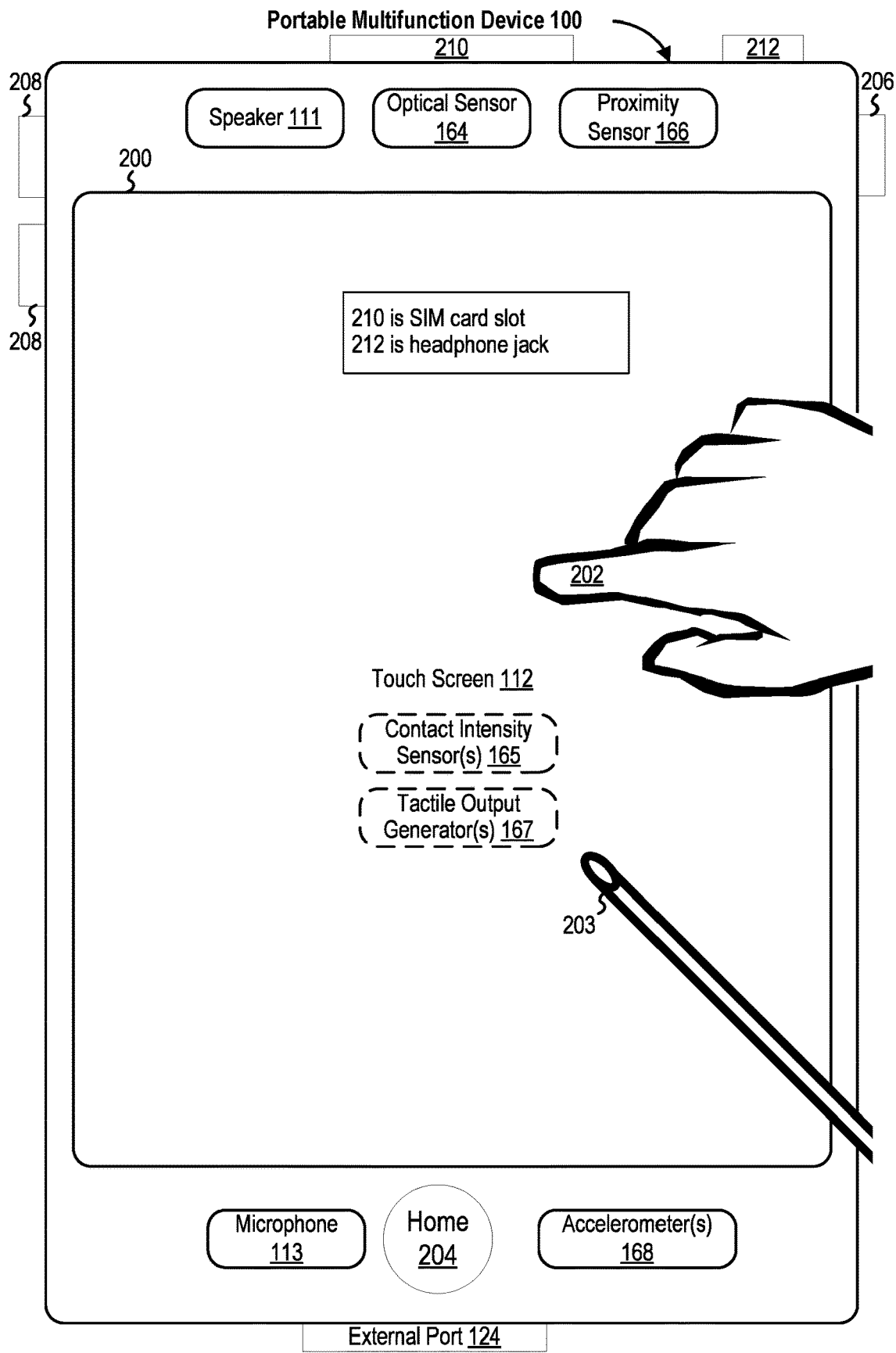
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
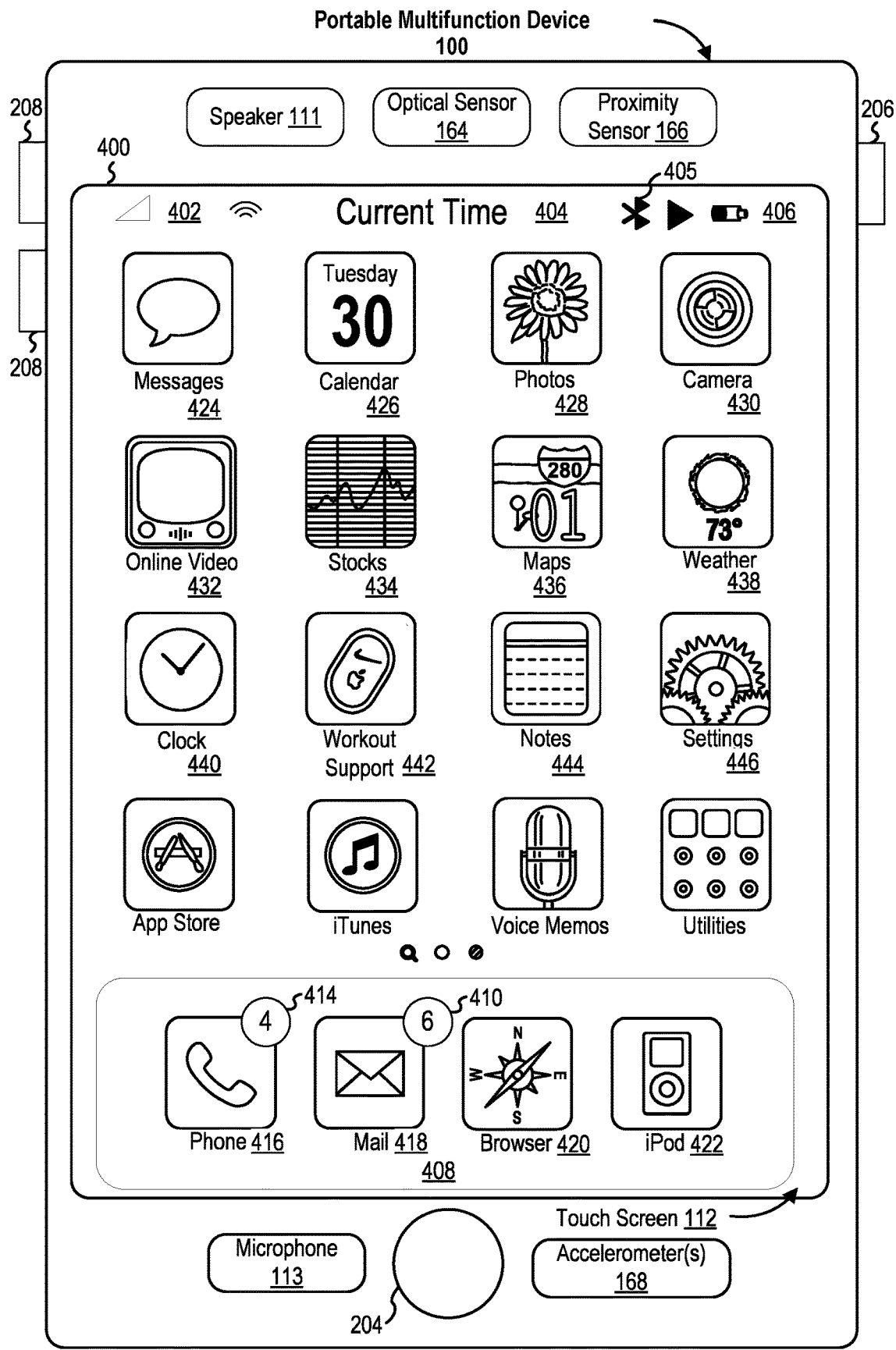
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
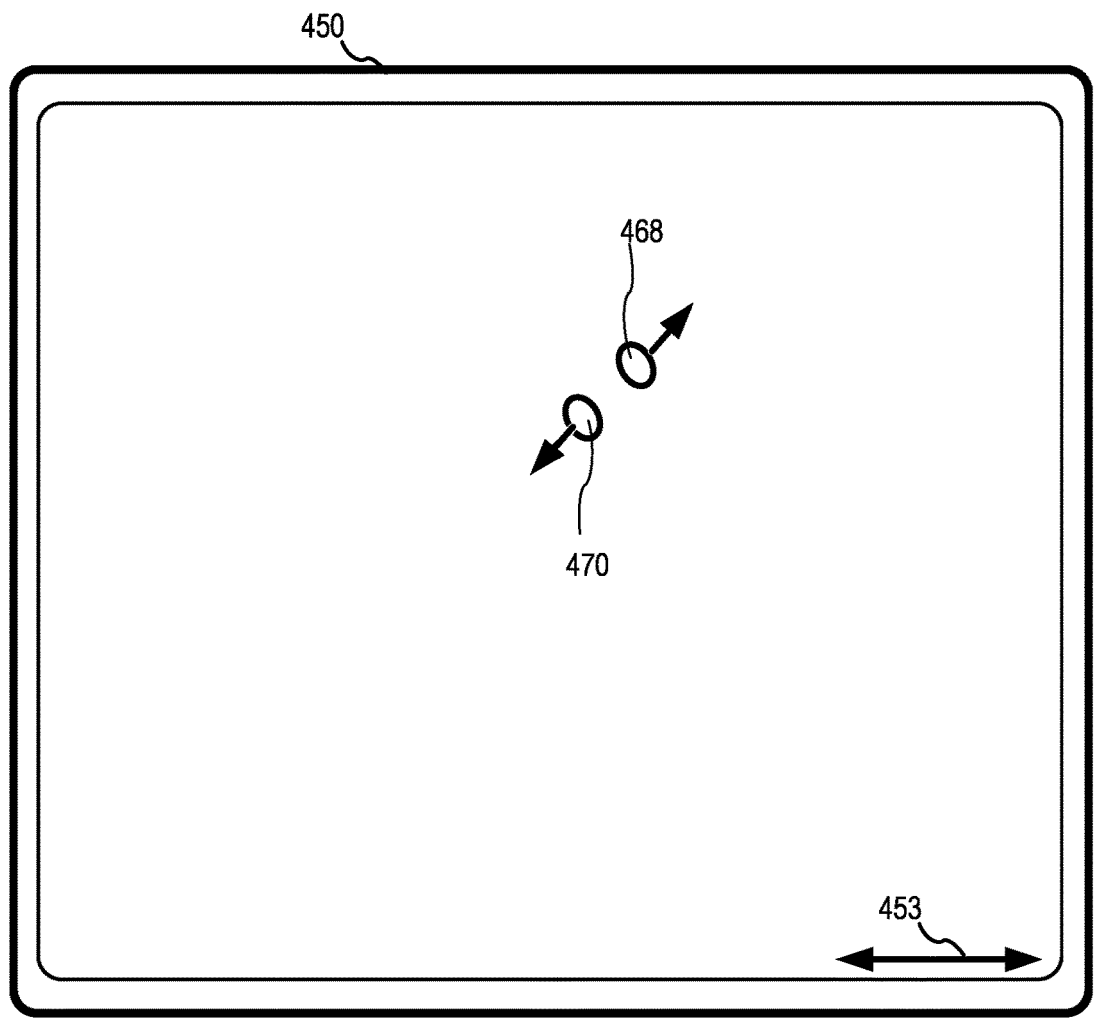
FIG. 4B illustrates an exemplary user interface for a multifunction device with a touch-sensitive surface that is separate from the display in accordance with some embodiments.
Figure 4B:
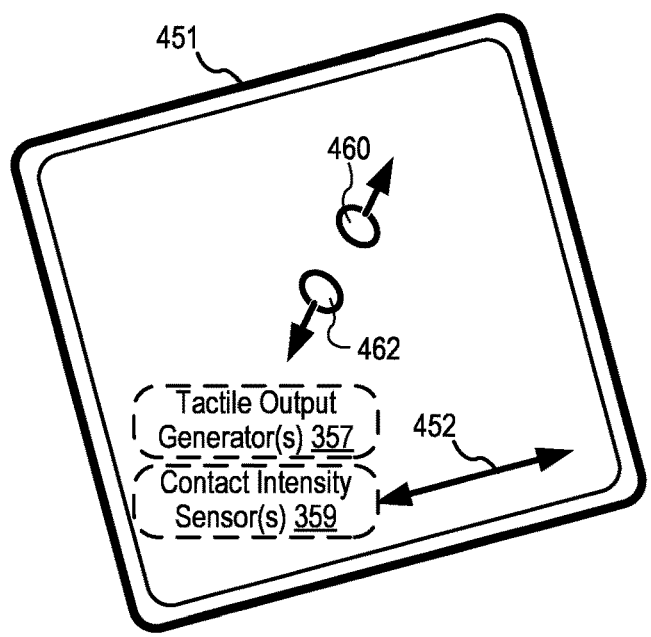

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
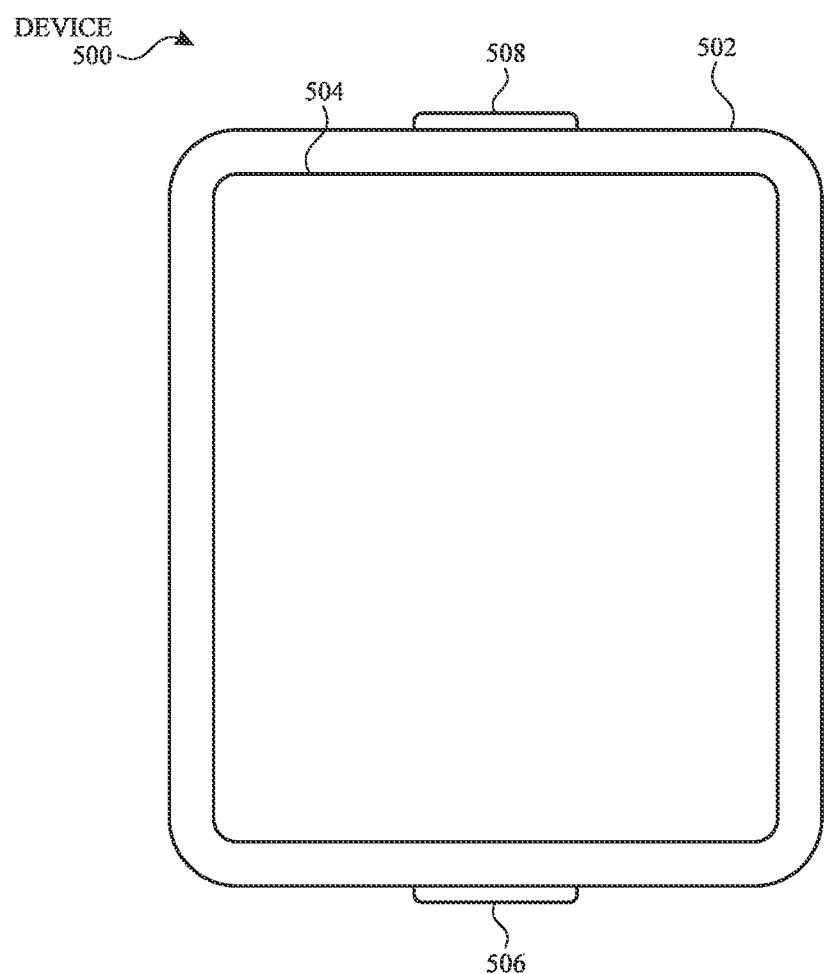
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
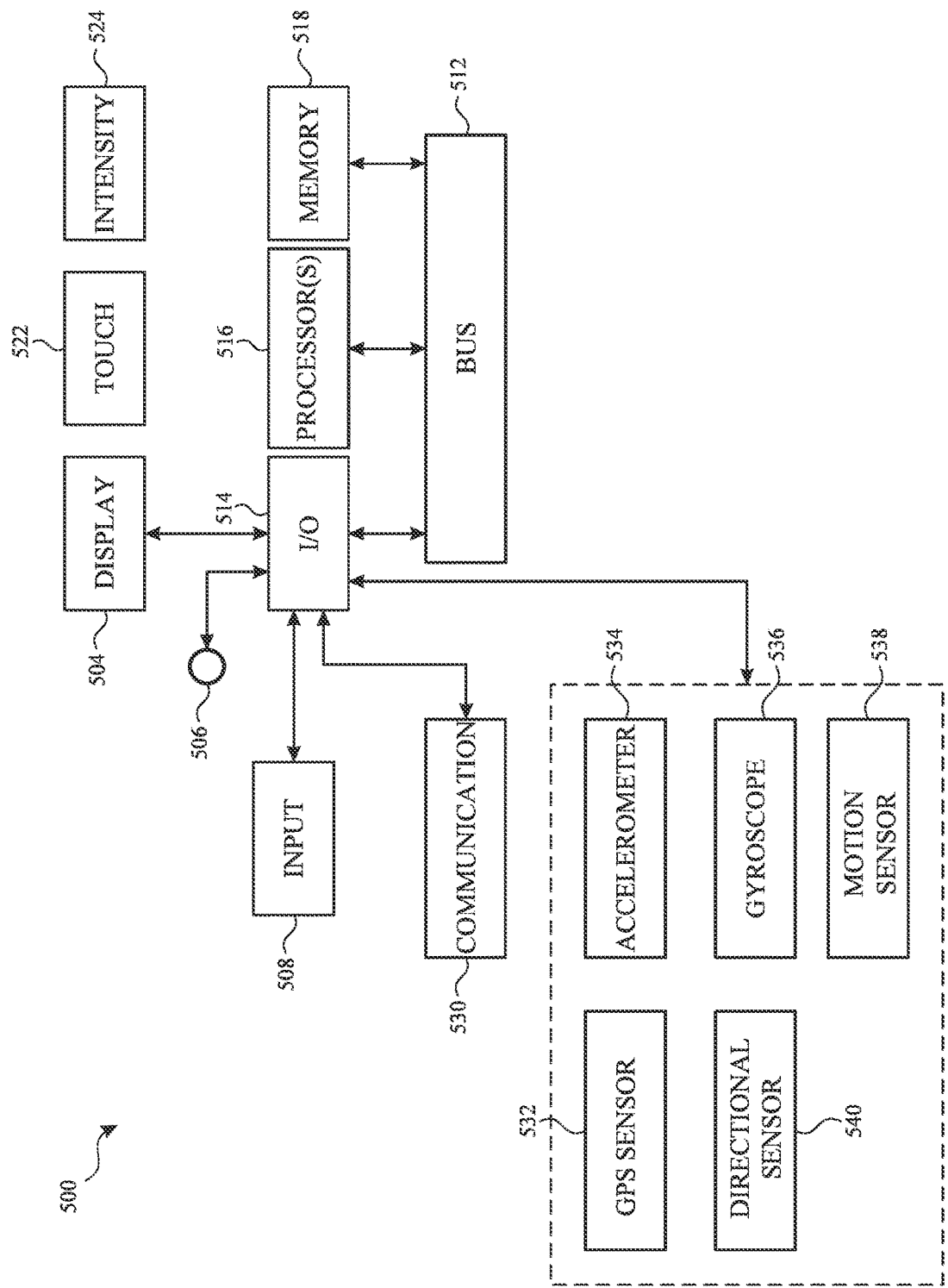
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1000 (FIGS. 7A-7B, 9A-9B, and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UP") and associated processes that are implemented on an electronic device, such as portable multifunction device 100, device 300, or device 500.

FIGS. 6A-6AE illustrate exemplary user interfaces for managing applications for different use contexts in accordance with various embodiments presented herein. The user interfaces in these figures are used to illustrate the processes and techniques described below, including the processes and techniques described by FIGS. 7A-7B.

FIG. 6A illustrates an example user interface 600 for managing applications for different use contexts in accordance with various embodiments presented herein. In some examples, user interface 600 is provided by an electronic device 600A that is in operative communication with a display screen 600B (e.g., a display screen 600B displaying user interface 600). In some embodiments, device 600A and display screen 600B include some or all of the features of device 100, device 300, or device 500, discussed above.

In some embodiments, device 600A is a mobile phone that is in a red (e.g., USB, Lightning) or wireless (e.g., Bluetooth, Wi-Fi) connection with display screen 600B, or with an external electronic device having display screen 600B. In some embodiments, the display screen 600B is provided on a dashboard of an automobile. In some embodiments, the mobile phone (e.g., device 600A) communicates instruction signals for generating user interface 600 at display screen 600B in accordance with various embodiments discussed herein. Further, in some embodiments, user interactions detected at the display screen 600B are communicated to the mobile phone (e.g., device 600A). In some of these embodiments, user interface 600, described herein, is provided at display screen 600B of the electronic device (e.g., device 600A) itself.

As illustrated in FIG. 6A, user interface 600 includes a first portion 602 and a second portion 604. The first portion 602 is provided along a border of the user interface 600 and contains a shortcuts menu 606. Shortcuts menu 606 includes three shortcut affordances 608, 612, and 616. Each shortcut affordance is in a respective shortcut position (e.g., 610, 614, and 618).

In some embodiments, shortcut affordances 608, 612, and 616 belong to different categories of applications. In some embodiments, shortcut affordance 608 belongs to a maps category of applications, shortcut affordance 612 belongs to a music category of applications, and shortcut affordance 616 belongs to a communications (or other) category of applications. Each shortcut affordance launches, activates, or otherwise causes display of its corresponding application in the second portion 604.

The first portion 602 provides status information. Status information includes a current time 620 and network connectivity 622 for device 600A. The first portion also provides icon navigation affordance 626 for navigating between applications and/or pages on user interface 600. While first portion 602 is provided along a vertical border of the user interface 600, in some embodiments, first portion 602 is provided along a horizontal border of user interface 600, such as above or below second portion 604.

Figure 6B:
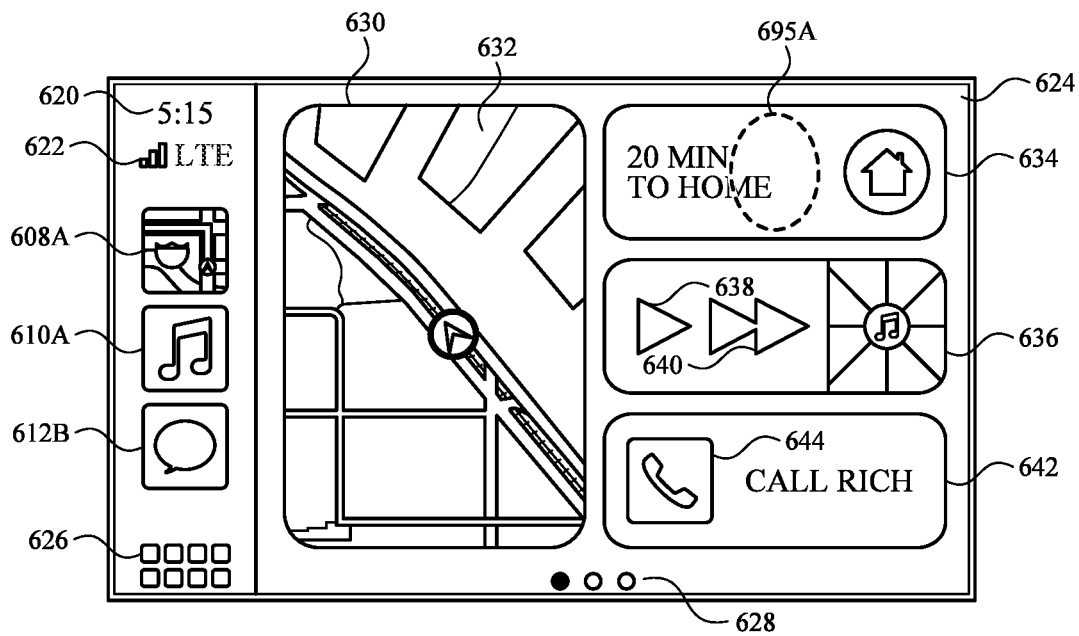

As illustrated in FIG. 6B, device 600A causes display screen 600B to display user interface 600 as dashboard interface 624. For example, device 600A receives input corresponding to a request to display dashboard interface 624 on display screen 600B. In some embodiments, the input corresponds to a request to turn on display screen 600B and/or connect device 600A to display screen 600B. In some of these embodiments, dashboard interface 624 is provided as a launch screen for display screen 600B, so device 600A causes dashboard interface 624 to be displayed on display screen 600B when display screen 600B launches (e.g., wakes or boots up). In some embodiments, dashboard interface 624 is not provided as a launch screen or the first page shown on display screen 600B, as shown by page indicators 628.

Dashboard interface 624 includes three exemplary shortcut affordances (map shortcut affordance 608A at a first position (e.g., 610 in FIG. 6A), music shortcut affordance 610A at a second position (e.g., 612 in FIG. 6A), and communications shortcut affordance 614A at a third position (e.g., 616 in FIG. 6A). Dashboard interface 624 also includes status information. Status information includes current time 620 and network connectivity 622.

Dashboard interface 624 further includes icon navigation affordance 626, a map widget 630, predictive destination widget 634, music playback widget 636, and communication suggestion widget 642. Map widget 630 includes map information 632. Predictive destination widget 634 includes a predicted destination. Music playback widget 636 includes media playback controls, play affordance 638 and fast forward affordance 640. And communication suggestion widget 642 performs a communication function. The communication function is associated with an application associated with communication application 644.

Predictive destination widget 634 and communication suggestion widget 642 are caused to be displayed (or caused to cease to be displayed) based on one or more use contexts of device 600A. A use context, for example, can include one or more states of device 600A (e.g., the location of the electronic device). In some embodiments, use contexts are determined by device 600A and/or one or more other devices (e.g., one or more servers). However, for simplicity of explanation, the foregoing description will only refer to device 600A as making the determination of the one or more use contexts.

In some embodiments, device 600A causes predictive destination widget 634 and communication suggestion widget 642 to be displayed or cease to be displayed based on a determination of one or more use contexts of device 600A.

In some embodiments, communication suggestion widget 642 shows an indication to "Call Rich" based on a use context of device 600A. The use context is based on device 600A determining that "Rich" is a favorite contact associated with device 600A. In some embodiments, one or more widgets including map widget 630 and music playback widget 636, are not displayed based on one or more use contexts, and therefore, device 600A's use contexts have no effect on how map widget 630 or music playback widget 636 is displayed.

As illustrated in FIG. 6B, while displaying dashboard interface 624, device 600A detects input 695A on predictive destination widget 634.

Figure 6C:
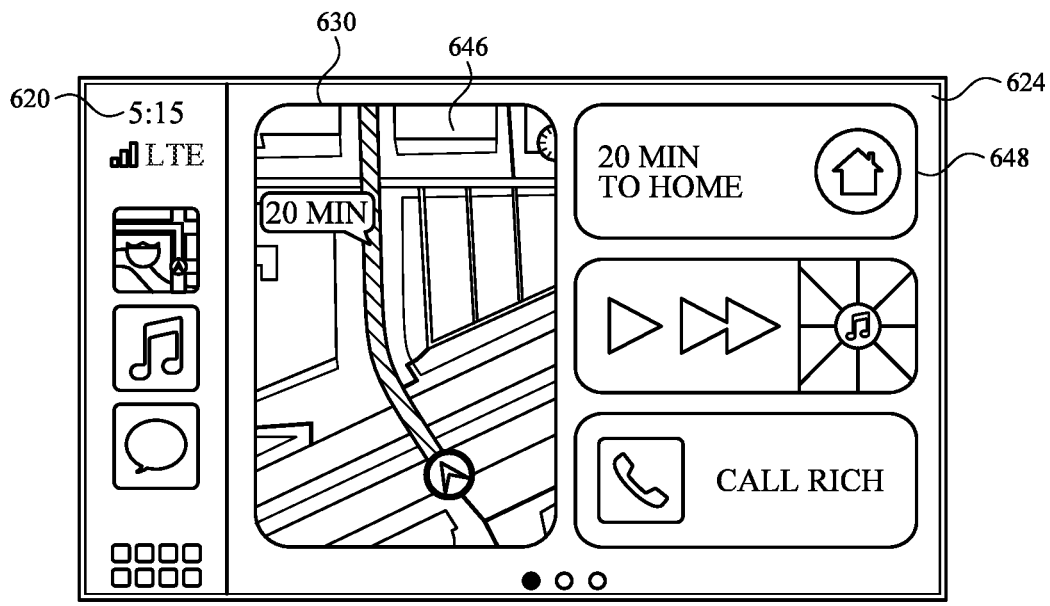

As illustrated in FIG. 6C, in response to detecting input 695A, device 600A causes map widget 630 to display map information 646. Map information 646 includes route information and navigation status information (e.g., "20 min to home"). Map information 646 is different from map information 632 because it includes route information. Route information is information, such as the directional arrow shown in FIG. 6C that updates based on the movement of device 600A. In other words, in response to detecting input 695A, device 600A updates map widget 630 to provide navigation information for a user of device 600A to navigate to the predicted destination.

Moreover, updating map widget 630 to display map information 646, makes device 600A operate in a new use context. Before updating map widget 630, device 600A operated in a non-navigational mode. When route information is displayed, however, device 600A operates in a navigational mode. In response to operating in the navigational mode, device 600A causes to be displayed an estimated time of arrival ("ETA") widget 648. ETA widget 648 includes information showing the ETA to a location. Here, in FIG. 6C, the ETA widget 648 shows that device 600A is twenty minutes from home (e.g., a home location) and has replaced predictive destination widget 634.

Figure 6D:
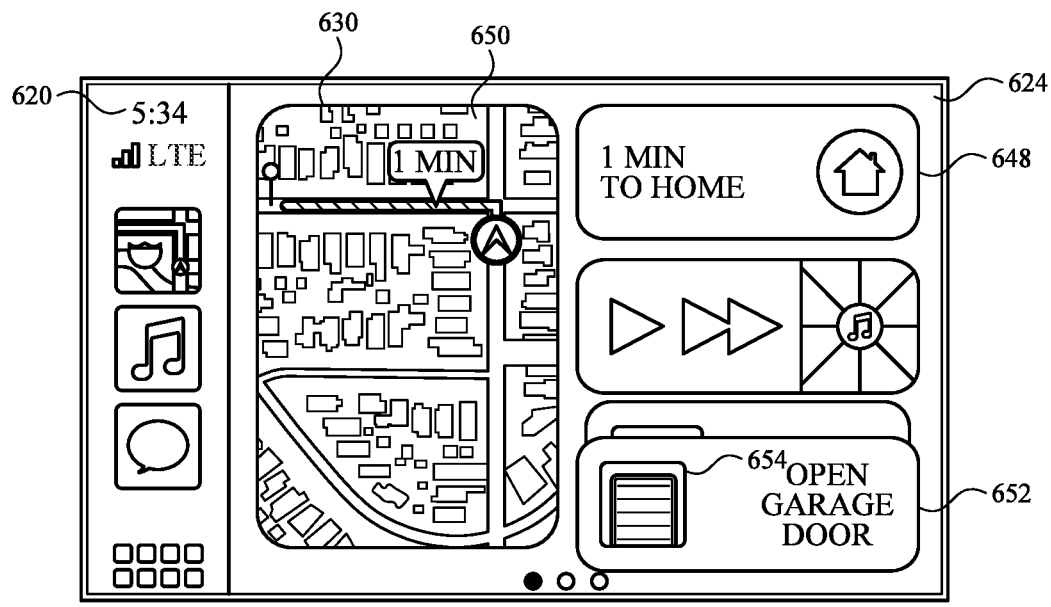

Nineteen minutes later, as illustrated in FIG. 6D, device 600A is one minute from reaching home (e.g., a location associated with the name "home"). When device 600A is within a predetermined distance (e.g., 5 miles) or time (e.g., 1 minute) away from home, device 600A begins operating in a new use context. Therefore, in accordance with a determination that device 600A is a predetermined distance or time away from home, device 600A causes garage door widget 652 to be displayed to perform a door opening function, via garage door application icon 654. Further, as illustrated in FIG. 6D, device 600A causes an animation to be displayed of garage door widget 652 sliding up or being placed on top of communication suggestion widget 642.

Figure 6E:
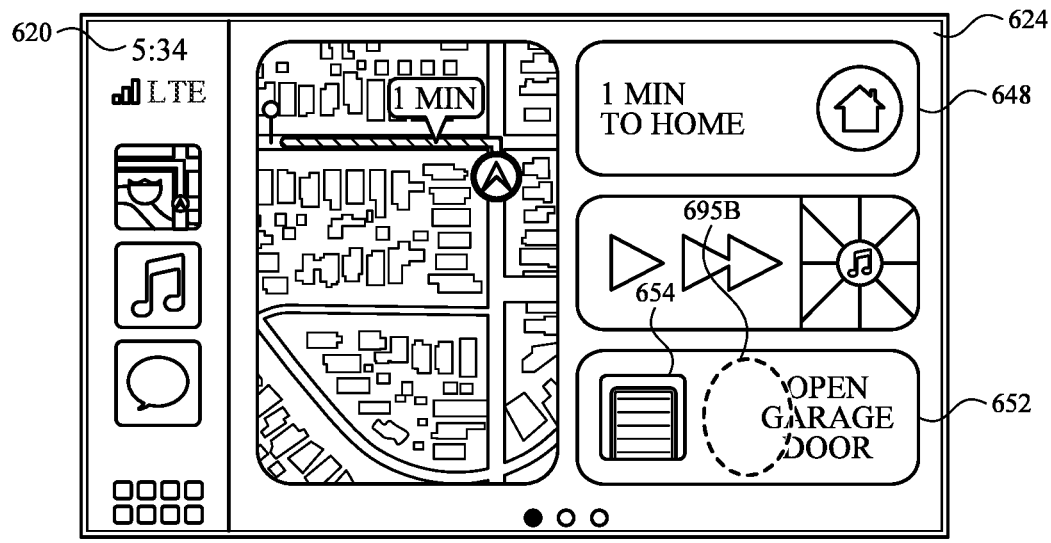

As illustrated in FIG. 6E, the animation has completed, and device 600A causes garage door widget 652 to be displayed. While displaying garage door widget 652, device 600A detects input 695B on garage door widget 652. In response to detecting input 695B, device 600A causes a garage door to open at the home location. Here, garage door widget 652 performs the function of opening the garage door without causing to be displayed, on the display screen 600B, without causing to be displayed a discrete user interface of an application represented by garage door application icon 654).

Figure 6F:
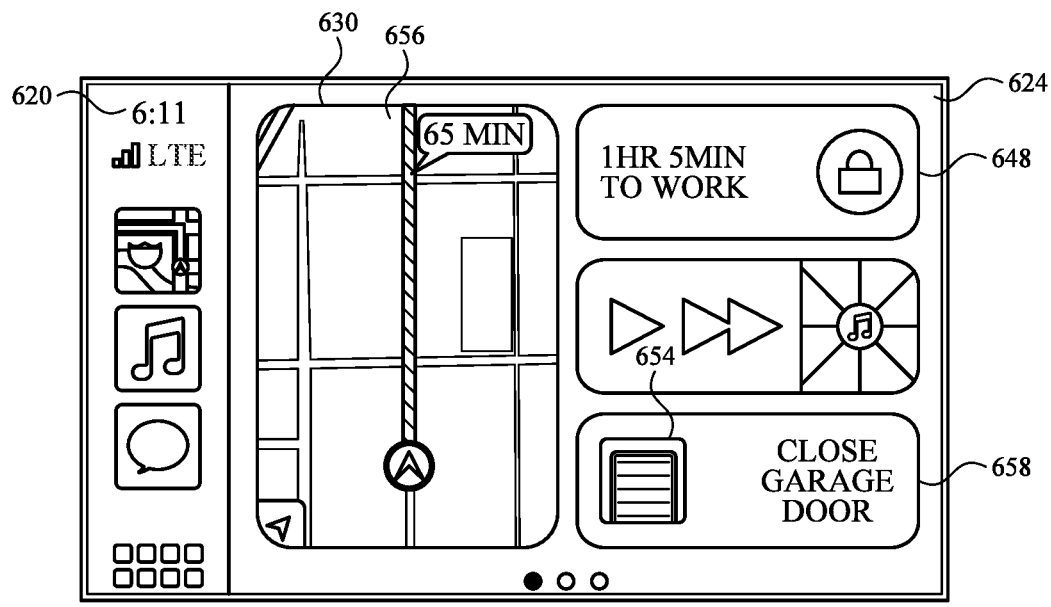

As illustrated in FIG. 6F, device 600A is operating in another use context. Device 600A is leaving home and header to work (e.g., a work location). Therefore, in accordance with a determination that device 600A is a predetermined distance or time away from home, device 600A causes garage door widget 658 to be displayed. Garage door widget 658, or a modified version of garage door widget 652, performs a door closing function.

Figure 6G:
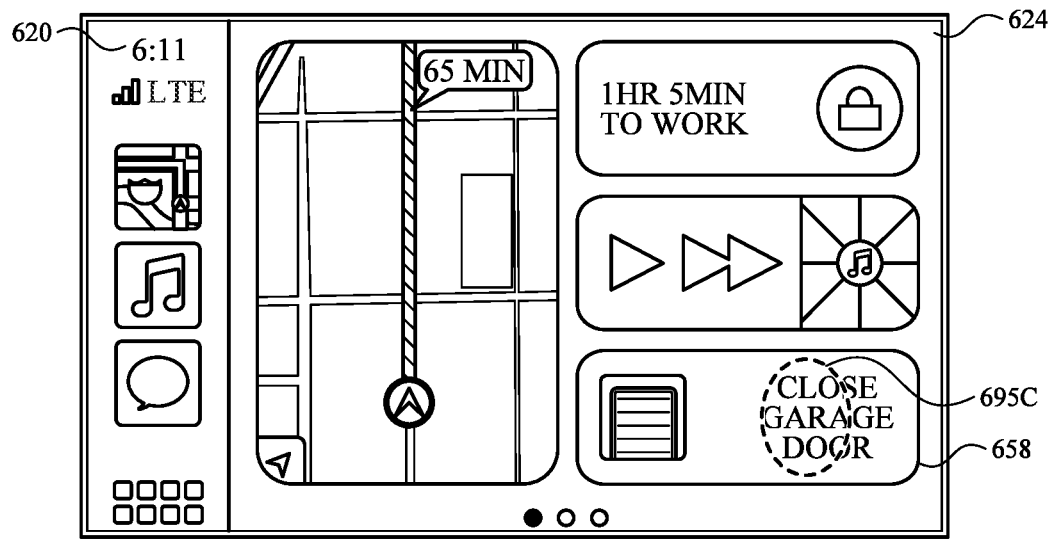

As illustrated in FIG. 6G, while displaying garage door widget 658, device 600A detects input 695C on garage door widget 658. In response to detecting input 695C, device 600A causes a garage door to close at the home location. Here, garage door widget 658 causes the garage door to close.

Figure 6H:
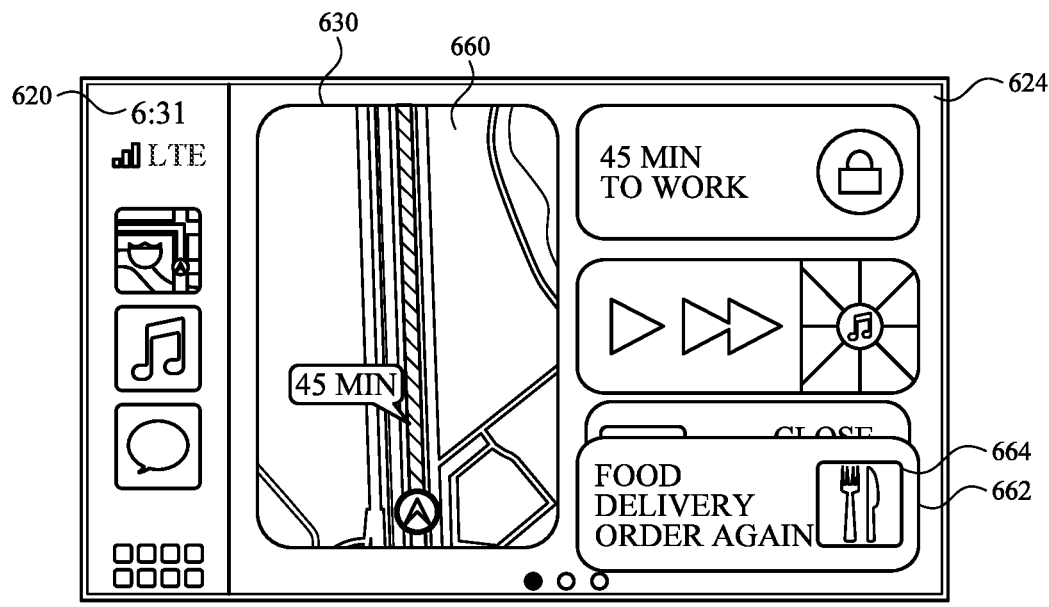

As illustrated in FIG. 6H, device 600A has traveled thirty minutes away from home and is within forty-five minutes from work. During this time, device 600A has begun operating in another use context because device 600A is departing home at a predetermined time (e.g., or range of time). Therefore, in accordance with a determination that device 600A is departing a location at a predetermined time, device 600A causes restaurant widget 662 to be displayed. Restaurant widget 662 performs a function that orders food from a restaurant.

While restaurant widget 662 is displayed in FIG. 6H, in some embodiments, one or more other delivery or ordering widgets associated with one or more other types of businesses (e.g., department stores) are displayed. Moreover, in some other embodiments, a widget associated with an activity (e.g., playing a sport) or a suggested event (e.g., a sports game) are displayed.

Figure 6I:
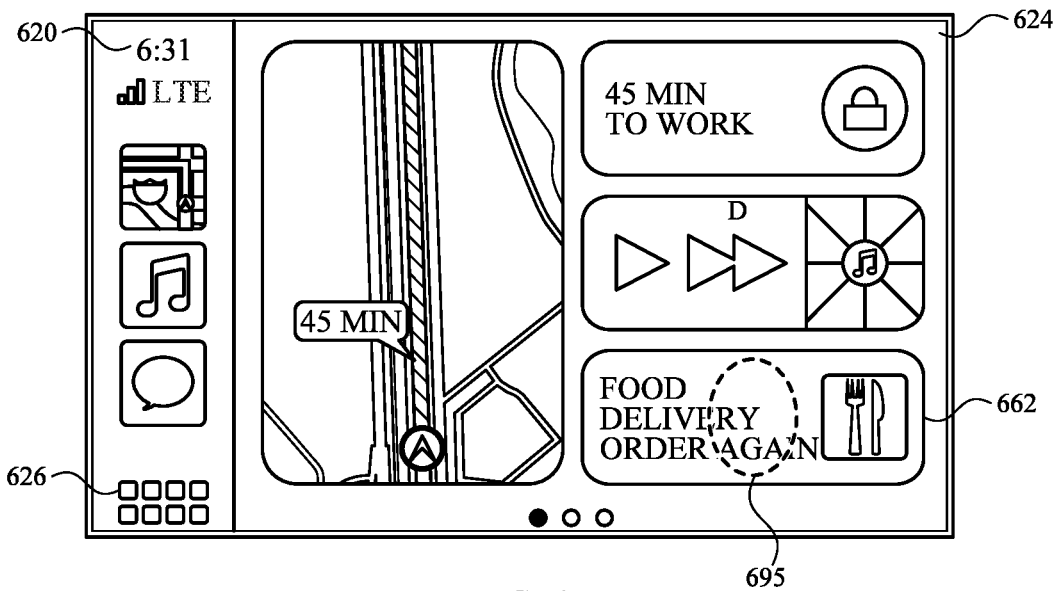

As illustrated in FIG. 6I, device 600A causes restaurant widget 662 to be displayed. Moreover, while displaying restaurant widget 662, device 600A detects input 695D on restaurant widget 662.

Figure 6J:

As illustrated in FIG. 6J, in response to detecting input 695D, device 600A causes restaurant interface 666 to be displayed. Here, device 600A causes restaurant interface 666 to replace dashboard interface 624. In some embodiments, in response to detecting input 607D, device 600A causes an order to be placed at a restaurant without causing restaurant interface 666 to be displayed.

As illustrated in FIG. 6J, while displaying the restaurant interface 666, device 600A causes dashboard navigation affordance 668 to be displayed. Icon navigation affordance 626 and dashboard navigation affordance 668 are different affordances. For example, icon navigation affordance 626 (as shown, for example, in FIG. 6J) includes an indication of an icon interface while dashboard navigation affordance 668 includes an indication of a dashboard interface 624. In addition, dashboard navigation affordance 668 allows for navigation to the dashboard interface 624 while icon navigation affordance 626 allows for navigation to an icon interface.

In some embodiments, dashboard navigation affordance 668 is not displayed while dashboard interface 624 is displayed. In some embodiments, icon navigation affordance 626 is only displayed when the dashboard interface 624 is displayed.

Figure 6K:
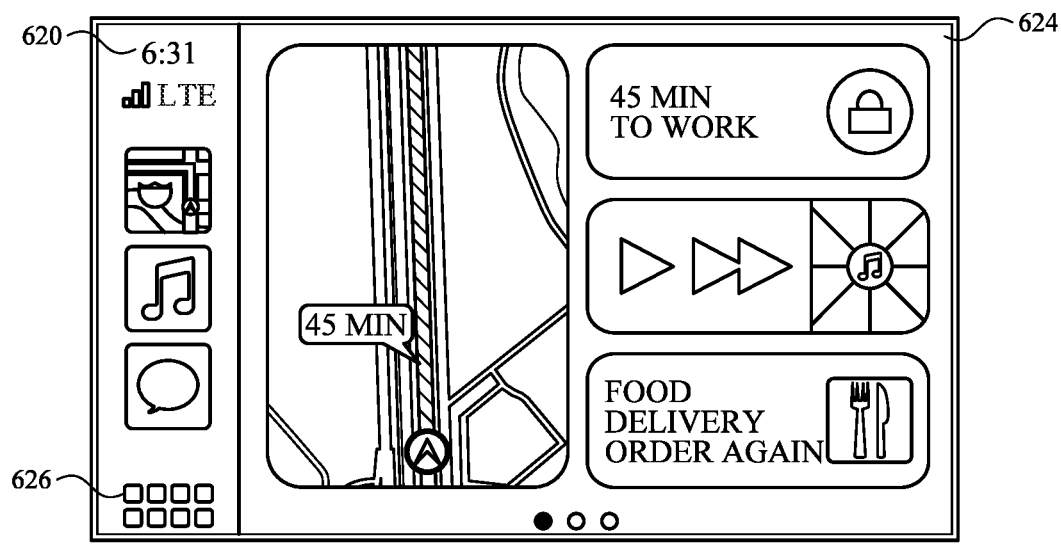

While displaying dashboard navigation affordance 668, device 600A detects input 695E on the dashboard navigation affordance 668. As illustrated in FIG. 6K, in response to detecting input 695E on dashboard navigation affordance 668, device 600A causes dashboard interface 624 to be redisplayed.

Figure 6L:
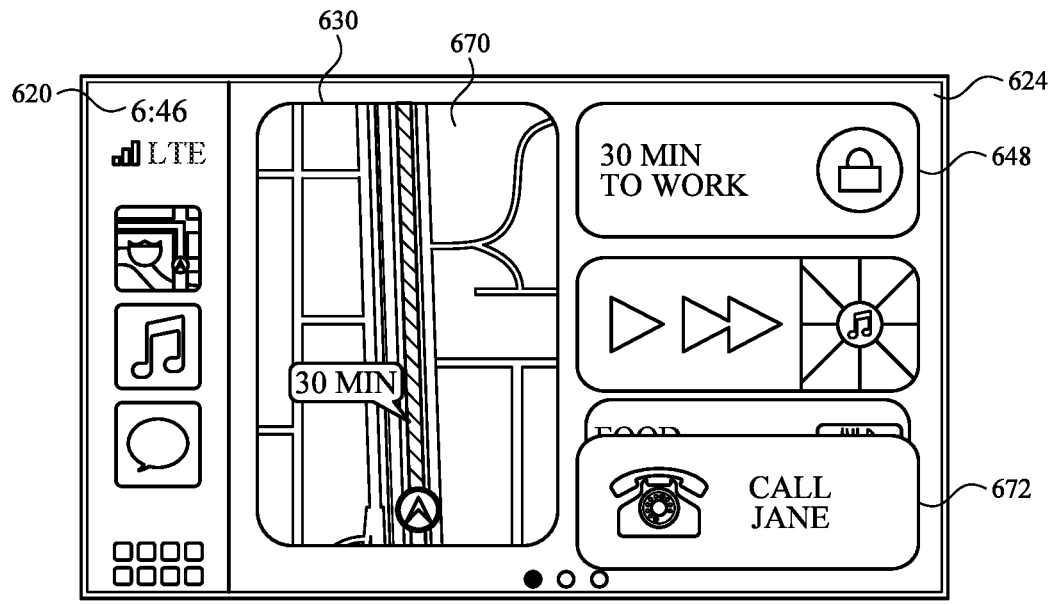

As illustrated in FIG. 6L, after moving 15 more minutes towards work, device 600A has traveled 45 minutes away from home and is within 30 minutes from work. During this time, device 600A begins operating in another use context because device 600A has identified a contact ("Jane") that is associated with an upcoming meeting event.

As illustrated in FIG. 6L, device 600A causes to be displayed communication suggestion widget 672 for calling Jane using an application associated with communication application icon 674. Here, notably, communication application icon 674 is different from communication application icon 644. Thus, communication suggestion widget 672 can use a different application to communicate with a contact than communication suggestion widget 642.

Communication suggestion widget 672 is also from the same category of applications (e.g., a communications category) as a shortcut affordance 616 (e.g., a messaging shortcut affordance). However, communication suggestion widget 672 is associated with a different application in the communications category of applications than the shortcut affordance 616. In other words, device 600A cause a widget that corresponds (or performs a function that corresponds) to a different function of the same category of application to be displayed.

In some embodiments, when device 600A causes the function associated with the widget (e.g., via an input on the widget) to be performed, device 600A will cause an application associated with the widget to replace the application with the shortcut affordance in the same category of applications. In some embodiments, device 600A will not, and the application associated with the shortcut affordance in the same category of applications will be maintained.

Figure 6M:
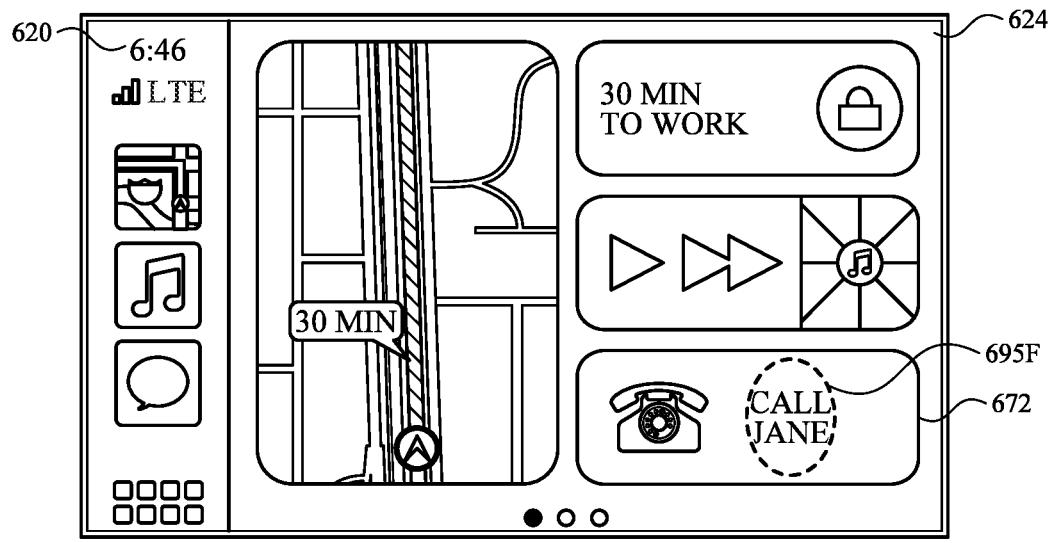

As illustrated in FIG. 6M, the animation has completed, and device 600A causes communication suggestion widget 672 to be displayed. Moreover, while displaying communication suggestion widget 642, device 600A detects input 695F on communication suggestion widget 672. In response to detecting input 695F, device 600A causes communication suggestion widget 672 to call a predetermined telephone number to contact Jane. Here, communication suggestion widget 672 performs a function without causing to be displayed communication application that is associated with communication suggestion widget 642 (other embodiments can also occur as discussed above in relation to garage door widget).

Figure 6N:
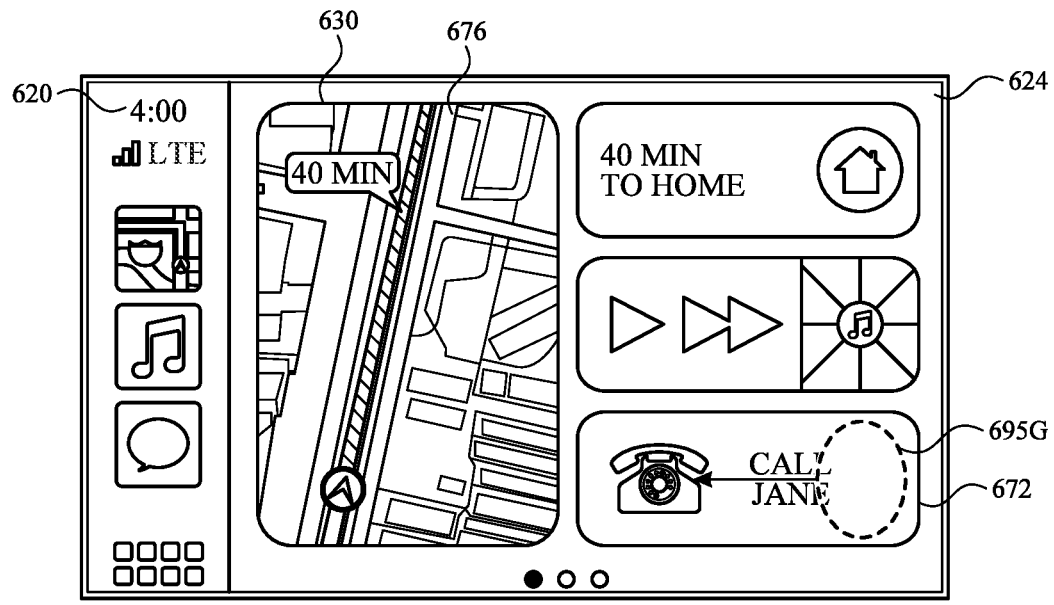

Device 600A has the capability of allowing previous widgets to be accessed, as illustrated in FIGS. 6N-6Q. As illustrated in FIG. 6N, device 600A is moving towards home. Device 600A is causing to be displayed communication suggestion widget 672. While causing communication suggestion widget 672 to be displayed, device 600A detects input 695G on communication suggestion widget 672.

Figure 6O:
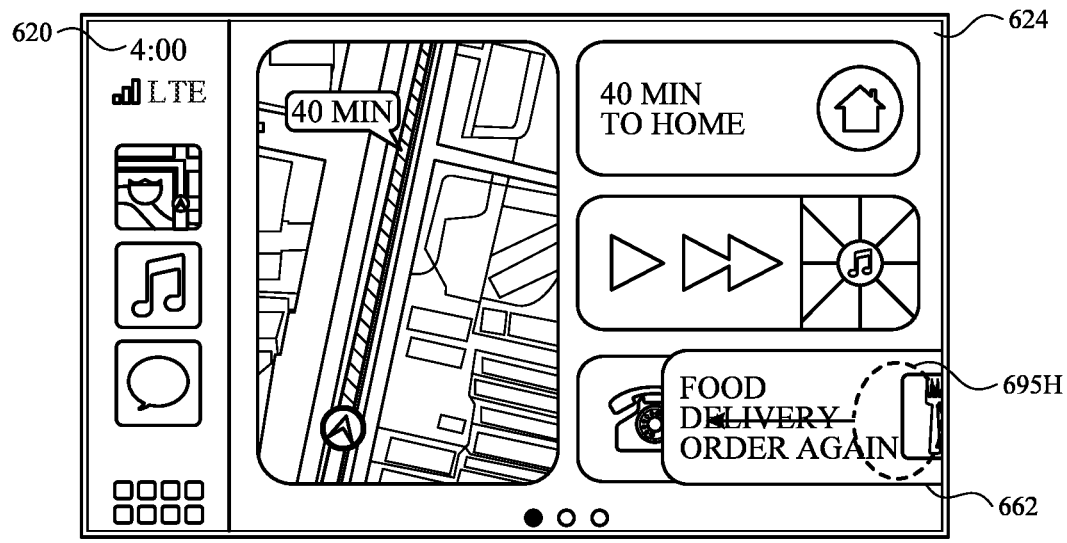

As illustrated in FIG. 6O, in response to detecting input 695G, device 600A causes restaurant widget 662 to be displayed, which device 600A caused to be displayed prior to communication suggestion widget 672. While causing restaurant widget 662 to be displayed, device 600A detects input 695H on restaurant widget 662.

Figure 6P:
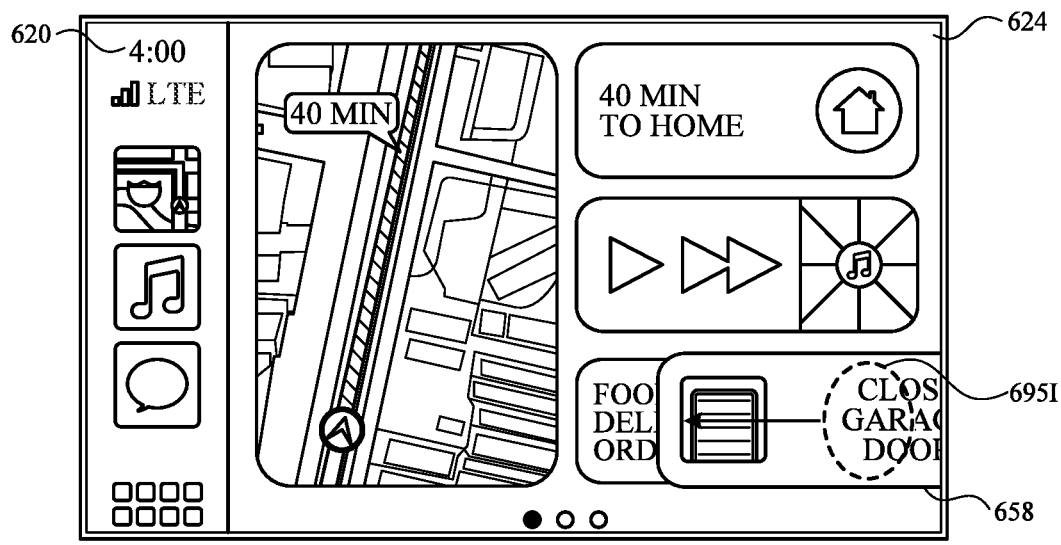

As illustrated in FIG. 6P, in response to detecting input 695H, device 600A causes garage door widget 658 to be displayed, which device 600A caused to be displayed prior to restaurant widget 662. While causing garage door widget 658 to be displayed, device 600A detects input 695I on garage door widget 658.

Figure 6Q:
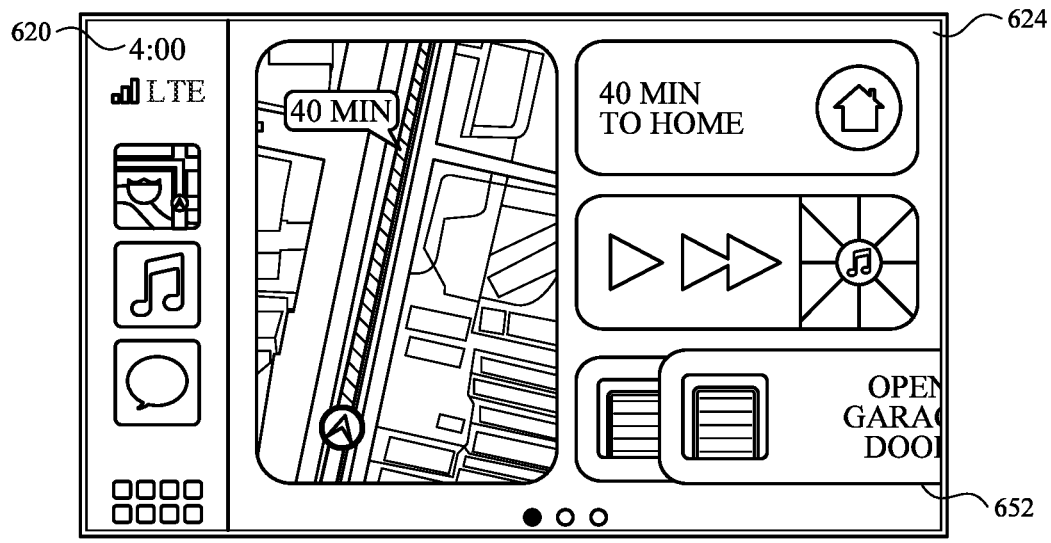

As illustrated in FIG. 6Q, in response to detecting input 695I, device 600A causes garage door widget 652 to be displayed, which device 600A caused to be displayed prior to garage door widget 658.

Figure 6R:
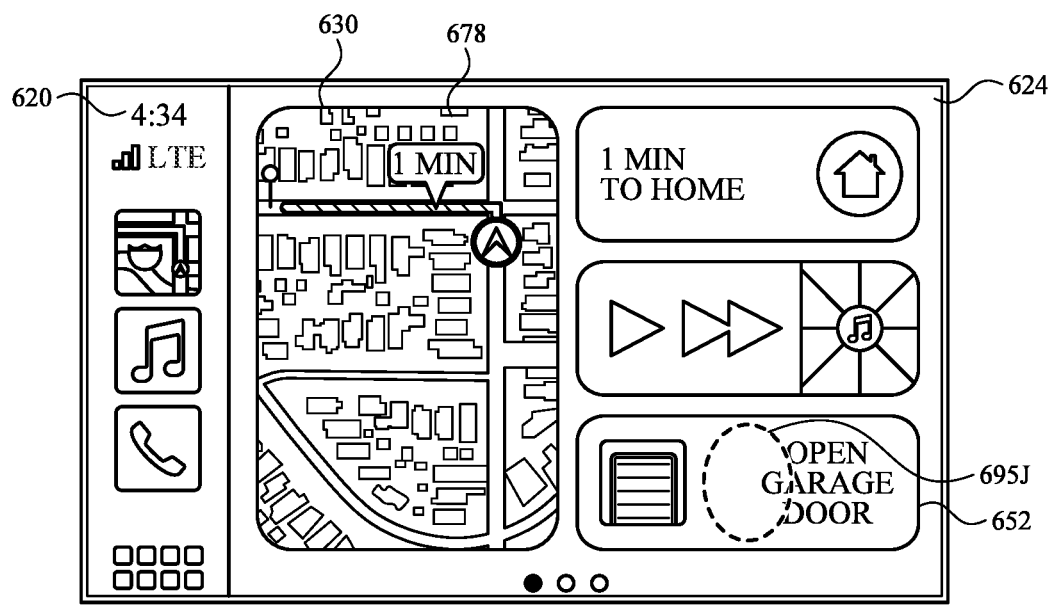

As illustrated in FIG. 6R, when device 600A is 1 minute away from home, device detects input 695J. In response to detecting input 695J, device 600A causes a garage door at the home location to open.

Figure 6S:
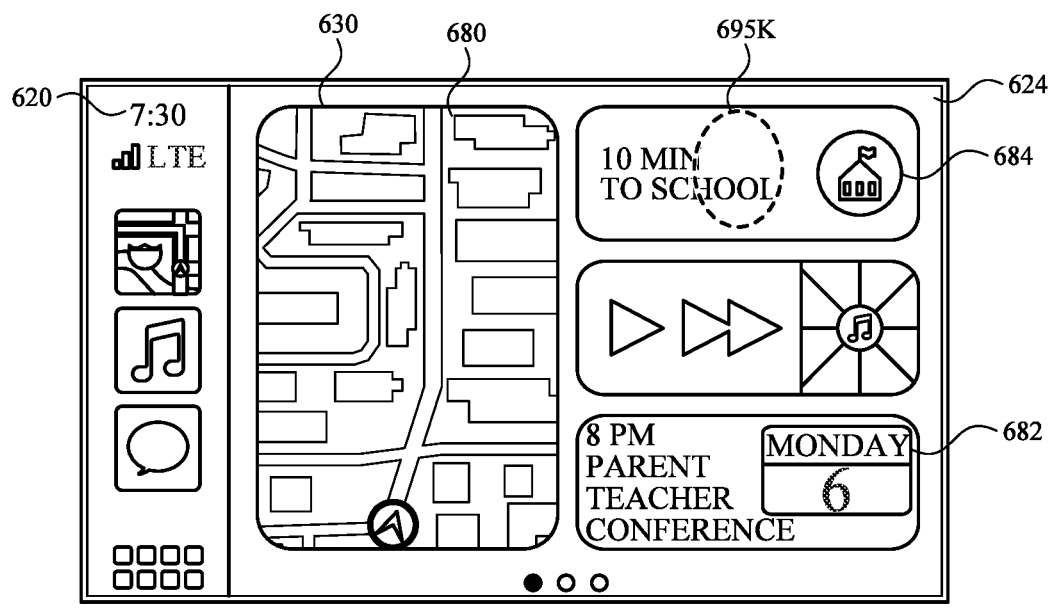

As illustrated in FIG. 6S, device 600A is operating in another use context because device 600A is leaving from home. In response to being this use context, device 600A causes calendar widget 682 to be displayed. Calendar widget 682 can be displayed when a use context includes the device 600A departing a location by a predetermined time or distance.

Moreover, device 600A also causes predictive destination widget 686 to be displayed since device 600A is operating in a non-navigational mode. Predictive destination widget 686 indicates that device 600A is 10 minutes from a predicted destination ("school"). While displaying predictive destination widget 684, device 600A detects input 695K on predictive destination widget 684.

Figure 6T:
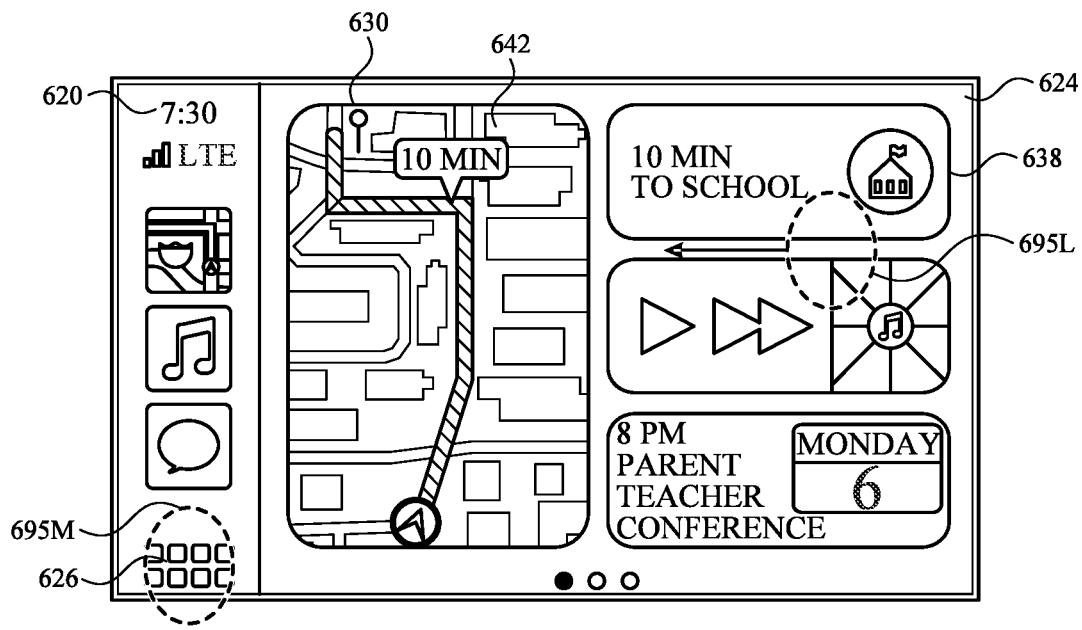

As illustrated in FIG. 6T, in response to detecting input 695K, device 600A causes map widget 630 to display map information 682. In addition, icon navigation affordance 626 is also caused to be displayed. While displaying icon navigation affordance 626, device 600A detects input 695L on dashboard interface 624 and/or input 695M on icon navigation affordance 626. Either input can correspond to a request to navigate to another page of user interface 600.

Figure 6U:
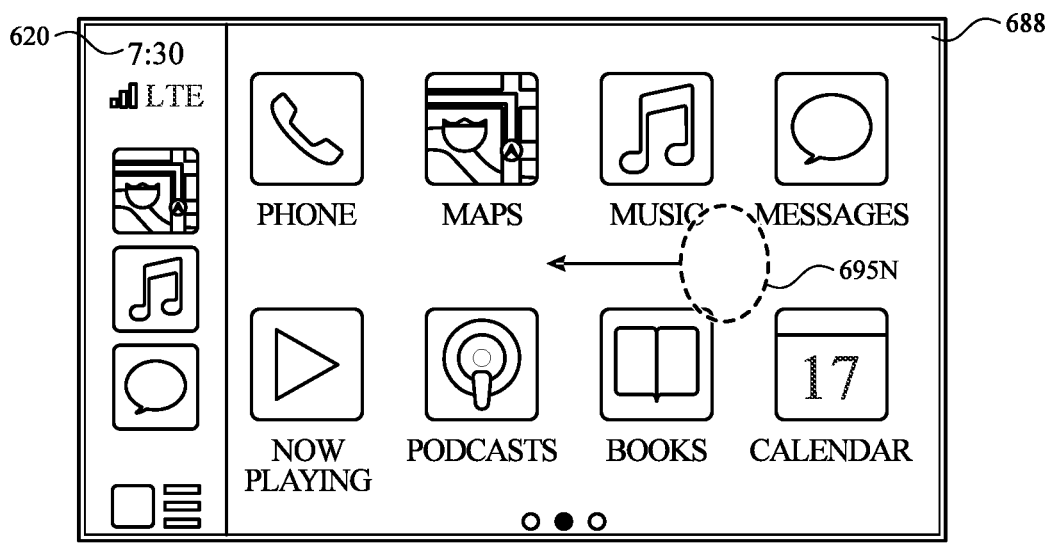

As illustrated in FIG. 6U, in response to detecting input 695L, device 600A causes to be displayed icon interface 688. Icon interface 688 can include a first group of icons corresponding to different applications that device 600A can cause to be displayed on user interface 600. Moreover, in response to detecting input 695L, device 600A causes dashboard navigation affordance 668 to be displayed. While displaying the first plurality of icons, device 600A detects input 695N on icon interface 688.

Figure 6V:
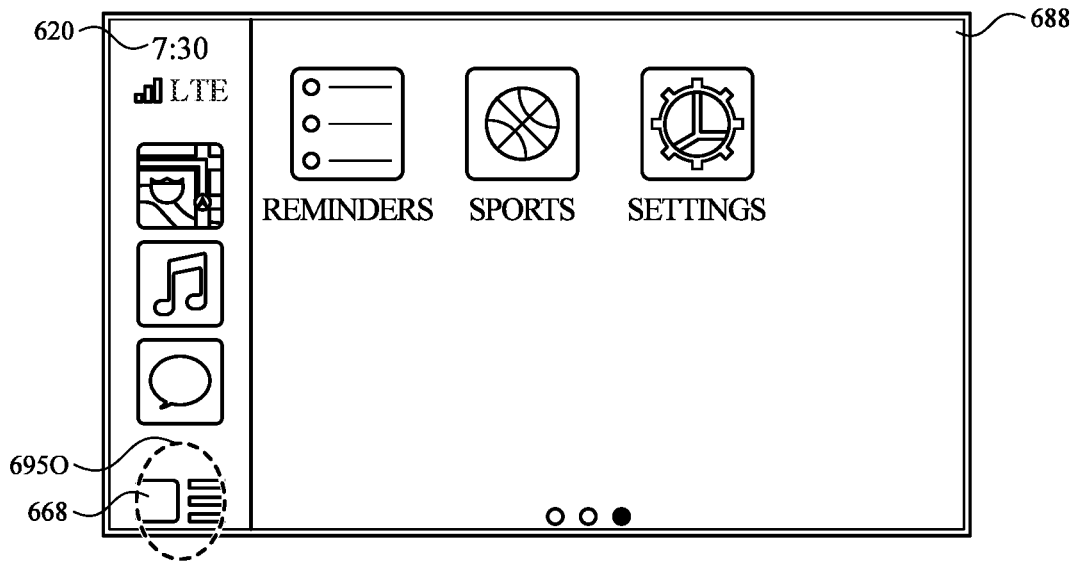

As illustrated in FIG. 6V, in response to detecting input 695N, device 600A causes to be displayed a second group of icons corresponding to different applications. The second group of icons can be different than the first group of icons. The second group of icons are displayed on a second page of the icon user interface 688 or third page of user interface 600 (as shown by page indicators 628). In some embodiments, more pages of icons can be shown in response to one or more additional inputs.

Further, as illustrated in FIG. 6V, dashboard navigation affordance 668 is maintained. While displaying dashboard navigation affordance 668, device 600A detects input 695O on dashboard navigation affordance 668.

Figure 6W:
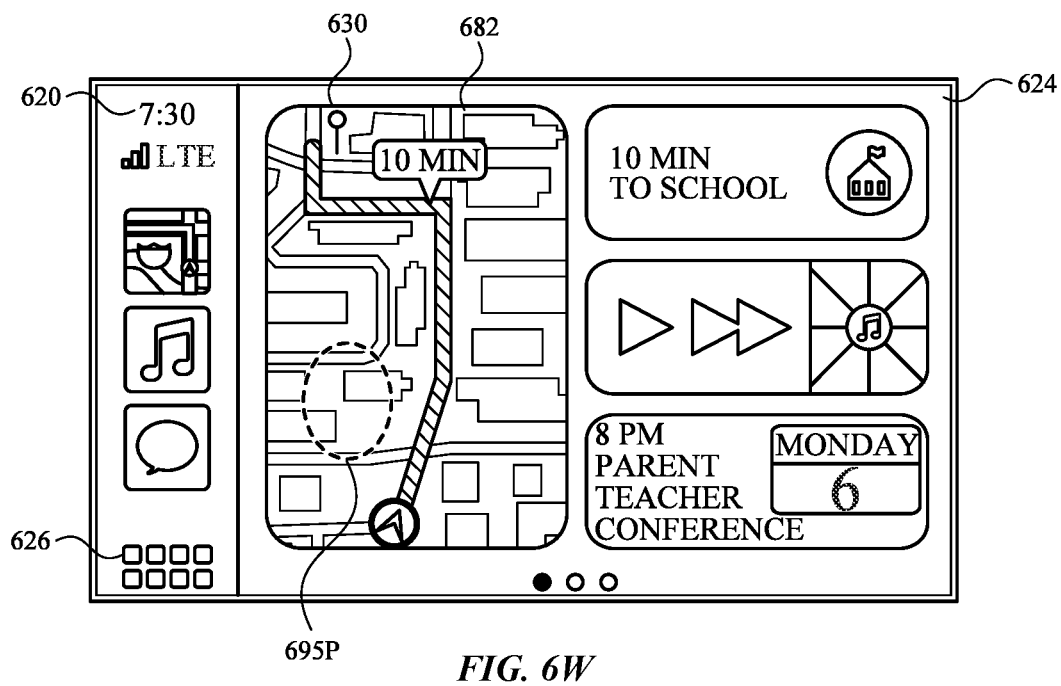

As illustrated in FIG. 6W, in response to detecting input 695O, device 600A displays dashboard interface 624. While displaying dashboard interface 624, device 600A detects input 695P on map widget 630.

Figure 6X:
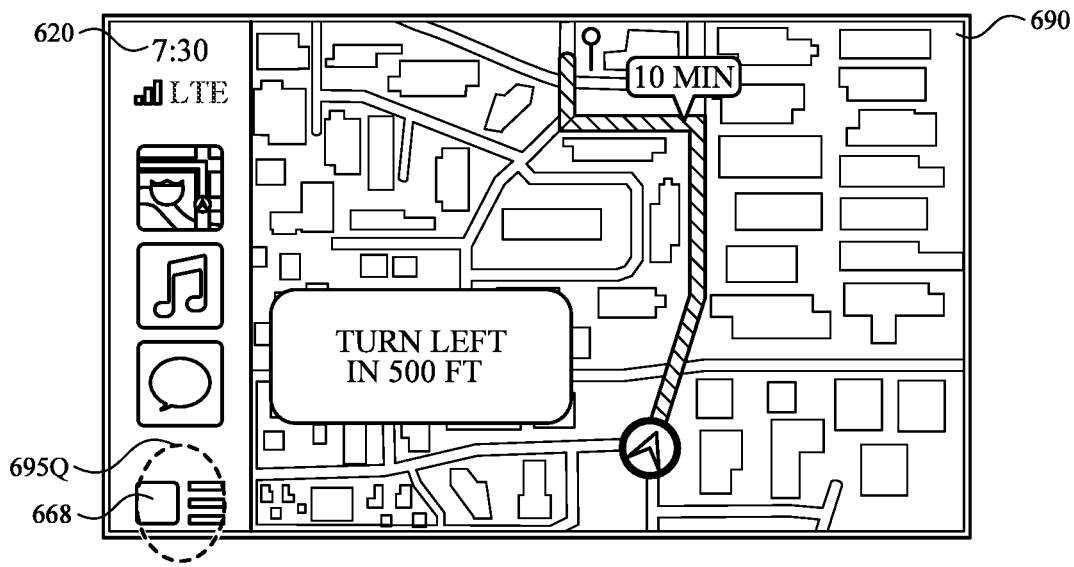

As illustrated in FIG. 6X, in response to detecting input 695P, device 600A causes to be displayed map application 690 associated with map widget 630. Map application 690 displays map information 678 and additional map information (e.g., "TURN LEFT in 500 FT.") While displaying map application 690, device 600A detects input 695Q on dashboard navigation affordance 668.

Figure 6Y:
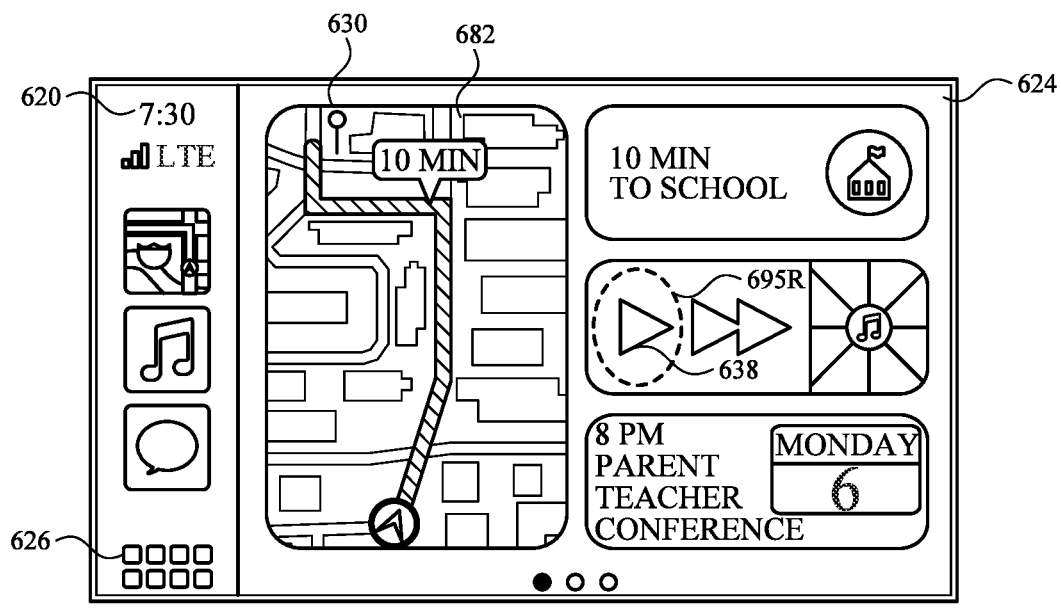

As illustrated in FIG. 6Y, in response to detecting input 695Q on dashboard navigation affordance 668, device 600A causes to be displayed dashboard interface 624. While displaying the dashboard interface 624, device 600A detects input 695R on play affordance 638.

Figure 6Z:
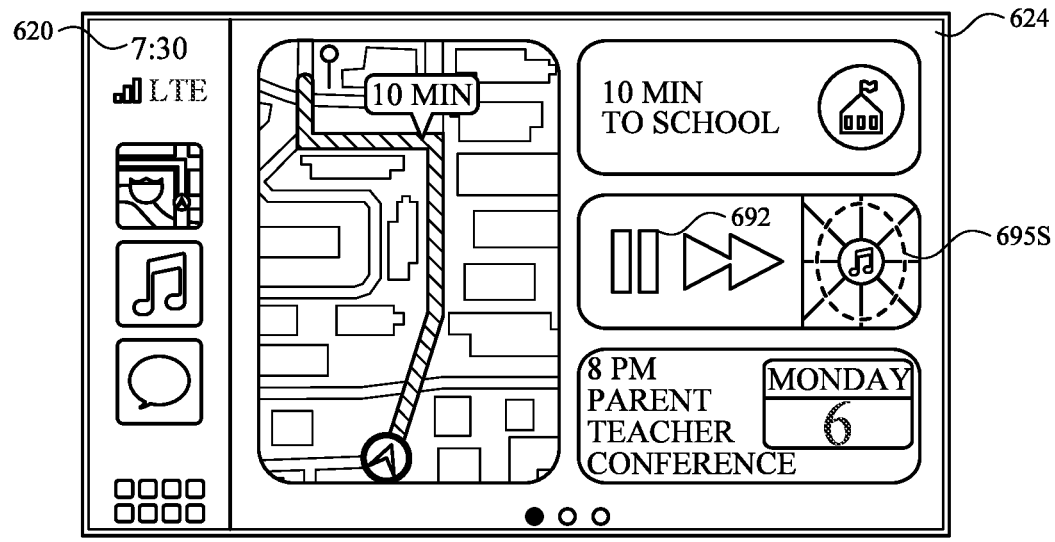
Figure 6A:
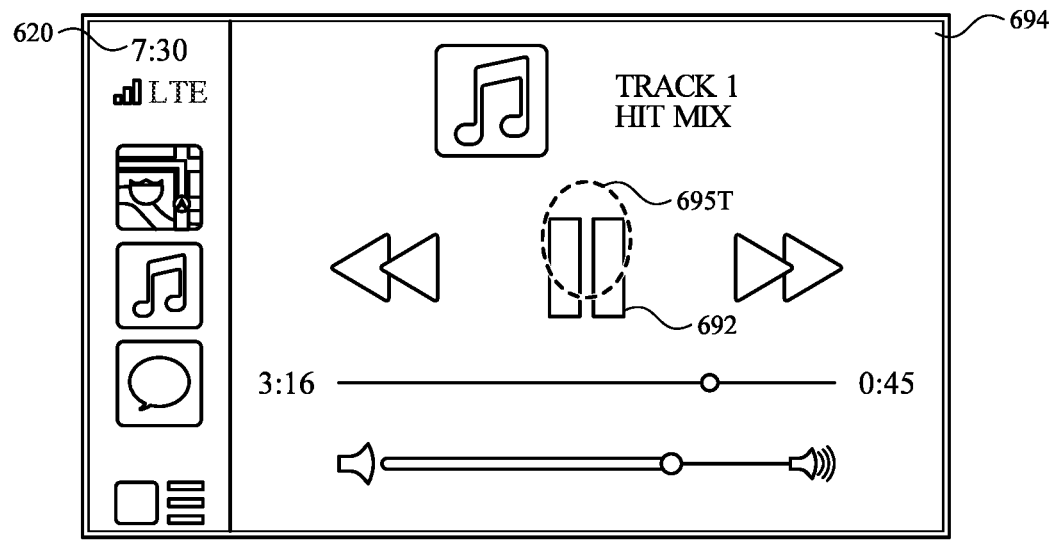
Figure 6A:
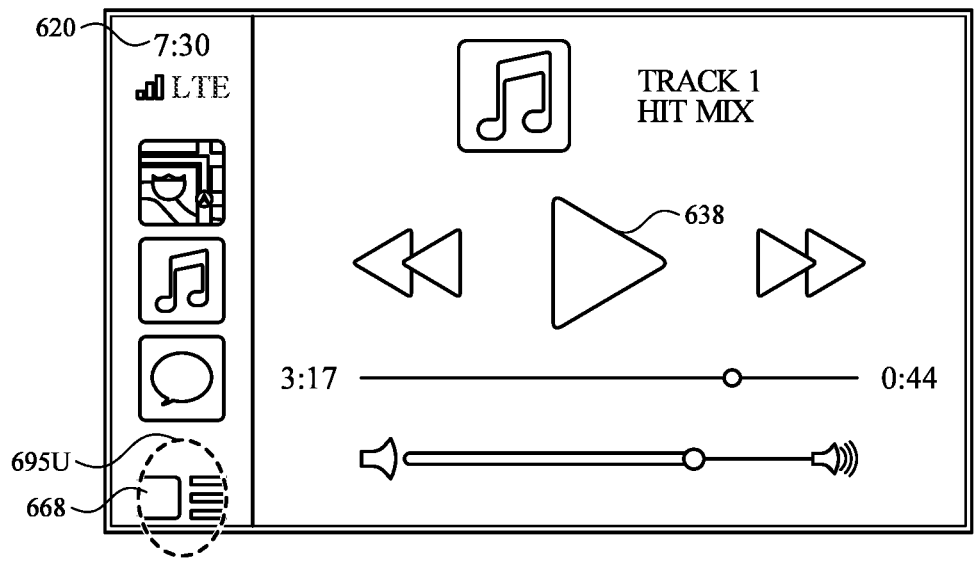
Figure 6A:
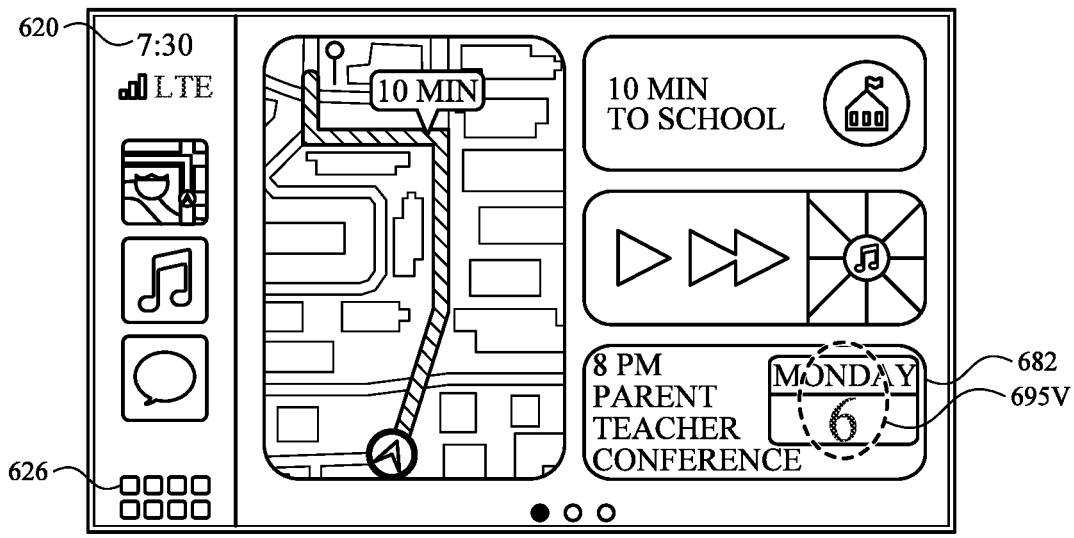
Figure 6A:
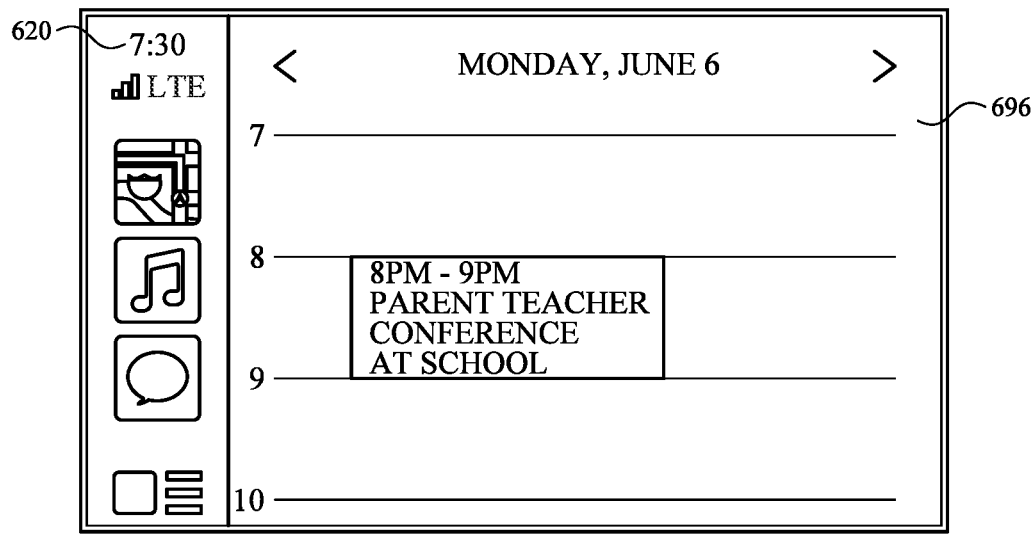
Figure 6A:
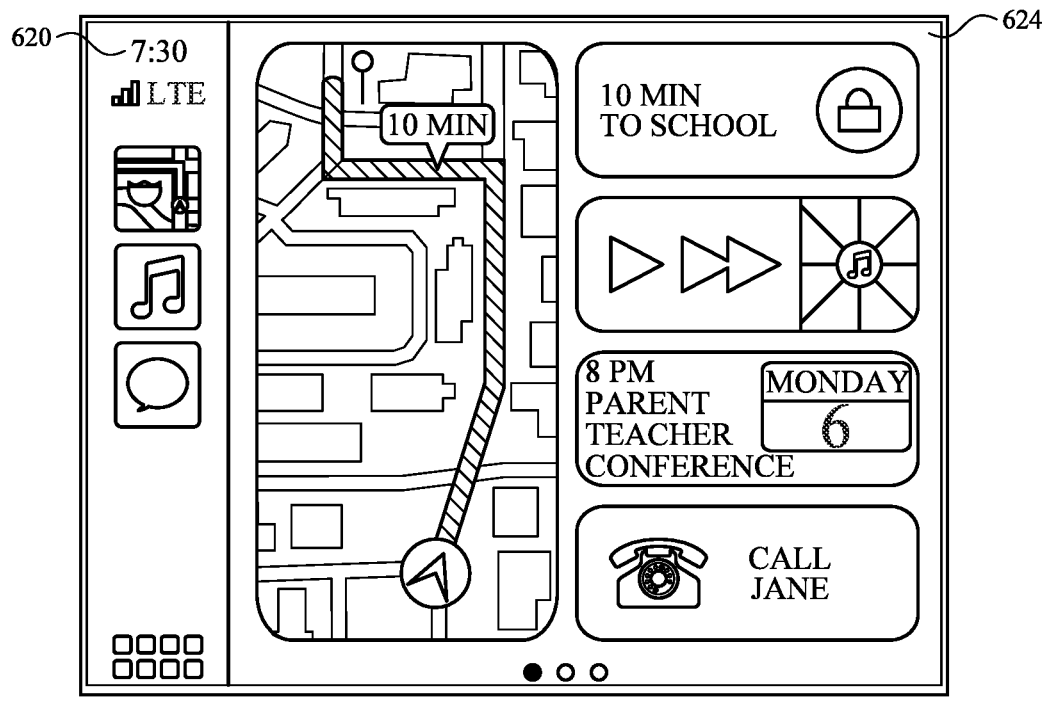

In response to detecting input 695R, as illustrated in FIG. 6Z, device 600A causes music to be played back. In addition, in response to detecting input 695R, device 600A causes pause affordance 692 to be displayed by replacing play affordance 638 with pause affordance 692. While displaying music widget, device 600A detects input 695S on music widget in a place other than on any playback affordances (e.g., pause affordance 692 or fast forward affordance 640).

As illustrated in FIG. 6AA, in response to detecting input 695S, device 600A causes a music application 694 to be displayed. Music application 694 includes pause affordance 692 and fast forward affordance 640 as well as other user interface elements (e.g., a reverse affordance, a volume control) for interacting or performing one or more additional functions of music application 694 and additional information (e.g., "Track I Hit Mix"). While displaying music application 694, device 600A detects input 695T on pause affordance 692.

As illustrated in FIG. 6AB, in response to detecting input 695T, device 600A causes play affordance 638 to be displayed by replacing pause affordance 692 with play affordance 638. Moreover, music application 694 also includes dashboard navigation affordance 668. While displaying dashboard navigation affordance 668, device 600A detects input 695U on dashboard navigation affordance 668.

As illustrated in FIG. 6AC, in response to detecting input 695U, device 600A causes dashboard interface 624 to be displayed. Dashboard interface 624 continues to include calendar widget 682. While displaying calendar widget 682, device 600A detects user input 695V on calendar widget 682.

As illustrated in FIG. 6AD, in response to detecting input 695V, device 600A causes calendar application 696 to be displayed. Calendar application 696 includes an event that corresponds to information displayed on the calendar widget 682.

FIG. 6AE shows display screen 600C, which includes one or more features of display screen 600B, but is larger in area/size than display screen 600C. Thus, more widgets are displayed on display screen 600C than on display screen 600B due to 600C's larger area/size.

In some embodiments, when dashboard interface 624 is displayed on a device with a smaller screen size than display screen 600B, dashboard interface 624 can include fewer widgets than the number of widgets displayed on display screen 600B. In some embodiments, the number of widgets that are displayed on display screen 600B and/or display screen 600C is configurable by the user.

Further, as illustrated in FIG. 6AE, device 600A causes multiple widgets from multiple categories of applications to be displayed. Device 600A causes communication suggestion widget 642 from a category of communications applications and calendar widget 682 from a category of calendar applications to be displayed concurrently. In some embodiments, only a certain number of widgets (e.g., 1 or 2) can be displayed on dashboard interface 624 concurrently.

FIGS. 7A-7B are a flow diagram illustrating a method managing applications for different use contexts, using an electronic device (e.g., 600A) in accordance with some embodiments. Method 700 is performed at a device (e.g., 100, 300, 500, 600) that is in communication (e.g., a wired connection (e.g., USB) or a wireless connection (e.g., Bluetooth, Wi-Fi, etc.)) with a display screen (e.g., 600B). In some embodiments, the display screen is electronically coupled to (e.g., physically connected to, physically a part of) the electronic device.

In some embodiments, the display screen (e.g., 600B) is electronically coupled to another electronic device (e.g., 600A) (e.g., head unit installed in a car, phone, another type of device, etc.). In some embodiments, the display screen is electronically coupled to the other device and not electronically coupled to the electronic device. In some embodiments, communication includes connecting the electronic device with the other device with a wired or wireless connection with an application operatively functioning (e.g., on the first electronic device, accessed by the first electronic device from a cloud server or some other remote server or storage location) with the first electronic device. Some operations in method 700 are, optionally, combined, the orders of some operations are, optionally, changed, and some operations are, optionally, omitted.

As described below, method 700 provides an intuitive way to display map user interfaces. The method reduces the cognitive burden on a user for viewing map user interfaces, thereby creating a more efficient human-machine interface. For battery-operated computing devices, enabling a user to access map user interfaces faster and more efficiently conserves power and increases the time between battery charges.

The electronic device (e.g., 600A) receives (702) an input that corresponds to a request to display a user interface on the display screen (e.g., 600B) (e.g., in response to the electronic device connecting to the display via a wired or wireless connection, in response to the electronic device and/or the display being turned on).

In response to receiving the input (e.g., FIG. 6B), the electronic device causes (704) the user interface (e.g., 624, a launch screen) to be displayed on the display screen. In some embodiments, the electronic device displays the user interface on or as a launch screen (e.g., a user interface is on or as a launch screen after the display screen turns on, after a user interacts with the electronic device or the display screen, or when the electronic device and the display screen establishes communication (e.g., via Bluetooth, Wi-Fi, a wire-connection, etc.). In accordance with a determination that the electronic device is in a first use context (e.g., FIG. 6B) (e.g., a state of the electronic device, including the state of active application(s) (e.g., usage recency) or the state of sensors of the electronic device (e.g., GPS sensors)), the user interface that is caused to be displayed on the display screen includes (706): a first interface element (706) (e.g., 630), a second interface element (708) (e.g., 636), and a third interface element (710) (e.g., 634,642, 652, 662, 672, 682, 684). In some embodiments, the determination occurs on the electronic device; in other embodiments, external to the electronic device. In some embodiments, the determination includes the electronic device detecting context parameters (e.g., one or more parameters that define a state of the electronic device, including the state of active application(s) (e.g., usage recency) or the state of sensors of the electronic device (e.g., GPS sensors)), and determining whether one or more of the context parameters satisfies the first use context or the second use context. In some embodiments, the electronic device determines whether one or more context parameters satisfy the first use context or second use context by comparing one or more context parameters to predefined variables that satisfy the first use context or the second use context. In some embodiments, the electronic device determines whether one or more context parameters satisfy the first use context or second use context by calculating a confidence score.

In accordance with the determination that the electronic device is in a first use context, the first interface element (e.g., 630, one or more widgets (e.g., one or more applications, or one or more components of one or more user interfaces, that enable a user to perform one or more functions (or services), a map widget) includes (708) a map (e.g., 630, a representation of a map) selected based on a current location of the electronic device (e.g., a position of the electronic device (e.g., captured by a GPS unit of the electronic device)) (e.g., a real-time mapping service or application). In some embodiments, the first status is a representation of a map with information, such as the position of the first electronic device. In some embodiments, a widget includes only some of the functions (e.g., user interface functions, user experience functions, and/or operational functions) of a full application (e.g., 690); in other words, a widget is a lite version of an application. In some embodiments, a widget represents a part of the graphical interface that a user can interact with to perform one or more functions provided by an application. In some embodiments, an interface element updates a status based on one or more applications that are operatively functional with (e.g., an application that is on a device, accessed by the device from a cloud server, another type of remote server, a storage location, etc.) the electronic device. In some embodiments, a user selects a portion of the interface element, and in response to selecting the portion of the interface element, the electronic device displays one or more applications corresponding to the status of the interface element on the electronic device. In some embodiments, the map is retrieved from a map application for display. In some embodiments, the map is displayed as part of a map application.

In accordance with the determination that the electronic device is in a first use context, the second interface element (e.g., 636) includes (710) media playback controls (e.g., 636, a music application or a video application). In some embodiments, in response to detecting selection of the representation of the music application, the electronic device causes a music application to be displayed on the display screen (e.g., 694). In some embodiments, in response to detecting selection of the representation of a media player application, the electronic device causes a media player application to be displayed on the display screen.

In accordance with the determination that the electronic device is in a first use context, the third interface element (e.g., 634,642, 652, 662, 672, 682, 684), an intelligently selected widget) includes (712) a first control that, when selected, performs a first function selected based on the first use context. In some embodiments, the third application is distinct from the map application (e.g., 690) and the media playback application (e.g., 694) (e.g., a restaurant application when the third interface element is a restaurant application widget). In some embodiments, the third application is the same as the map application or the media playback application (e.g., a map application when the third interface element is an estimated time of arrival widget).

In accordance with a determination that the electronic device is in a second use context (e.g., FIGS. 6D, 6F, 6H, 6M, 6S) (e.g., a state of the device, including the state of active application(s) (e.g., usage recency) or the state of sensors of the device (e.g., GPS sensors)) that is different from the first use context, the user interface that is caused (720) to be displayed on the display screen includes: the first interface element (e.g., 630) that includes the map selected based on the current location of the electronic device, the second interface element (e.g., 636) that includes media playback controls, and the third interface element (e.g., 634,642, 652, 662, 672, 682, 684) that includes a second control that, when selected, performs a second function selected based on the second use context without including the first control (e.g., FIG. 6I).

In accordance with the determination that the electronic device is in the second use context, the first interface element (e.g., 630, one or more widgets (e.g., one or more applications, or one or more components of one or more user interfaces, that enable a user to perform one or more functions (or services).)) includes (722) the map (e.g., 690 (e.g., a representation of a map) selected based on the current location of the electronic device (e.g., a position of the electronic device (e.g., captured by a GPS unit of the electronic device)) (e.g., a real-time mapping service or application). In some embodiments, the first status is a representation of a map with information, such as the position of the first electronic device. In some embodiments, a widget includes only some of the functions (e.g., user interface functions, user experience functions, and/or operational functions) of a full application; in other words, a widget is a lite version of an application). In some embodiments, a widget represents a part of the graphical interface that a user can interact with to perform one or more functions provided by an application. In some embodiments, an interface element updates a status based on one or more applications that are operatively functional with (e.g., an application that is on a device, accessed by the device from a cloud server, another type of remote server, a storage location, etc.) the electronic device. In some embodiments, a user selects a portion of the interface element, and in response to selecting the portion of the interface element, the electronic device displays one or more applications corresponding to the status of the interface element on the electronic device.)(e.g., a map widget).

In accordance with the determination that the electronic device is in the second use context, the second interface element (724) (e.g., 636) includes (e.g., a name, artist, time (e.g., remaining time, start time, end time, etc.)) media playback controls (e.g., 636, a music application or a video application). In some embodiments, selecting the representation of the music application causes a music application (e.g., 696) to be displayed on the display screen.

In accordance with the determination that the electronic device is in the second use context, the third interface element (e.g., 634,642, 652, 662, 672, 682, 684, intelligently selected widget) that includes a second control (e.g., 634, 642, 652, 662, 672, 682, 684) that, when selected, performs (726) a second function selected based on the second use context without including (e.g., without displaying) the first control. In some embodiments, the third application is distinct from the map application and the media playback application (e.g., a restaurant application when the third interface element is a restaurant application widget (e.g., 664)). In some embodiments, the third application is the same as the map application or the media playback application (e.g., a map application when the third interface element is an estimated time of arrival widget.). In some embodiments, interface elements are displayed in a fixed position on the display. In some embodiments, one or more user interface elements are displayed as one user interface element (e.g., an estimated ETA widget is combined with a predictive destination).

Displaying a third interface element (e.g., widget) when the electronic device is in a particular use context reduces the number of inputs that a user has to make when operating the display screen. Reducing the number of inputs to operate the display screen enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Automatically displaying and swapping various interface elements (e.g., widgets) when a set of conditions (e.g., electronic device is in a certain use context) are met allows a user to operate the device and display screen in safer conditions when participating in potentially dangerous activates by reducing the number of inputs required to perform various functions associated with the interface elements. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Displaying a third interface element (e.g., widget) based on the electronic device is in a particular use context provides the user with feedback about the current state of important information relevant to the user. Providing improved feedback about the current state of important information relevant to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In addition, determining the functionality of the third interface element based on the electronic device being in a use context and maintaining the functionality of other interface elements allows the user to quickly recognize the interface element that has changed, which maintains a relatively consistent display while changing only certain portions of the display to increase the functions and information provided to the user, of the device. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the third interface element (e.g., estimated time of arrival widget) includes (e.g., displayed) a representation of an estimated time of arrival (e.g., 634). In some embodiments, the estimated time of arrival widget displays information, such as the estimated time of arrival to one or more destinations via one or more different routes (e.g., when a car is predicted or expected to travel to different predicted or predetermined destinations on the same route). In some embodiments, the estimated time of arrival widget is controlled by the same application (e.g., map application) as the first element that includes the map selected based on the current location of the electronic device. In some embodiments, the estimated time of arrival widget is controlled by a different application (e.g., map application) as the first element that includes the map selected based on the current location of the electronic device. Showing an estimated time of arrival based on the electronic device being in a use context and maintaining the functionality other interface elements allows the user to quickly recognize the interface element that has changed, which maintains a relatively consistent display while offering some portions of the display to change in order to increase the functions and information provided to the user, via the widget, of the device. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the third interface element (e.g., predictive destination) includes a representation of a predicted destination (e.g., 634, 684). In some embodiments, the predictive destination is controlled by the same application (e.g., map application) as the first element that includes the map selected based on the current location of the electronic device. In some embodiments, the predictive destination is controlled by a different application (e.g., predicted destination application) than the first element that includes the map selected based on the current location of the electronic device. In some embodiments, the predictive destination displays information, such as the predicted destination to one or more destinations via one or more different routes (e.g., when a car is expected or predicted to travel to different destinations on the same route. In some embodiments, one or more predicted destinations are determined by one or more predetermine destinations that are set by a user of the electronic device. In some embodiments, one or more predicted destinations are determined based one or more use contexts (e.g., a state of the device, including the state of active application(s) (e.g., usage recency) or the state of sensors of the device (e.g., GPS sensors)). Showing a predicted destination based on the electronic device being in a use context and maintaining the functionality other interface elements allows the user to quickly recognize the interface element that has changed, which maintains a relatively consistent display while offering some portions of the display to change in order to increase the functions and information provided to the user, via the widget, of the device. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the first use context includes the electronic device being within a predetermined distance of a first location (e.g., a location associated with the electronic device or a user of the electronic device (e.g., home)), wherein the first function (e.g., 652, 658) includes transmitting a signal to a second electronic device. In some embodiments, the electronic device receives a user input (e.g., 695B, 695C) corresponding to a request to select the intelligently selected widget and, in response to receiving the user input corresponding to the request to select the intelligently selected widget, the electronic device transmits a signal to another device that causes an entry point (e.g., garage door) of a physical structure (e.g., house) to be opened or closed.

In accordance with some embodiments, the first use context includes the electronic device departing (e.g., moving away (or, in the alternative, moving towards)) a second location (e.g., a predetermined location (e.g., a location associated with the electronic device or a user of the electronic device (e.g., home)) by a predetermined distance and the third interface element includes a representation (e.g., a visual representation (e.g., words, images (e.g., icons), video)) of a calendar (e.g., 682, one or more calendars and/or one or more calendar events (e.g., one or more previous, upcoming, ongoing calendar events)). In some embodiments, the electronic device receives a user input corresponding to a request to select the intelligently selected widget and, in response to receiving the user input (e.g., 695V) corresponding to the request to select the intelligently selected widget, the electronic device displays an application (e.g., a calendar application) associated with the calendar (e.g., meeting, dinner, etc.) application. In some embodiments, the intelligently selected widget displays one or more representations of a previous, upcoming, or ongoing calendar event. In some embodiments, the widget displays one or more representations of the calendar application (e.g., 696).

In accordance with some embodiments (e.g., FIGS. 6N-6Q), the first use context includes the electronic device departing (e.g., moving away from) a third location at a predetermined time (e.g., predetermined time includes a predetermined range of time), and the third interface element includes (e.g., intelligently selected widget) a representation (e.g., a visual representation (e.g., words, images (e.g., icons), video)) of a suggested event (e.g., 662). In some embodiments, the electronic device receives a user input (e.g., 695H) corresponding to a request to select the intelligently selected widget and, in response to receiving the user input corresponding to the request to select the intelligently selected widget, the electronic device causes an application (e.g., a calendar application, restaurant application, application related to an activity (e.g., ordering food, calling a taxi)) associated with the suggested event (e.g., meeting, dinner, etc.) to be opened in the application.

In accordance with some embodiments, the first function corresponds to placing a telephone call to a predetermined telephone number (e.g., 672). In some embodiments, the predetermined telephone number is the number of a suggested (e.g., preferred (e.g., favorite)) contact (e.g., a favorite contact that is associated with the electronic device (e.g., set by a user of the electronic device, determined by one or more algorithms to correspond to (e.g., relate to) the electronic device, predicted to correspond to the electronic device)), a contact associated with a meeting event. In some embodiments, the telephone number is determined while the electronic device is in a particular context (at a particular time, at a particular date, during certain conditions (e.g., weather conditions)).

In accordance with some embodiments, while causing to be displayed on the display screen the third interface element that includes the first control, the electronic device detects (714) a second input (e.g., tap) (e.g., 695D, 695V) that corresponds to selection of the first control. In response to detecting the second input (e.g., tap) that corresponds to selection of the first control, the electronic device performs (716) the first function, wherein the first function includes causing to be displayed on the display screen a first application that is associated with the first function (e.g., an application that includes instructions a set of executable instructions to perform the first function).

In accordance with some embodiments, while causing to be displayed on the display screen the third interface element that includes the first control, the electronic device detects (714) a second input (e.g., tap) that corresponds to selection of the first control. In response to detecting the second input (e.g., tap) (e.g., 695B, 695C) that corresponds to selection of the first control, the electronic device performs (718) the first function without causing to be displayed on the display screen a second application that is associated with the first function (e.g., an application that includes instructions a set of executable instructions to perform the first function).

Performing a function without causing the application associated with the function to be displayed provides the user with more control of the device by helping the user avoid unintentionally launching an application to perform a function. Providing additional control of the device without cluttering the UI with additional displayed of the application enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, prior to causing to be displayed on the display screen the third interface element that includes the first control, the electronic device causes to be displayed on the display screen the third interface element including a third control (e.g., previously displayed widget). While causing to be displayed on the display screen the third interface element that includes the first control, the electronic device receives a third input (e.g., 695G-I, swipe) on the third interface element. In response to receiving the third input on the third interface element, the electronic device causes to be displayed on the display screen the third interface element that includes the third control. In some embodiments, the intellectually selected widget was not previously displayed. In some embodiments, displaying the widget replaces the display of one or more other widgets. In some embodiments, the widget is displayed in a carousel or slider. In some embodiments, the first, second, and third inputs on the intelligently selected widgets are different types of inputs.

Allowing a user to provide input to display intelligently selected widgets that were previously displayed provides the user with more control of the device by helping the user avoid unintentionally losing functionality of widgets that were displayed previously when new widgets are displayed. In addition, providing an option to display previous widgets provides additional functionality without cluttering the UI with additional widgets being displayed enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, while causing to be displayed on the display screen the third interface element that includes the first control that, when selected, performs the first function selected based on the first use context, the electronic device causes to be displayed on the display screen a fourth interface element that includes a fourth control that, when selected, performs a fourth function selected based on a third use context (e.g., a state of the electronic device, including the state of active application(s) (e.g., usage recency) or the state of sensors of the electronic device (e.g., GPS sensors)). In some embodiments, the first and third use contexts are the same. In some embodiments, the first and third use contexts are different. In some of these embodiments, the first function of the third interface element and the fourth function of the fourth interface element changes at different times, independent of each other. The first function (e.g., a function (e.g., navigating to a destination) of a maps application) is included in (e.g., an application in the category of applications has the function, a part of, included in the set of instructions for applications in the category of applications) a first category of applications (e.g., maps applications). The fourth function (e.g., a function (e.g., messaging a contact) of a communications application) is included (e.g., an application in the category of applications has the function, a part of, included in the set of instructions for applications in the category of applications) in a second category of application (e.g., maps applications). The first category of applications is different than the second category of applications. In some embodiments, one or more intelligently selected widgets may be displayed differently (e.g., one or more intelligently selected widgets are displayed in a carousel and another one or more intelligently selected widgets in displayed as a slider). In some embodiments, the number of selected widgets that are displayed depends on the size (or dimensions) of the display, where more selected widgets are displayed when the size of the display is bigger. In some embodiments, the functionality of one or more intelligently selected widgets is based on different use contexts and/or perform different functions (e.g., FIG. 6AE).

In accordance with some embodiments, the first function is included in (e.g., a part of, included in the set of instructions for an application) a second application (e.g., 672) in the third category of applications. The user interface further includes a shortcut affordance (e.g., 612B) (e.g., an affordance that when selected displays an application on the display screen) at a shortcut position (e.g., a fixed position on the display screen) (e.g., the shortcut position is displayed on a second portion of the display screen that is different than the first portion, where the first portion includes the third interface elements) corresponding to the third category of applications (e.g., communication application), the shortcut affordance representing a third application (e.g., phone application) in the third category of applications, and the second application is different than the third application.

In accordance with some embodiments, the user interface is a first user interface, and causing the user interface (e.g., a launch screen) to be displayed on the display screen further includes: in accordance with a determination that the first user interface (e.g., a dashboard user interface (e.g., 624) (e.g., a user interface that includes the first, second, and third elements)) is currently displayed on the display screen: causing to be displayed on the display screen a navigation affordance (e.g., 626, 668) (e.g., an affordance for navigating to a second user interface (e.g., icon grid user interface)) including a first representation (e.g., 626) (e.g., a images, video, symbols denoting of the first user interface), wherein the navigation affordance includes a fifth control that when selected, performs a fifth function that includes causing to be displayed on the display screen a second user interface (e.g., navigates to an icon grid user interface (e.g., user interface of a plurality of icons for navigation to a plurality of applications)) that is different from the first representation.

In accordance with some embodiments, the user interface is a first user interface, and causing the user interface (e.g., a launch screen) to be displayed on the display screen further includes: in accordance with a determination that the first user interface (e.g., a dashboard user interface (e.g., 624) (e.g., a user interface that includes the first, second, and third elements)) is not currently displayed on the display screen (e.g., a user interface of an application, an icon grid user interface (e.g., user interface of a plurality of icons for navigation to a plurality of application is displayed on the display screen): causing to be displayed on the display screen the navigation affordance including a second representation (e.g., 668) (e.g., a images, video, symbols denoting of the second user interface) that is different from the first representation, wherein the navigation affordance includes a sixth control that when selected, performs a sixth function that includes causing to be displayed on the display screen the first user interface (e.g., navigates to a dashboard user interface (e.g., 624)(e.g., a user interface that includes the first, second, and third elements)). Updating the visual characteristics of the navigation (based on whether a particular user interface is displayed) to reflect a change in function and changing the function of the navigation affordance, provides the user with more control of the device by helping the user avoid unintentionally executing the operation and simultaneously allowing the user to recognize where the user can navigate quickly using the navigation affordance. Moreover, updating the visual characteristics of the navigation to detect a change in function and changing the function of the navigation affordance makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIGS. 7A-7B) are also applicable in an analogous manner to the methods described below/above. For example, methods 900, 1000 optionally include one or more of the characteristics of the various methods described above with reference to method 700. For example, method 700 can include one or more techniques of methods 900 and 1000 to provide an interface when connecting to a second device. For brevity, these details are not repeated below.

FIGS. 8A-8T illustrate exemplary user interfaces and transitions thereof for managing a connection between display screen 800B and computing devices 800A, 800C, 800D. In some embodiments, each of devices 800A, 800B, 800C, and 800D include some or all features of device 100, 300, or 500 (FIGS. 1A-B, 3, and 5A-B). The user interfaces in these figures are used to illustrate the processes and techniques described below, including the processes and techniques described by FIGS. 9A-9B and 10.

In some embodiments, each of electronic devices 800A, 800C, and 800D is a mobile phone that is in wired (e.g., USB, Lightning) or wireless (e.g., Bluetooth, Wi-Fi) connection with display screen 800B, or with an external electronic device having display screen 800B. In some embodiments, display screen 800B (e.g., a device having one or more features of display screen 600B) is provided on or in a dashboard of an automobile. In some embodiments, the mobile phone (e.g., device 800A, 800D) communicates instruction signals for generating the user interface at display screen 800B in accordance with various embodiments discussed herein. Further, user interactions detected at display screen 800B are communicated to the mobile phone (e.g., device 800A). In some embodiments, the user interface 802B described herein are provided at a display screen of the electronic device (e.g., device 800A, 800D) itself.

Although device 800A, 800C, and 800D are potentially capable of receiving and transmitting media and connecting to display screen 800B, device 800A and 800D will be described below as receiving devices. A receiving device directly communicates with display screen 800B and device 800C. Device 800C will be described as a transmitting device. A transmitting device directly communicates with a receiving device but does not directly communicate with display screen 800B, in the following example.

FIGS. 8A-8T describe a technique that allows users of transmitting devices to transmit media to an accessory (e.g., display screen 800B) via an indirect wireless connection. The technique uses a receiving device as a hub between the transmitting device and the accessory; that is, the receiving device establishes a secure connection with the transmitting device and the accessory. Moreover, the technique can obscure the indirect connection between the transmitting device and the accessory from the user of the transmitting device. For example, the receiving device provides identifying information to the transmitting device that is typically associated with the display screen 800B. Accordingly, it can appear to a user of the transmitting device that a connection is being made directly to display screen 800B when it is, in fact, an indirect connection relayed through the receiving device. The particulars of the technique are presented below.

As illustrated in FIG. 8A, device 800C displays user interface 802C for controlling the output of media, including transmitting media to one or more accessory devices. When device 800C cannot identify any available accessory devices, user interface 802C indicates that device 800C is configured to playback the media (e.g., playback the media directly using one or more speakers of device 800C). Here, user interface 802C indicates that device 800C is configured to playback the media by including affordance 806A, device identifier 808A ("Phone" being the device itself), and connection indicator 810A.

Figure 8B:
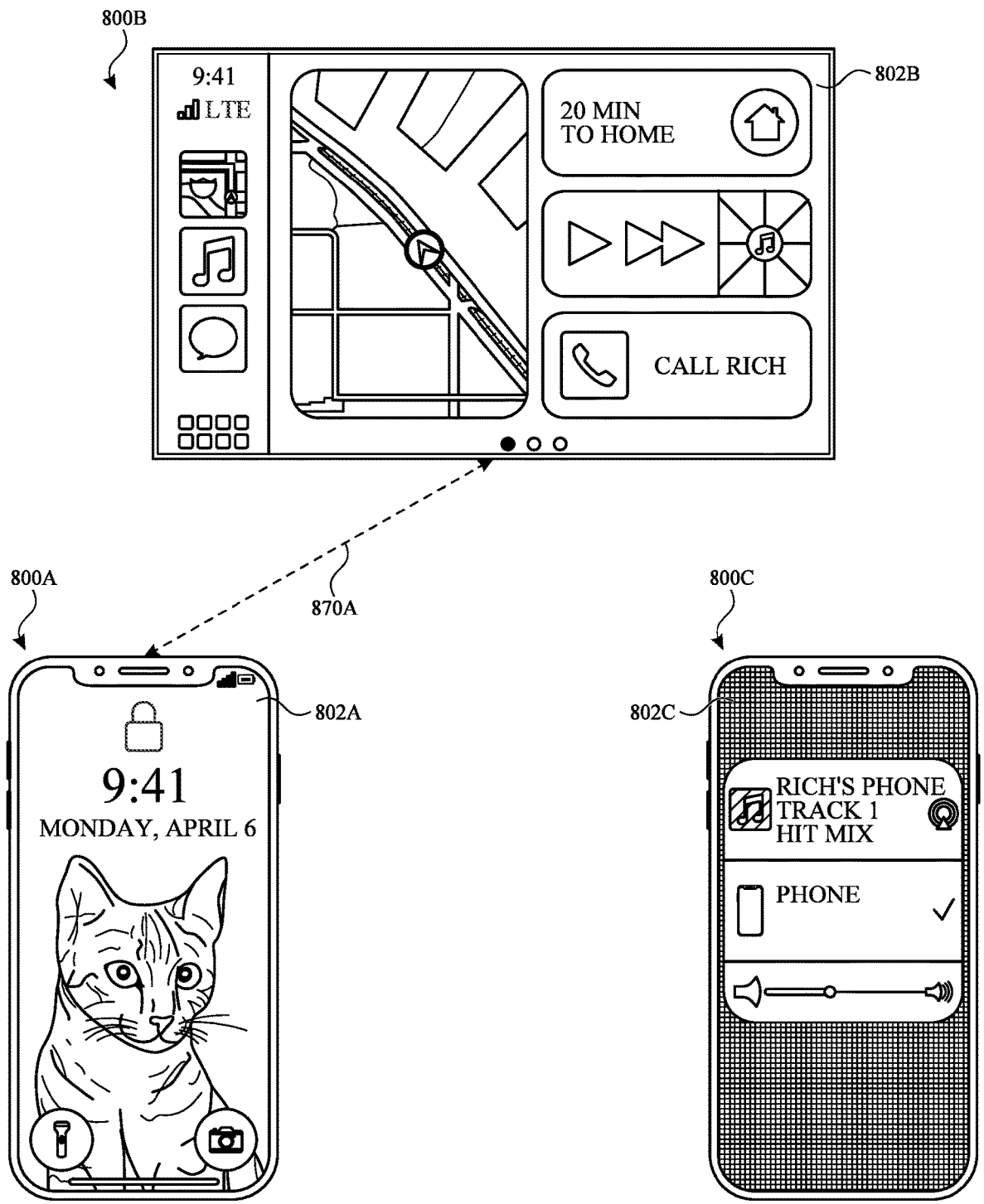

As illustrated in FIG. 8B, device 800A establishes connection 870A with display screen 800B, causing display screen 800B to display user interface 802B (e.g., dashboard interface 624). In some embodiments, connection 870A is a secure connection (e.g., Bluetooth), which indicates that device 800A and display screen 800B established connection 870A by adhering to a security protocol. In some embodiments, by establishing connection 870A, display screen 800B includes an indication that device 800A is a trusted device. In some embodiments, forming a connection to display screen 800B allows the connected device to transmit data to display screen 800B, even if the data is malicious. Thus, in some embodiments, display screen 800B is vulnerable when it allows one or more unknown devices to establish a connection similar to connection 870A. In some embodiments, display screen 800B may allow device 800A to have an administrative control (e.g., a higher level of control than other devices with control) over display screen 800B when device 800A is a trusted device.

In some embodiments, while device 800A is connected to display screen 800B, device 800A provides or broadcasts information to device 800C. The information broadcasted by device 800A includes information with an identifier corresponding to the identity of display screen 800B. In some embodiments, device 800A determines the identifier by using the identity of display screen 800B. In some of these embodiments, if the identity of display screen 800B is "Steve's Car," the identifier broadcasted to device 800C includes "Steve's Car." In some embodiments, device 800A determines the identifier by deriving an identifier from the identity of display screen 800B. In some of these embodiments, the identifier broadcasted to device 800C includes "Steve's Car Car Player."

In some embodiments, device 800A provides information in a format that is compliant with a wireless communication protocol or standard for identifying nearby devices that are available to receive content (e.g., Bluetooth). In some embodiments, the communications protocol identifies nearby devices that are available to receive content of a certain type, such as audio and video.

Figure 8C:
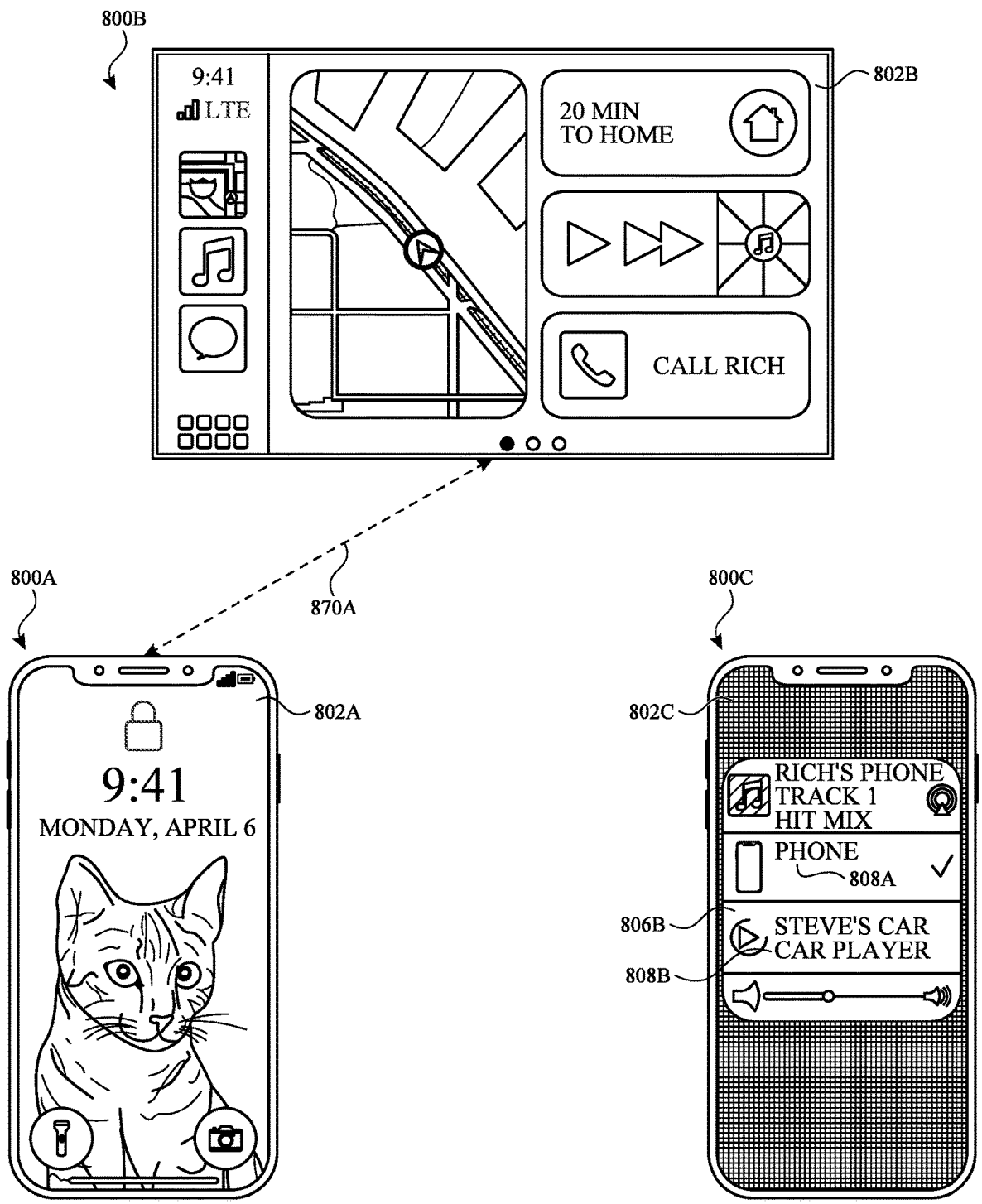

As illustrated FIG. 8C, in accordance with a determination that a wireless connection to a device broadcasting the identifier "Steve's Car Car Player" is available, device 800C displays affordance 806B with an identifier 808B that matches the identifier broadcasted by device 800C. Here, device 800A is broadcasting an identifier that includes "Steve's Car Car Player." After receiving the identifier, device 800C made the determination that the wireless connection to what can appear to be display screen 800B is available.

Figure 8D:
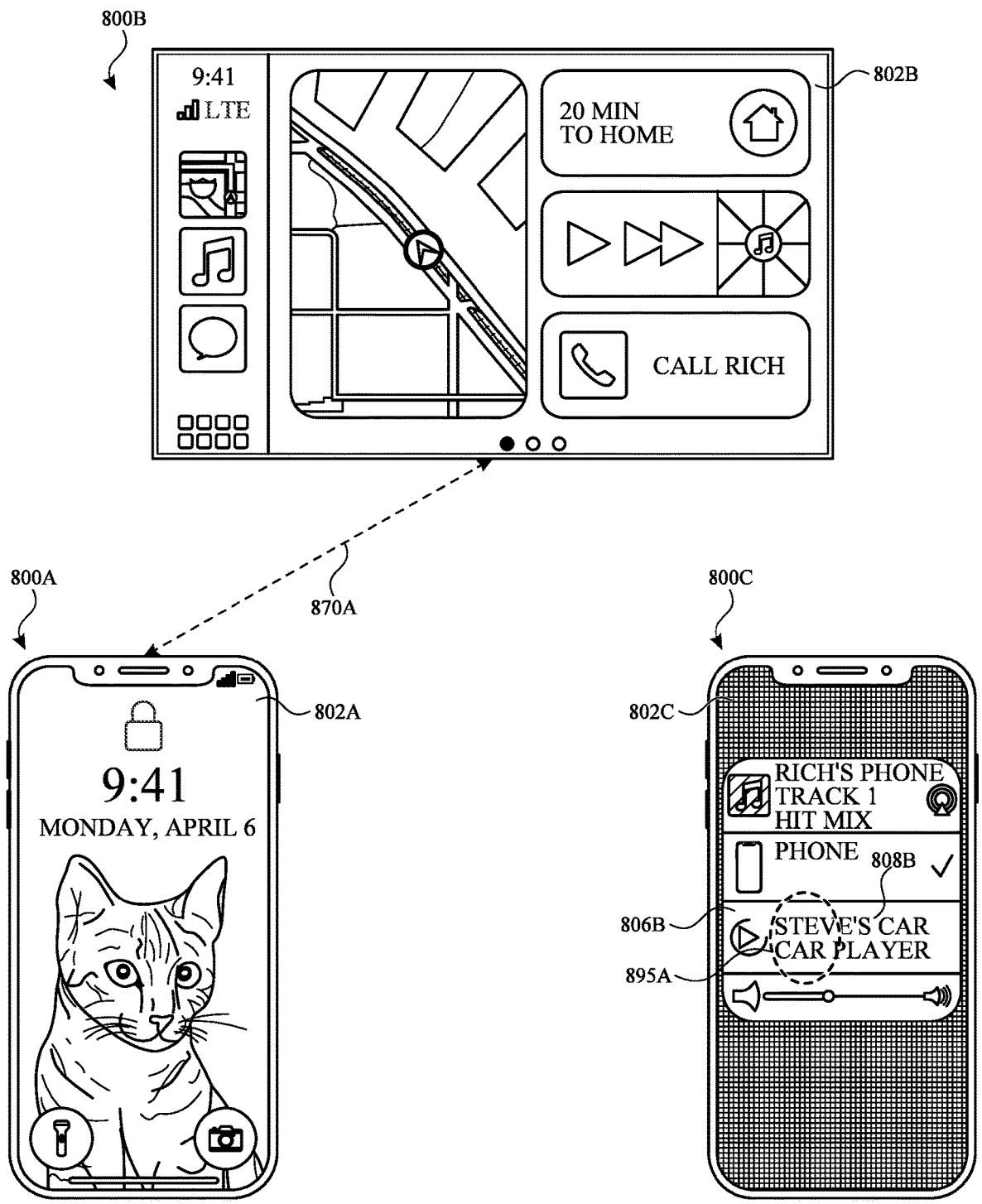

As illustrated in FIG. 8D, while displaying affordance 806B, device 800C detects input 895A that corresponds to a selection of affordance 806B with identifier 808B. Notably, displaying identifier 808B likely indicates to a user that device 800C will connect to display screen 800B. Thus, some users may be unaware that selecting affordance 806B will cause device 800C to connect to 800A. In some embodiments, not showing an identifier associated with device 800C, reduces the risk of confusion (e.g., when the user's intent is to connect to display screen 800B in order to play media). In some embodiments, connecting device 800C to display screen 800B, indirectly via device 800A, can improve security and require less time and effort than requiring a direct connection between device 800C and display screen 800B.

Figure 8E:
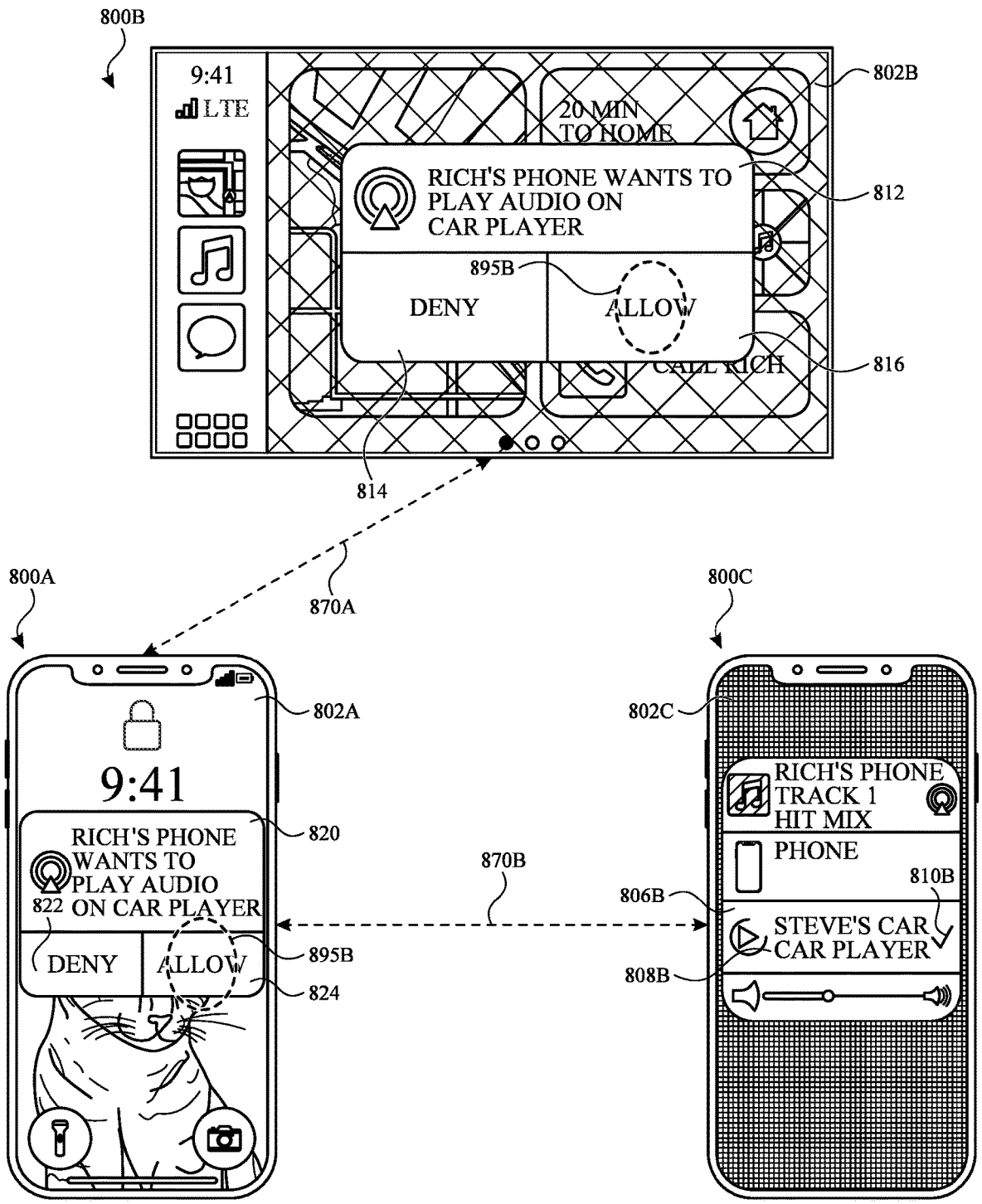

As illustrated in FIG. 8E, in response to detecting input 895A, device 800C establishes connection 870B with 800A and displays indication 810B. Indication 810B shows a user that device 800C is configured to transmit media to an external device, which a user may perceive as display screen 800B. Notably, device 800C establishes connection 870B with 800A instead of establishing a connection directly to display screen 800B.

In some embodiments, in response to detecting input 895A, device 800C sends a request to connect to device 800A. In turn, device 800A receives the request to connect device 800C with display screen 800B (e.g., indirectly connected via device 800A). In response to receiving the request to connect device 800C with display screen 800B, as illustrated in FIG. 8E, device 800A causes to be displayed confirmation screen 812 on display screen 800B.

In some embodiments, although device 800C is connected to 800A, confirmation must be given from a user associated with display screen 800B or device 800A in order to be allowed 800C media that will be played via display screen 800B. As further illustrated in FIG. 8E, confirmation screen 812 includes deny affordance 814 and allow affordance 816. In addition, as illustrated in FIG. 8E, device 800C displays confirmation screen 820 that includes deny affordance 822 and allow affordance 824.

While confirmation screen 812 and/or confirmation screen 820 is displayed, device 800A detects input 895B on allow affordance 816 or input 895C on allow affordance 824. As illustrated in FIG. 8E, after device 800A detects input 895B or input 895C, device 800C transmits media to device 800A for playback via display screen 800B. In turn, device 800A receives the media and transmits the media to display screen 800B for playback.

Figure 8F:
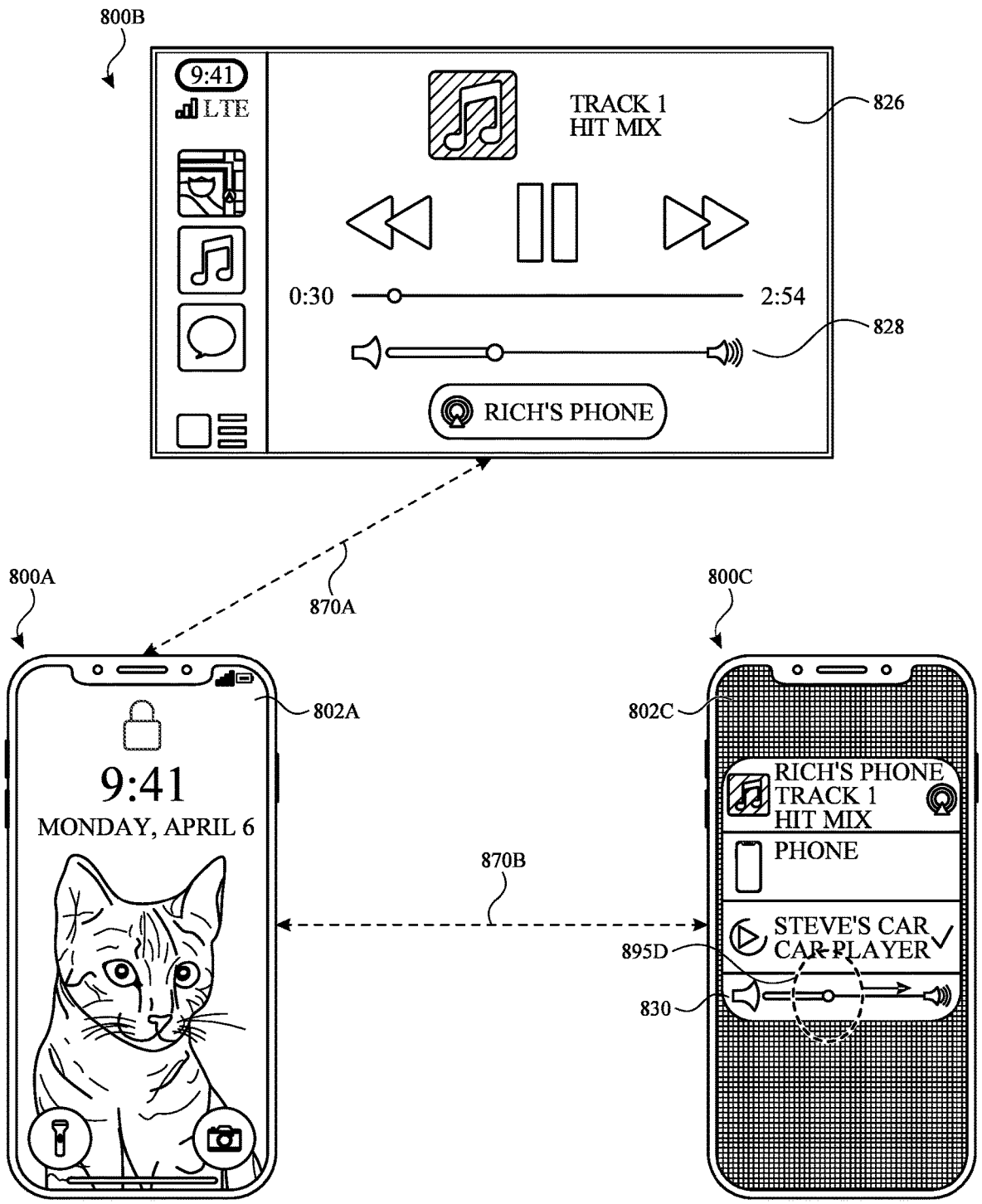

As illustrated in FIG. 8F, while transmitting the media for playback to display screen 800B, device 800A causes display screen 800B to display media application 826. Media application 826 is playing media that device 800C is transmitting to 800A.

As illustrated in FIG. 8F, device 800C is connected to device 800A and device 800A is connected to display screen 800B. Here, device 800A is acting as a hub device that receives media from 800C and transmits media to display screen 800B. Thus, device 800C is indirectly connected to display screen 800B via device 800A. However, notably, the user of device 800C can be unaware that device 800C is transmitting media to device 800A. The user of device 800C may only be aware that indication 810B indicates to the user that device 800C is connected to display screen 800B and that the media is being played by display screen 800B via media application 826.

As illustrated in FIG. 8F, media application 826 includes volume control 828 at a first volume level (a first position). Here, display screen 800B is playing back media from device 800C. Likewise, device 800C displays audio control 830 at a first volume level (a first position). While displaying audio control 830, device 800C detects input 895D that changes the volume level from the first volume level to a second volume level.

Figure 8G:
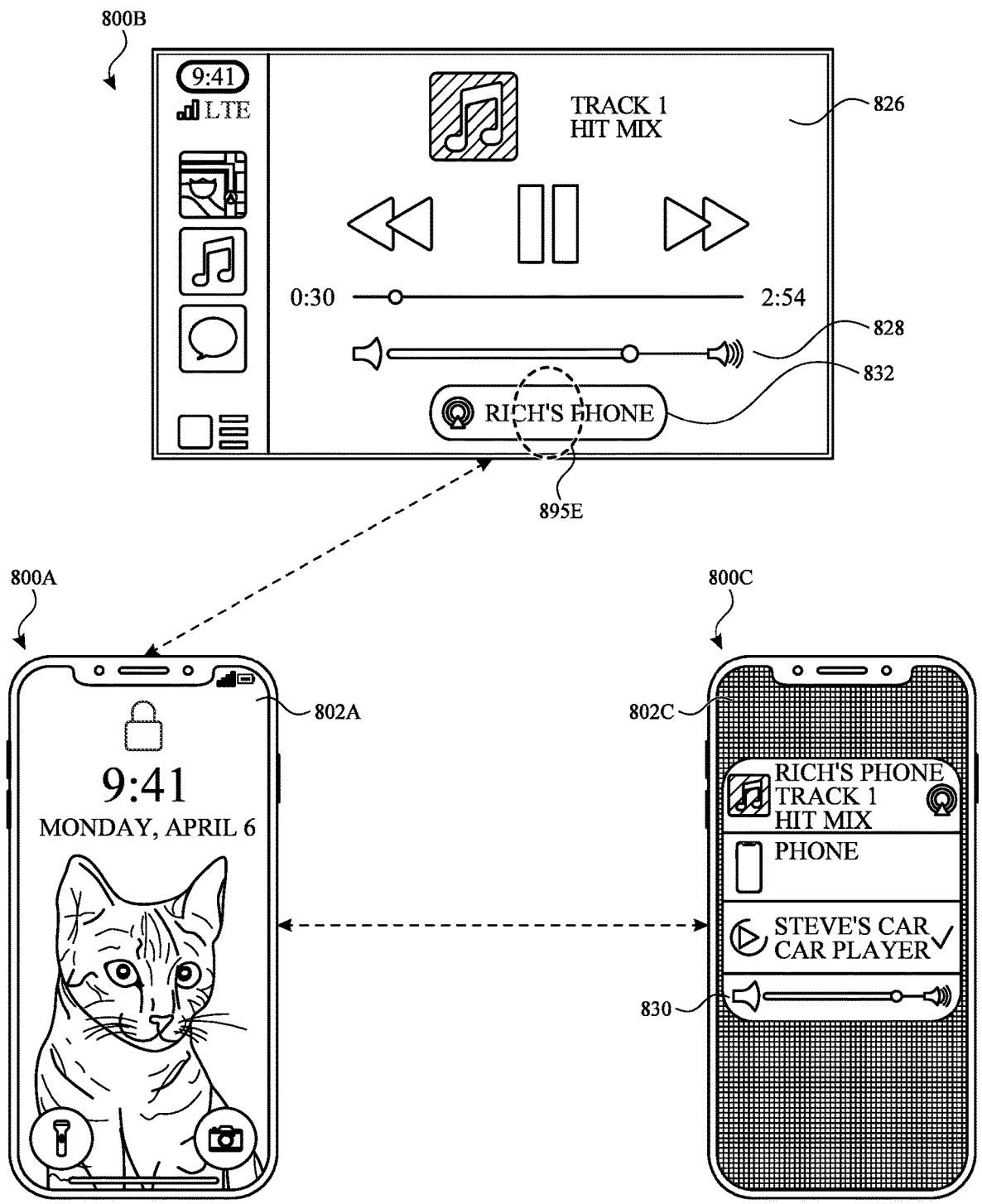
Figure 8H:
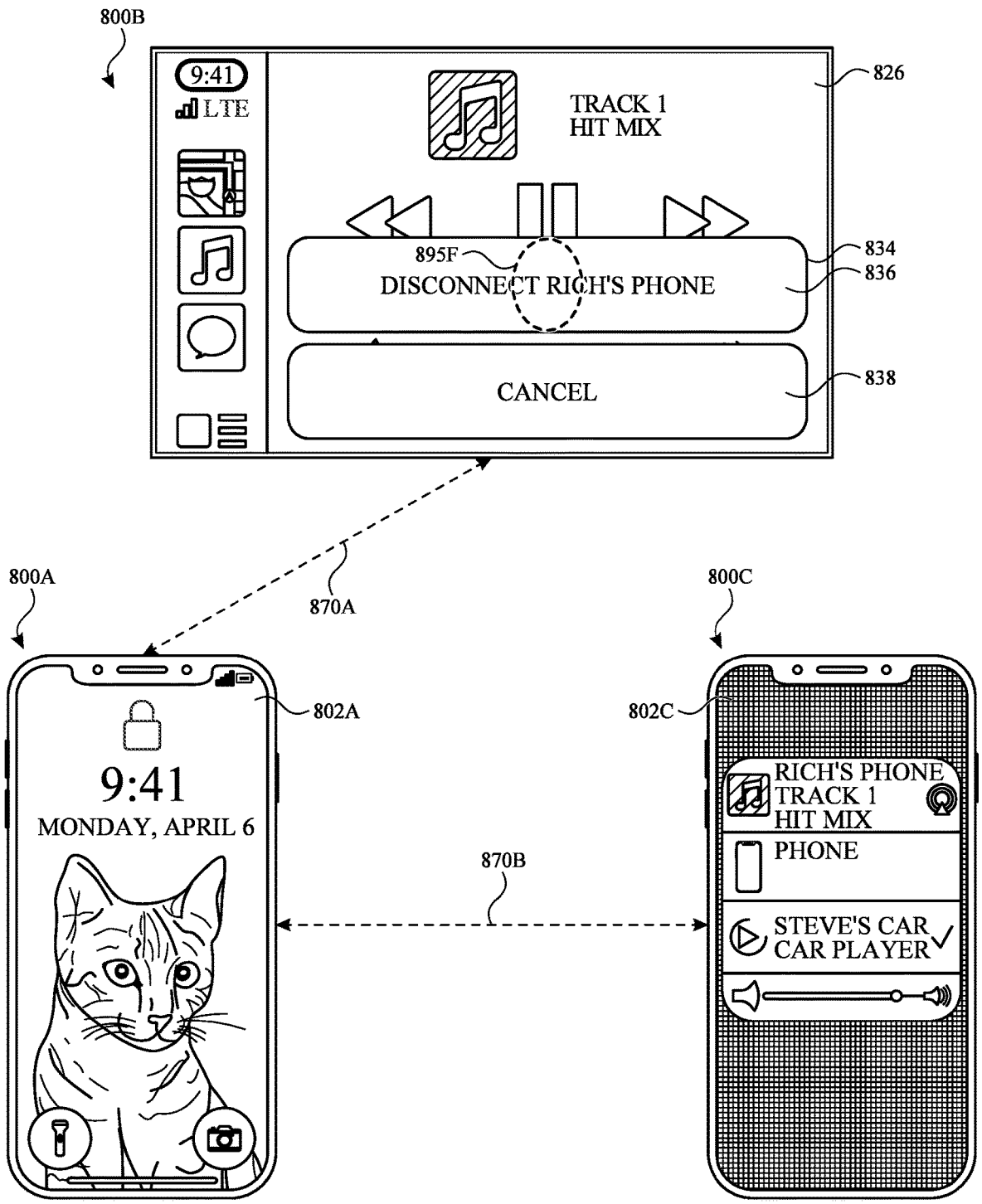
Figure 8I:
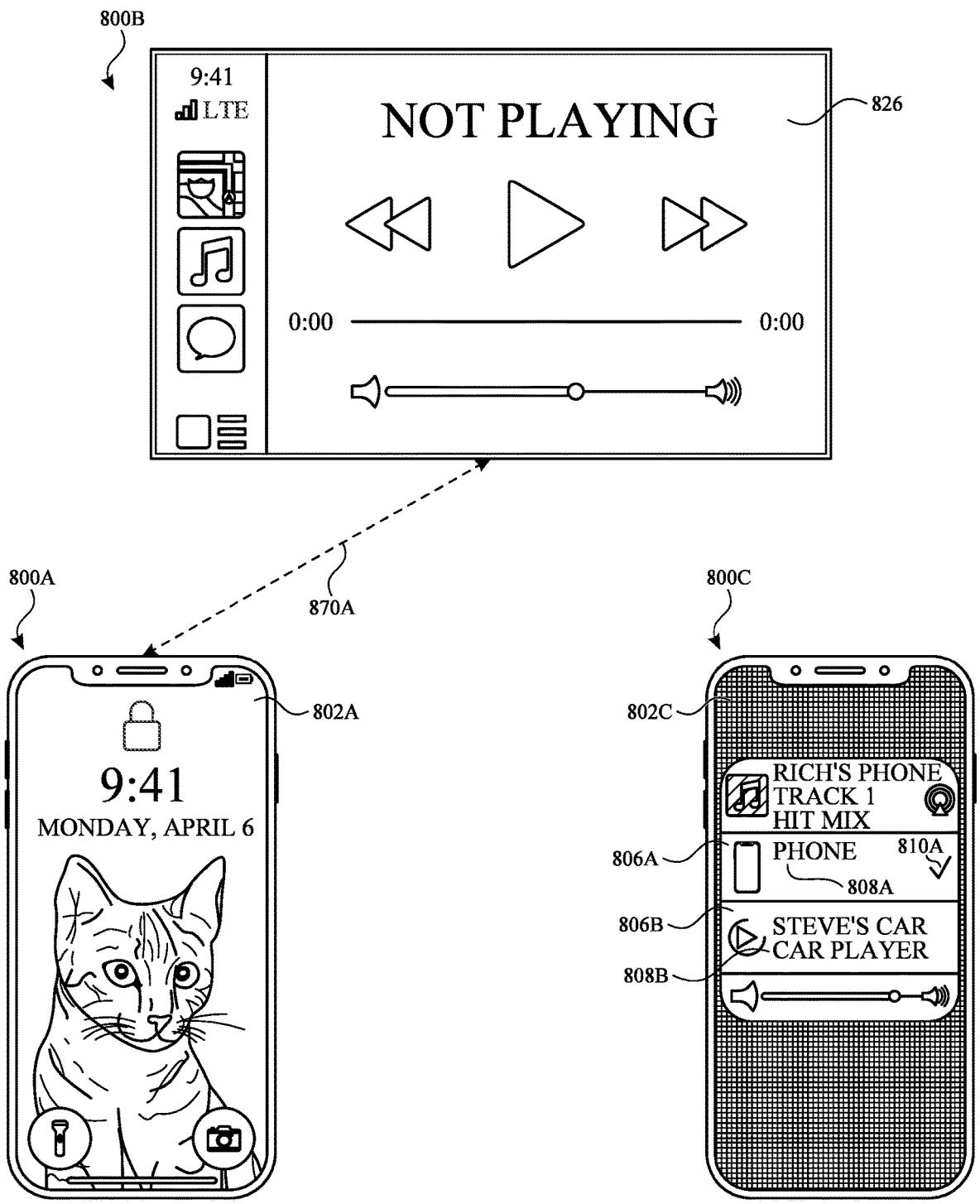

As illustrated in FIG. 8G, in response to detecting input 895D, device 800C displays audio control 830 at a higher volume level. In turn, device 800A receives an indication from 800C to increase the volume on display screen 800B and causes display screen 800B to display volume control 828 at the higher volume level.

Moreover, while transmitting media to display screen 800B for playback, a user can decide to boot off transmitting devices, such as device 800C. This concept is further illustrated in FIGS. 8G-8I. Turning to FIG. 8G, while transmitting media to display screen 800B for playback, device 800A causes display screen 800B to display informational affordance 832. Informational affordance 832 identifies device 800C as currently transmitting media to display screen 800B. Information affordance 832 is also included in media application 826.

While displaying information affordance 832, device 800A detects input 895E on informational affordance 832. As illustrated in FIG. 8I, in response to detecting input 895E, device 800A causes display screen 800B to display boot off interface 834. Boot off interface 834 includes boot off affordance 836 and cancel affordance 838. Boot off affordance 836 indicates that device 800C as a device that will be disconnected if the affordance is selected. While displaying boot off affordance 836, device 800A receives input 895F corresponding to a selection of boot off affordance 836.

As illustrated in FIG. 8I, in response to receiving input 895F, device 800A ceases transmission of the media for playback to display screen 800B. When devices 800A and 800C are no longer connected, the user of device 800C may interpret the loss of connection 870B to be a loss of connection between display screen 800B and device 800C. This is at least because, as explained above, the user may have no indication that device 800C is connected to device 800A.

Moreover, in response to receiving input 895F, device 800A causes display screen 800B to indicate that no media is being played back in media application 826 ("NOT PLAYING"). In addition, device 800A causes boot interface 834, and/or boot off affordance 836, to cease to be displayed on display screen 800B.

Further, because devices 800A and 800C are no longer being connected by connection 870B, device 800C updates affordance 806*a* to indicate that device 800C is configured to directly playback media. Device 800C also ceases to display indication 810B. However, although, device 800C ceases to display indication 810B, device 800C continues to display affordance 806B and identifier 808B. Disconnecting device 800C, in FIG. 8S, does not disconnect device 800A from display screen 800B. Because device 800A maintains its connection to display screen 800B, device 800A continues to broadcast the identifier "Steve's Car Car Player."

Figure 8J:
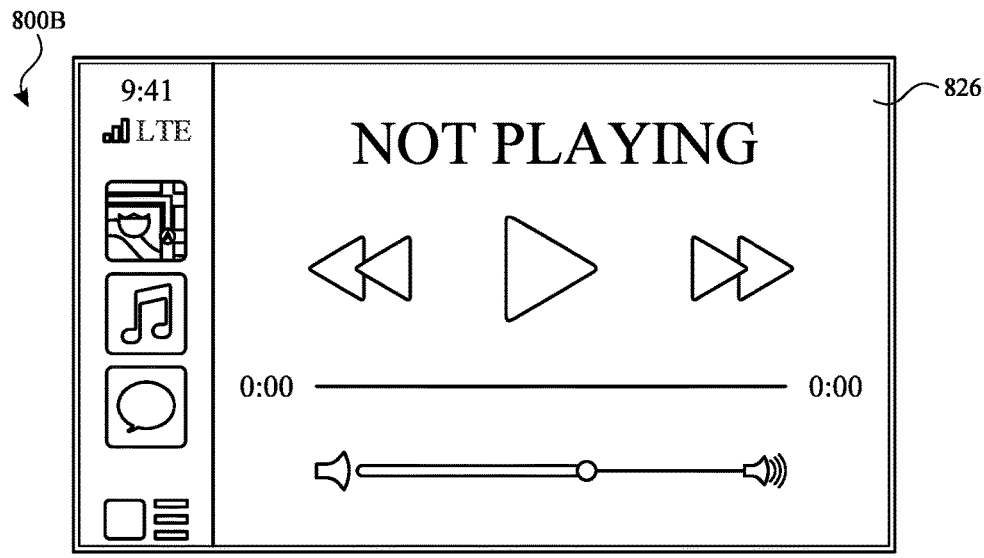
Figure 8J:
Figure 8J:
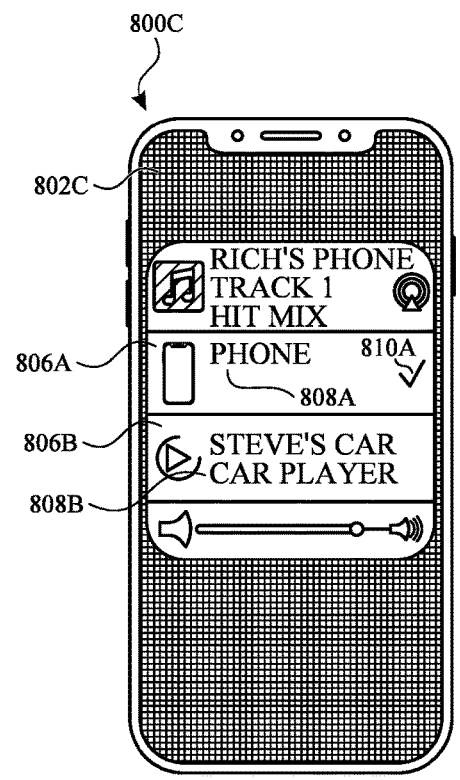

As illustrated in FIG. 8J, device 800A is no longer connected to display screen 800B, which is evident by 870A not being shown in FIG. 8J. In response to not being connected to the display, as illustrated in 8K, device 800A stops broadcasting the identifier, "Steve's Car Car Player."

In some embodiments, when device 800A is no longer connected to display screen 800B, device 800A removes availability of information indicating that device 800A is available to retransmit content from remote devices to display screen 800B. In some embodiments, removing availability of information indicating that device 800A is available to retransmit content from remote devices to display screen 800B further includes, ceasing to provide the information to device 800C.

Figure 8K:
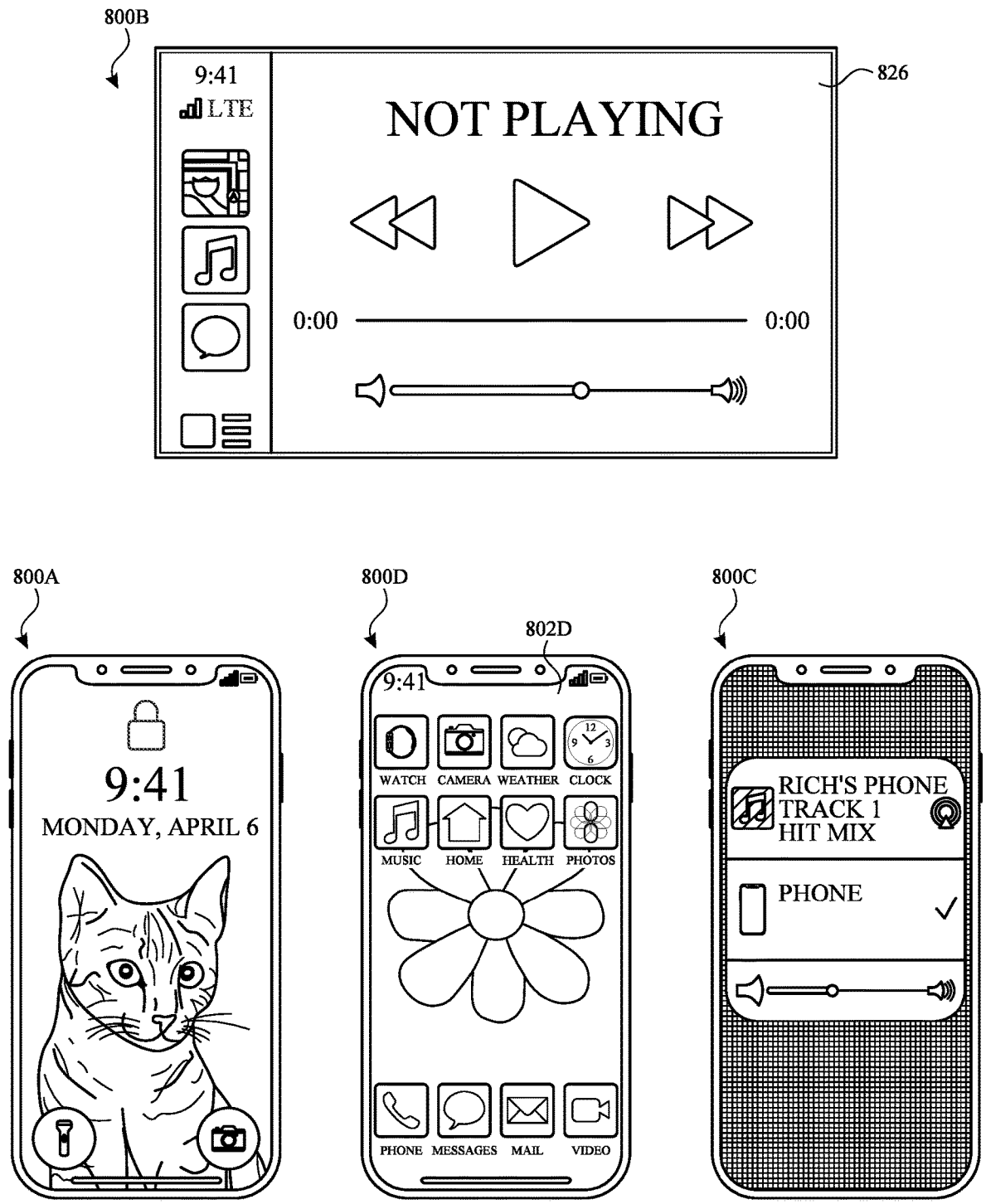

In turn, as illustrated in FIG. 8K, device 800C ceases to display affordance 806B with identifier 808B in accordance with a determination that connection 870B is not available. In some embodiments, device 800C maintains display of affordance 806B with identifier 808B when another connection to display screen 800B is available. However, because no connections are available in FIG. 8K, device 800C ceases to display affordance 806B with identifier 808B.

Figure 8L:
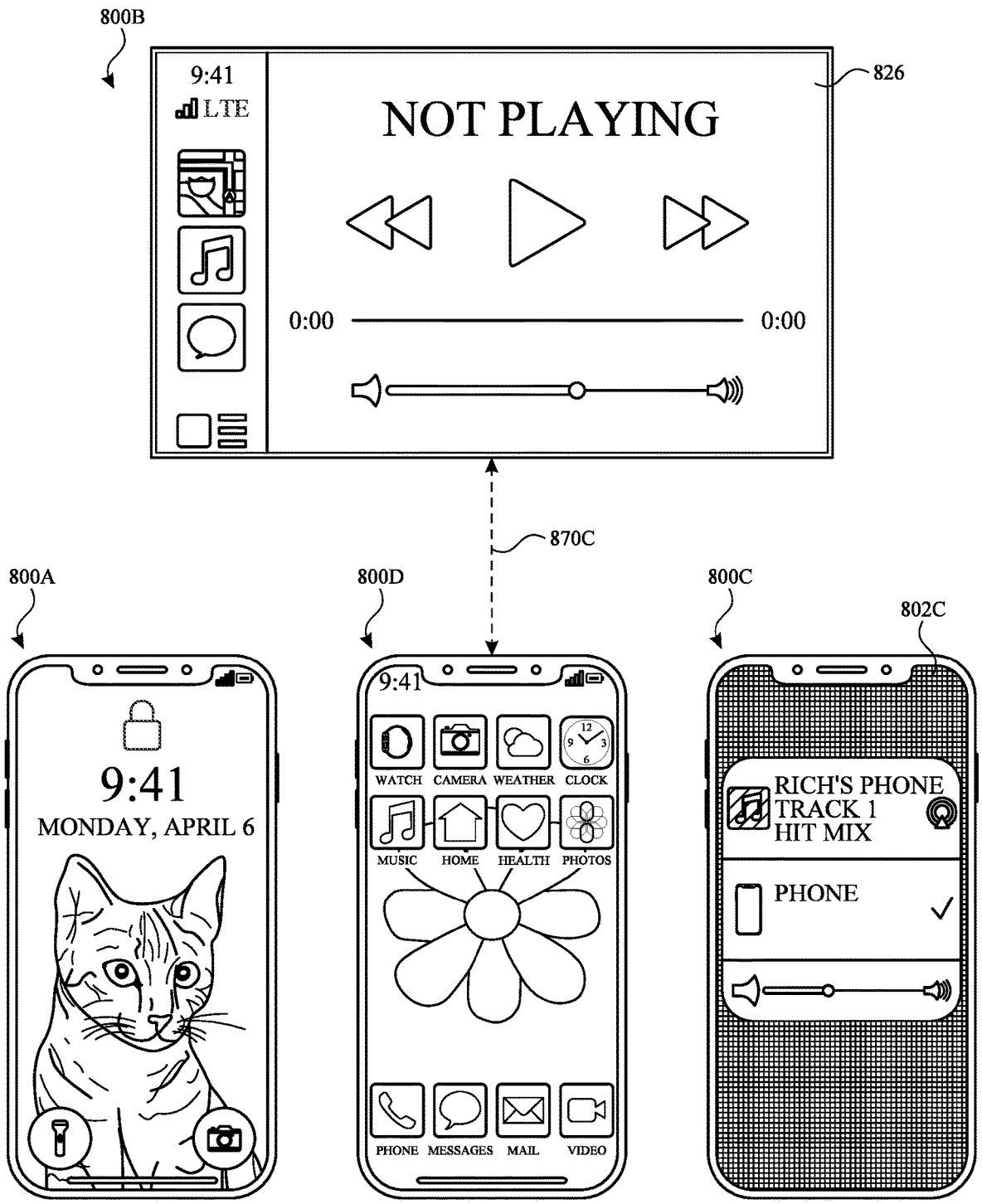

As illustrated in FIG. 8L, device 800D connects to display screen 800B via connection 870C. Device 800D is different than device 800A. In some embodiments, device 800D connects to display screen 800B, consistent with the techniques discussed above in relation to FIG. 8C.

In some embodiments, device 800C receives a second request to display available wireless media receiver devices. And, in response to receiving the second request, device 800C displays user interface 802C, as discussed above in relation to FIG. 8A.

Figure 8M:
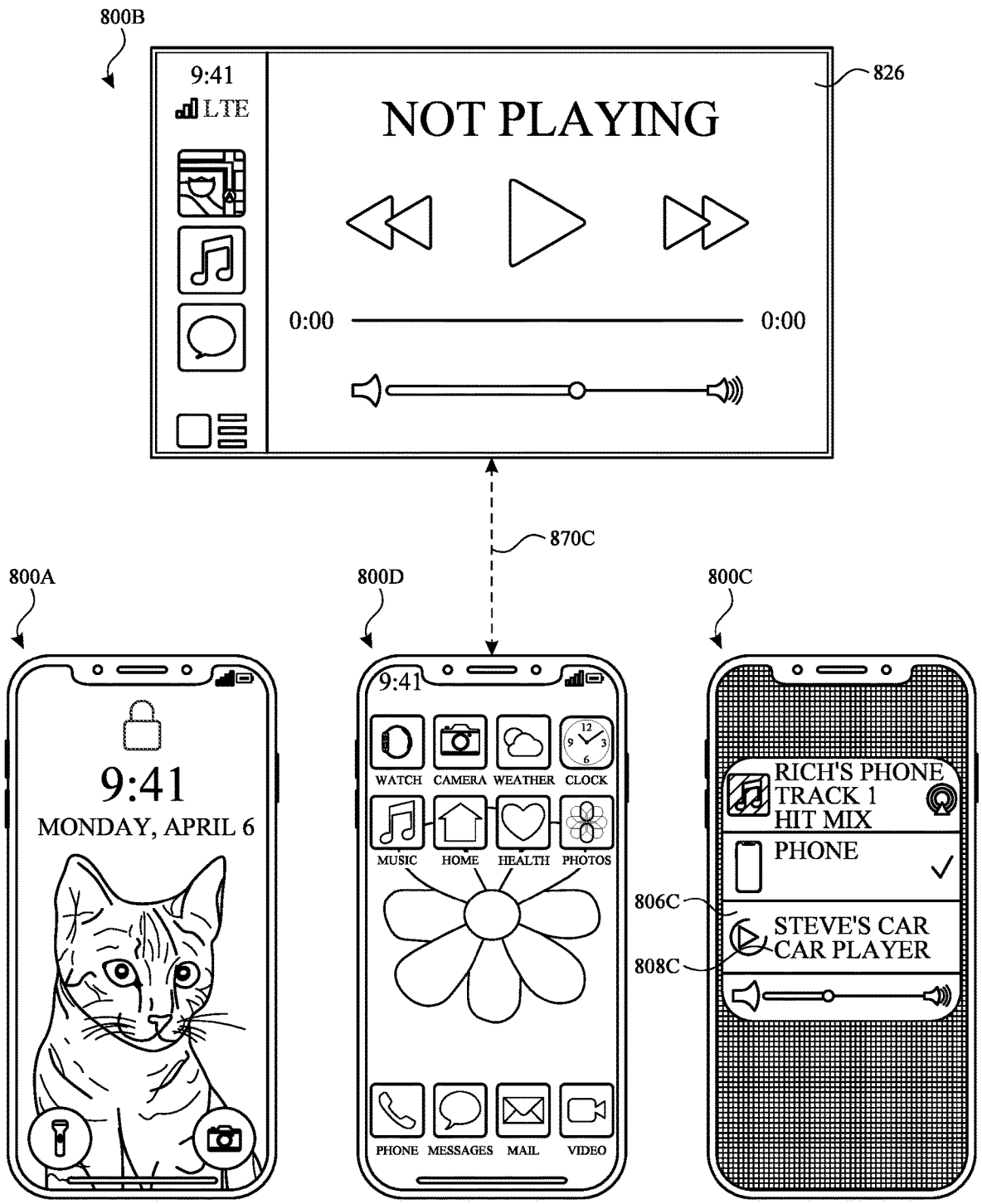
Figure 8N:
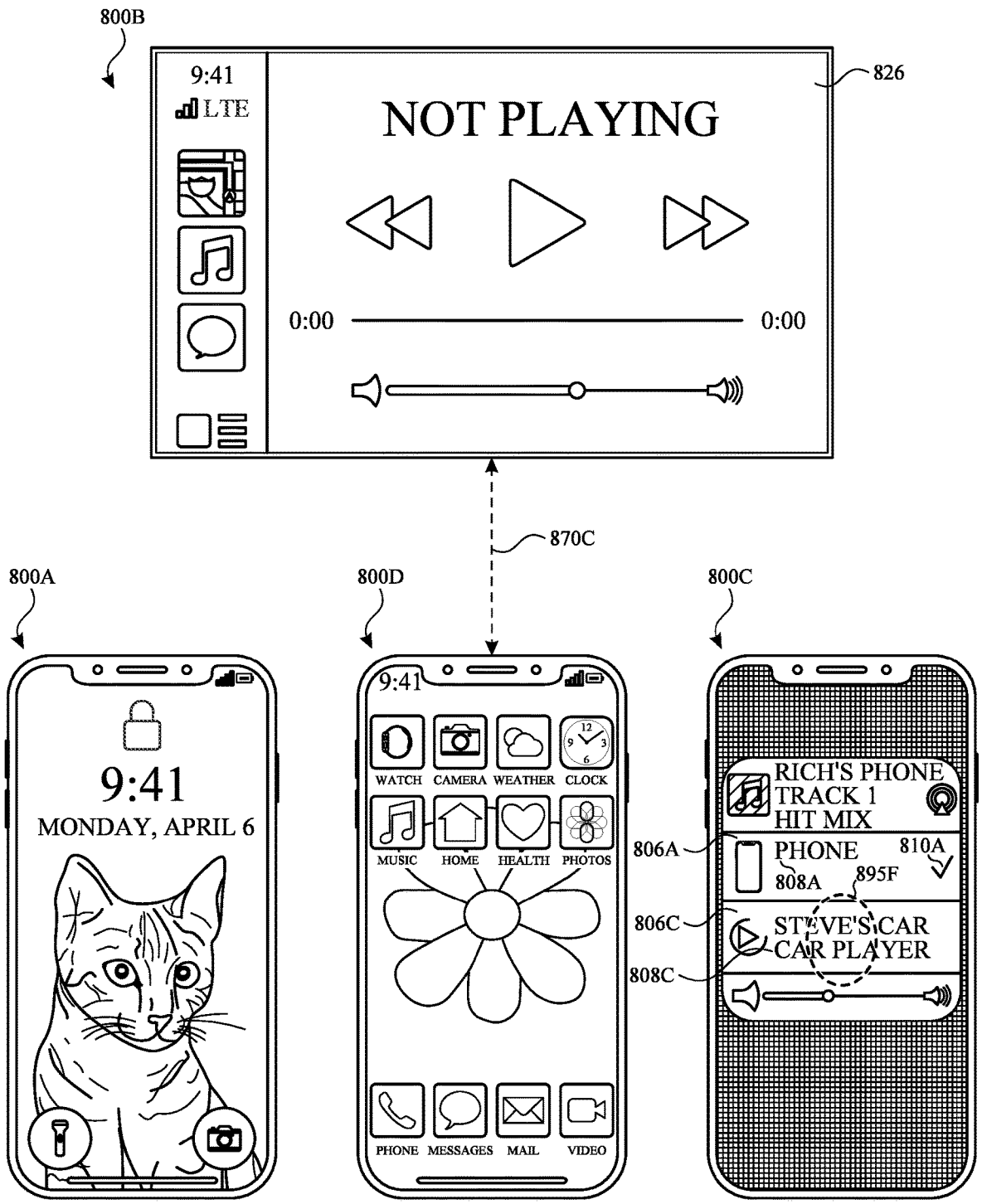

As illustrated in FIG. 8M, in accordance with a determination that connection 870C exists between device 800D and display screen 800B, device 800C displays affordance 806C. Affordance 806C includes identifier 808C. Identifier 808C is the same as identifier 808B. Here, device 800D derives or identifies the same the identifier for display screen 800B as device 800B, described above. Thus, multiple receiving devices (e.g., 800A and 800D) produced the same identifier. A user of a transmitting device may not be able to identify the different receiving devices. Notably, a user may only consider that device 800C can connect to display screen 800B. As illustrated in FIGS. 8N, while displaying affordance 806C, device 800C detects input 895Z on affordance 806C.

Figure 8O:
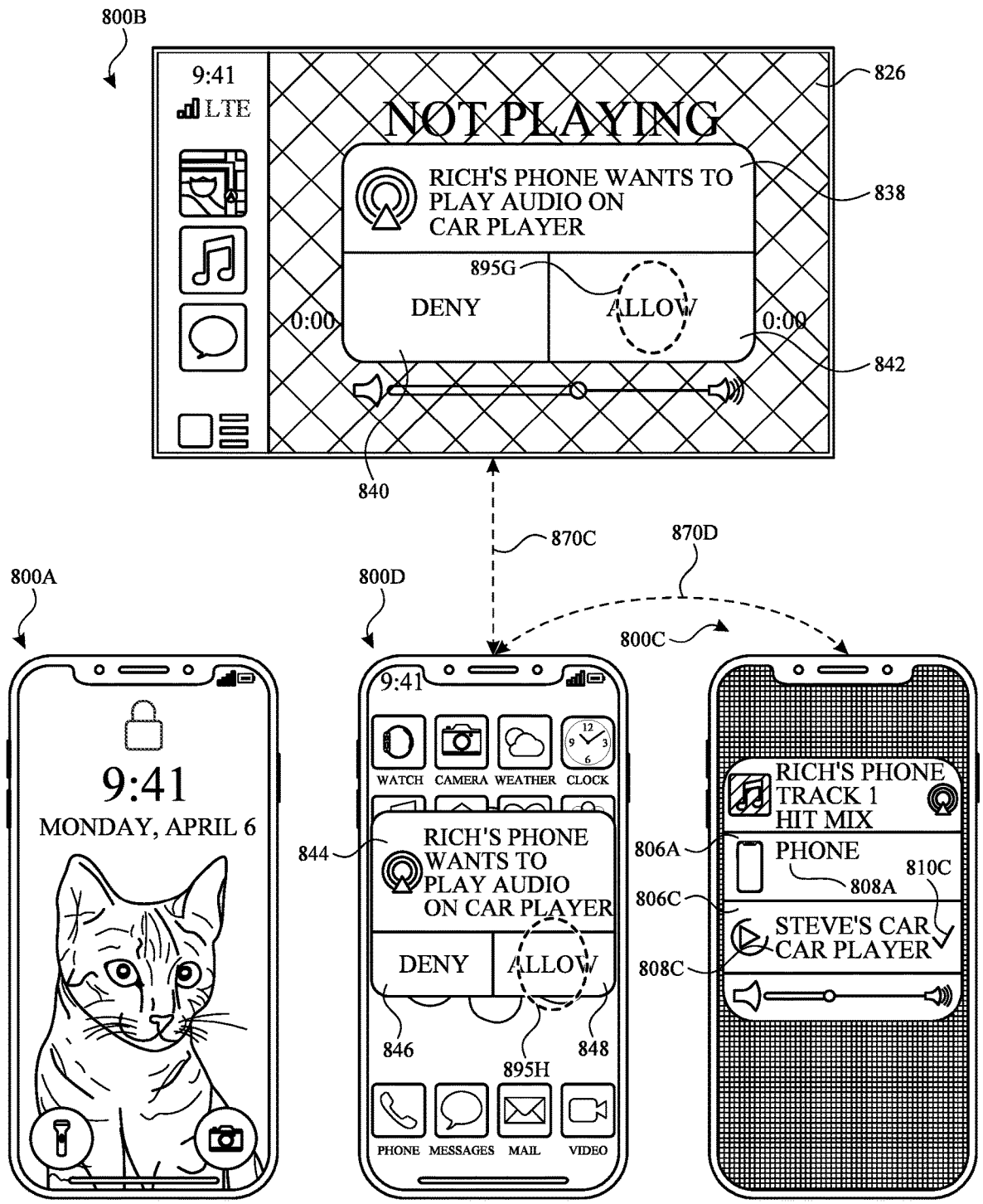
Figure 8P:
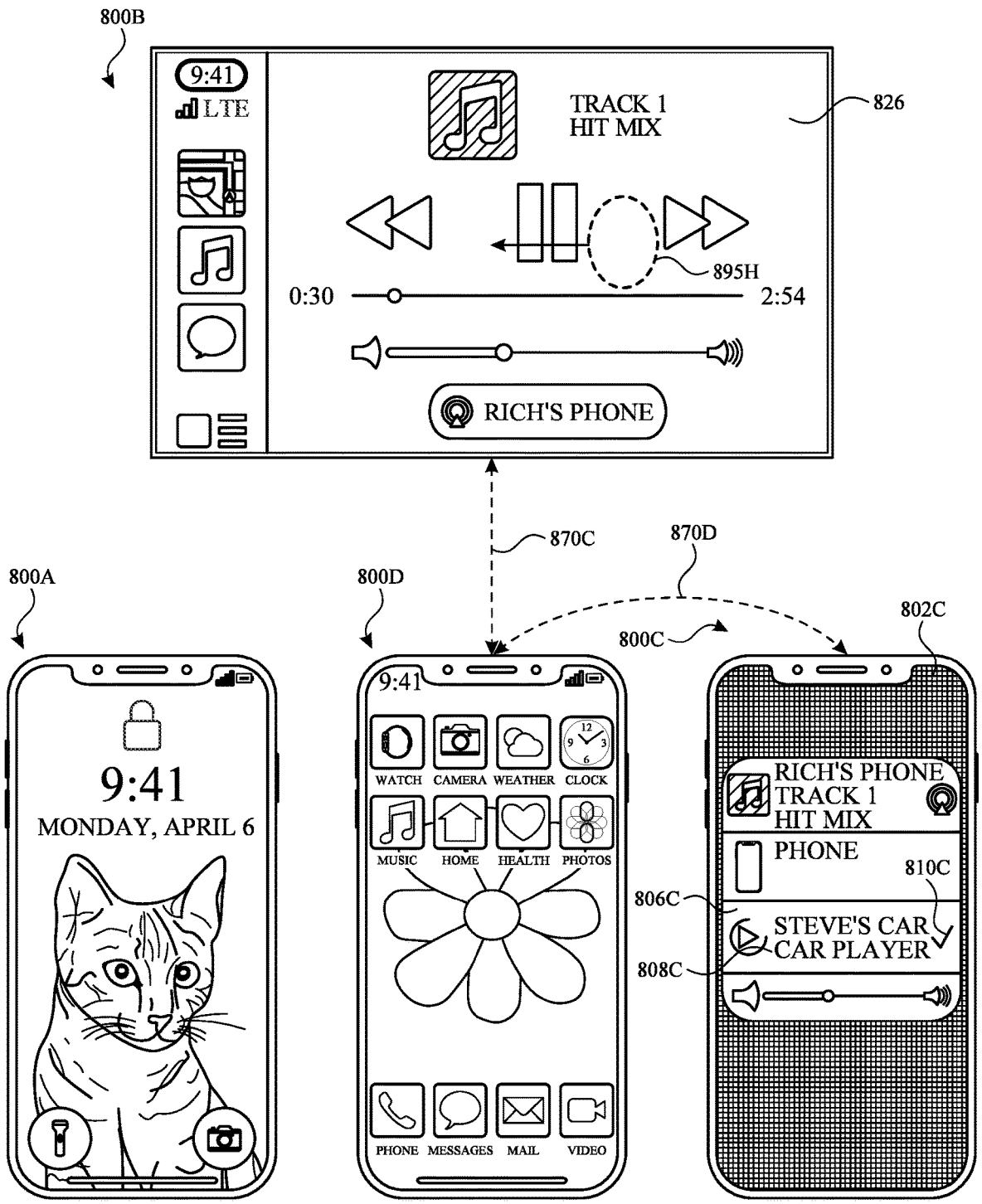

As illustrated in FIGS. 8O-8P, in response to detecting input 895Z, devices 800C and 800D establish connection 870C. Device 800D detects inputs 895G on allow respective affordances 842, and devices 800B, 800C, and 800D receive and/or transmit media and update user interfaces 802B, 802C, and 802D, consistent with the discussion of FIGS. 8B-8F.

Further, as illustrated in FIG. 8P, device 800D and display screen 800B are connected via connection 870C and devices 800C and 800D are connected via connection 870D. Device 800D also displays user interface 802C. User interface 802C includes indication 810C that indicates that device 800C is configured to transmit media via display screen 800B.

In addition, device 800D is causing media application 826 to be displayed on display screen 800B. While causing media application 826 to be displayed on display screen 800B, device 800D detects input 895H on user interface 802C.

Figure 8Q:
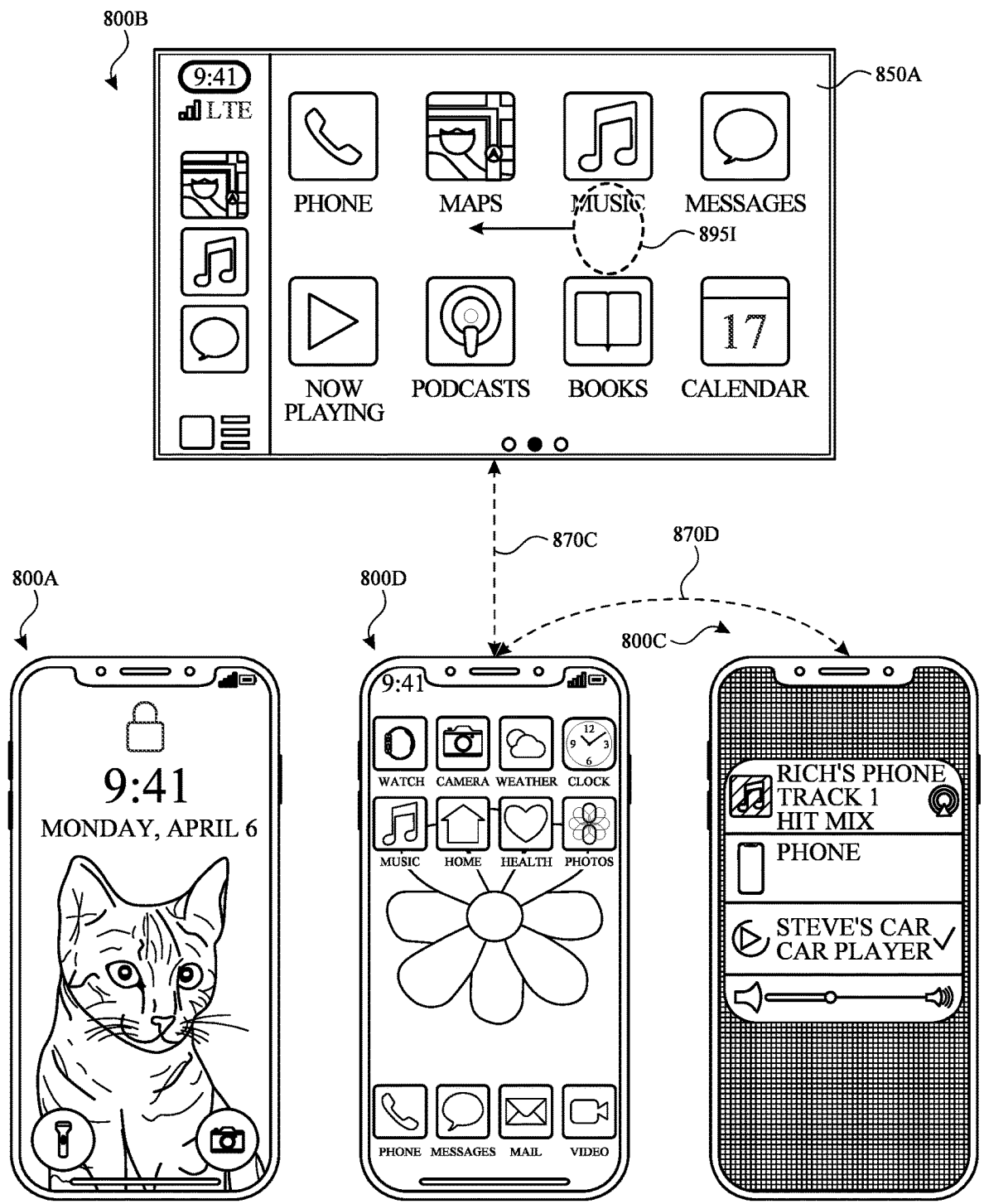

As illustrated in FIG. 8Q, in response to detecting input 895H, device 800D causes icon interface 850A that includes a first group of icons (e.g., phone maps, music, etc.) to be displayed on display screen 800B. While causing icon interface 850A including the first group of icons to be displayed, device 800D detects input 895I on icon interface 850A.

Figure 8R:
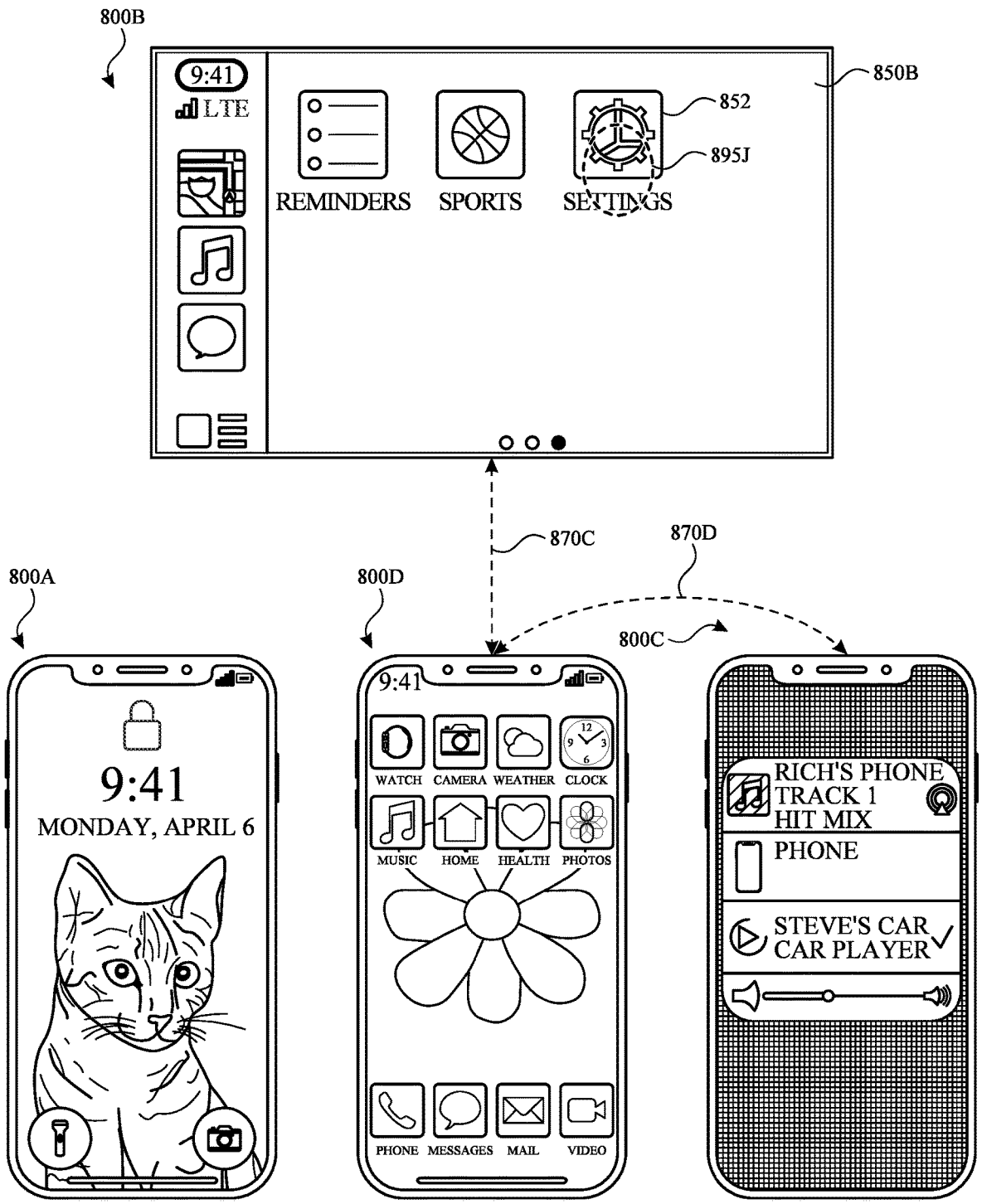

As illustrated in FIG. 8R, in response to detecting input 895I, device 800D causes icon interface 850B that includes a second group of icons (e.g., phone maps, music) to be displayed on display screen 800B. The second group of icons includes settings icon 852. At 8R, device 800D detects input 895J on icon interface 850A.

Figure 8S:
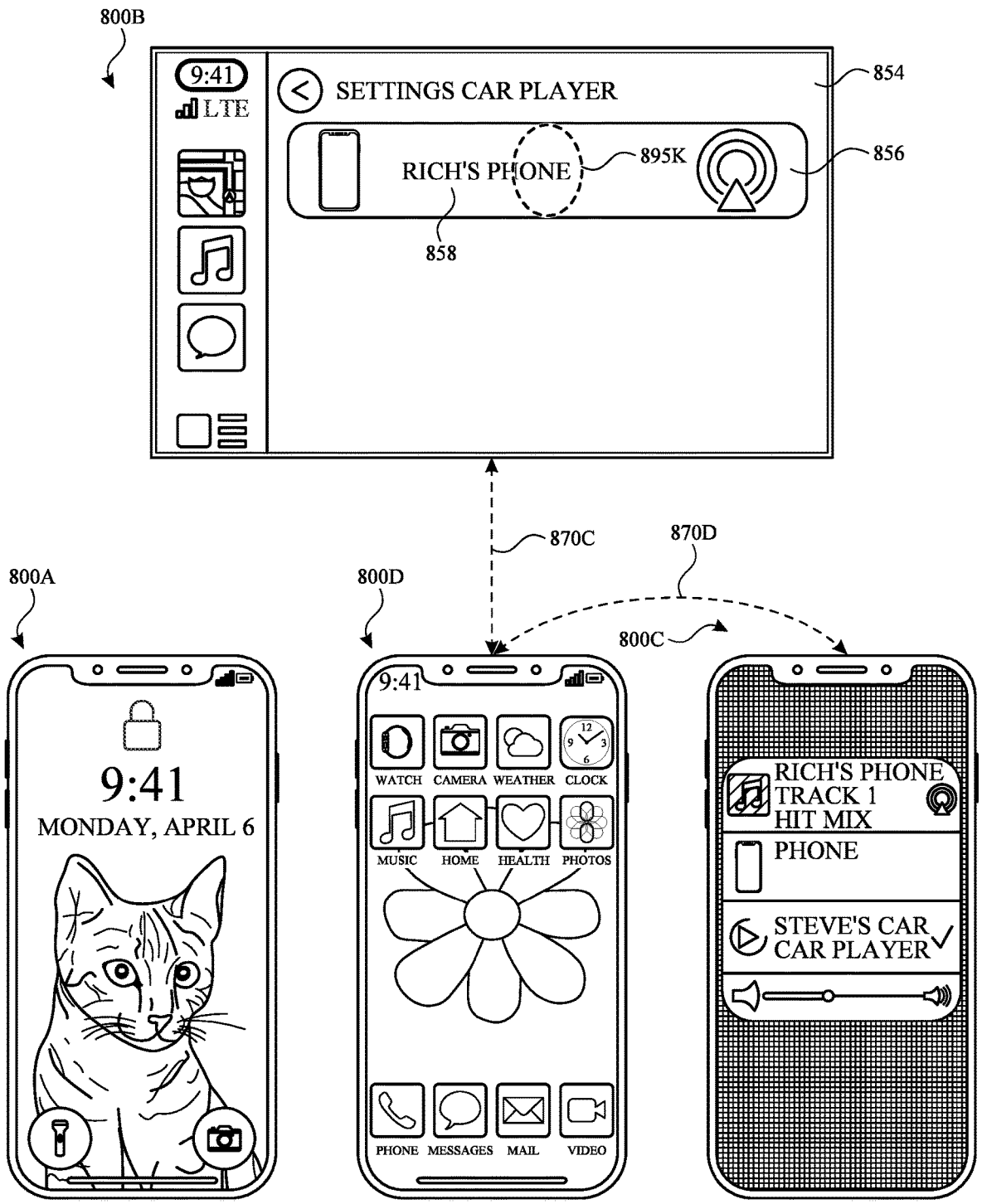

As illustrated in FIG. 8S, in response to detecting input 895J on settings icon 852, device 800D causes settings user interface 854 to be displayed on display screen 800B. Settings user interface 854 includes existing connection affordance 856. Existing connection affordance 856 includes identifier 858 that identifies device 800C as the connecting device ("RICH's PHONE"). While displaying existing connection affordance 856 that includes identifier 858, device 800D detects input 895K.

As illustrated in FIG. 8T, in response to detecting input 895K, device 800D causes to be displayed disconnect affordance 860 and cancel affordance 862. While displaying disconnect affordance 860, device 800D detects input 895L on disconnect affordance 895L.

FIGS. 9A-9B are a flow diagram illustrating a method for coordinating access to media, using an electronic device in accordance with some embodiments. Method 900 is performed at a first electronic device (e.g., 100, 300, 500) (e.g., a digital media player, a digital media playback coordination device (e.g., a phone configured to coordinate media playback)) with one or more antennas (e.g., one or more Wi-Fi antennas, Bluetooth antennas). Some operations in method 900 are, optionally, combined, the orders of some operations are, optionally, changed, and some operations are, optionally, omitted.

As described below, method 900 provides an intuitive way for coordinating access to media. The method reduces the cognitive burden on a user for accessing media, thereby creating a more efficient human-machine interface. For battery-operated computing devices, enabling a user to access media faster and more efficiently conserves power and increases the time between battery charges.

While the first electronic device (e.g., device 800A or device 800D) is connected (e.g., 870*a*) (e.g., wirelessly connected, via the one or more antennas (e.g., via a wireless communication protocol (e.g., Bluetooth)) to an accessory (e.g., display screen 800B) (e.g., an electronic device (e.g., a device including a second display device (e.g., a head unit installed in a car))) that includes one or more output devices (e.g., a display screen, speakers), the first electronic device provides (902) (e.g., FIGS. 8B-8C, 8K-8L), via the one or more antennas (e.g., via a wireless communication protocol (e.g., Bluetooth)), information (e.g., FIGS. 8B-8C, 8K-8L) (e.g., data (e.g., including an identifier)) to a second electronic device (e.g., 800C) (e.g., a digital media player, a digital media playback coordination device (e.g., a phone configured to coordinate media playback)) that indicates that the first electronic device is available to retransmit content (e.g., media) from the second electronic device to the accessory information (e.g., FIGS. 8B-8C, 8K-8L). In some embodiments, the first electronic device is connected (e.g., 870*a*) to the accessory by receiving, via an input device (e.g., the antenna, a power circuit (e.g., a power button or switch), a proximity sensor), an input (e.g., powering on the electronic device, bringing the electronic device within connection range of a compatible accessory, selecting the accessory from a list of available devices for connection) corresponding to a request to establish a connection with an accessory (e.g., a second electronic device (e.g., a device including a display device (e.g., a head unit installed in a car))). In some embodiments, in response to receiving the input (e.g., 950*a*), the device establishes, via the antenna, the connection with the accessory.

In accordance with some embodiments, prior (904) to transmitting the media to the accessory for presentation via the one or more output devices of the accessory: the first electronic device receives (906), from the second electronic device, a request to connect to the accessory as the receiving source (e.g., via input 950A, FIGS. 8D-8E). In response to receiving the request to connect the accessory as the receiving source, the first electronic device causes to displayed (908), on at least one of the one or more output devices of the accessory, a user interface that includes a confirmation screen (e.g., confirmation screen 812, 820) to allow (e.g., affordances 816, 824) or deny (affordance 814, 822) the connection to the accessory as the receiving source. In some embodiments, the confirmation screen (e.g., 812) is displayed on the first electronic device while or instead of displaying the confirmation screen on a display screen of the accessory. Displaying a confirmation screen in response to receiving a request to connect to the accessory helps a user of the accessory control what devices can transmit information to the accessory for playback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

After providing (e.g., broadcasting) the information to the second electronic device (e.g., FIGS. 8D, 8E), the first electronic device receives (910), from the second electronic device, via the one or more antennas, media (e.g., 804) (e.g., audio media (e.g., music), visual media (e.g., video). In some embodiments, the first electronic device provides information to the second electronic device in accordance with a determination that first electronic device identifier broadcast criteria are met. In some embodiments, the first electronic device identifier broadcast criteria include a criterion that is satisfied when the accessory is an accessory of a first type (e.g., the accessory is an accessory compatible with a media-handling standard) are met. In some embodiments, in accordance with the determination that the first electronic device identifier broadcast criteria are met, the first electronic device broadcasts, via the antenna and using a first electronic device identifier (e.g., an identifier that is selected based on the accessory and/or the status of being connected to the accessory), that the electronic device is available to receive wireless media (e.g., receive wireless media from a second electronic device, different than the accessory). In some embodiments, the electronic device includes a device identifier (e.g., a default device identifier; an identifier used to identify the electronic device when it is not connected to the accessory) and the first electronic device identifier is different than the device identifier). In some embodiments, prior to broadcasting, via the antenna and using the first electronic device identifier, that the electronic device is available to receive wireless media, the electronic device was broadcasting, via the antenna and using a second electronic device identifier, different than the first electronic device identifier, that the electronic device is available to receive wireless media. In some embodiments, prior to broadcasting, via the antenna and using the first electronic device identifier, that the electronic device is available to receive wireless media, the electronic device was not broadcasting that the electronic device is available to receive wireless media.

The first electronic device transmits (912) the media to the accessory for presentation via the one or more output devices of the accessory (e.g., FIG. 8F).

After transmitting the media to the accessory for presentation via the one or more output devices, the first electronic device detects (914) that the first electronic device is no longer connected to the accessory (e.g., FIGS. 8I-8F).

In response to detecting that the first electronic device is no longer connected to the accessory, the first electronic device removes (918) availability of information indicating that the first electronic device is available to retransmit content from remote devices to the accessory (e.g., FIGS. 8I-8F). In some embodiments, the first electronic device detects that the first electronic device is no longer connected to the accessory (and/or does not provide information to the electronic device) in accordance with a determination that the first electronic device identifier broadcast criteria are not met. Thus, in some embodiments, the first electronic device forgoes broadcasting, via the antenna and using the first electronic device identifier, that the electronic device is available to receive wireless media. In some embodiments, forgoing broadcasting, via the antenna and using the first electronic device identifier, that the electronic device is available to receive wireless media includes the first electronic device broadcasting, via the antenna and using a second electronic device identifier, different than the first electronic device identifier, that the electronic device is available to receive wireless media. In some embodiments, forgoing broadcasting, via the antenna and using the first electronic device identifier, that the electronic device is available to receive wireless media includes forgoing broadcast (e.g., altogether) that the electronic device is available to receive wireless media). Controlling the availability of information indicating that the first electronic device is available to transmit based on whether the device is connected to an accessory allows a second electronic device (and a user of the electronic device) to quickly recognize whether there is a connection available for the second electronic device to connect to the accessory via the first electronic device. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, removing availability of information indicating that the first electronic device is available to retransmit content from remote devices to the accessory further includes the first electronic device ceasing (920) to provide (e.g., broadcast) the information to the second electronic device (e.g., FIGS. 8I-8F)

In accordance with some embodiments, the information to the second electronic device that indicates that the first electronic device is available to retransmit content from the second electronic device to the accessory includes information identifying the first electronic device by an identifier that corresponds to the accessory (e.g., as the car source (e.g., identifying that a device connected to play audio, send and receive information, control an application such as maps)). In some embodiments, the identifier that corresponds to the accessory is an identifier of the accessory (e.g., "Car Model" when the accessory is "Car Model") or an identifier derived from an identifier of the accessory (e.g., "Car Model Stereo" when the accessory is "Car Model." Updating the information to reflect information identifying the first electronic device by an identifier that corresponds to the accessory (e.g., a car) and not the first electronic device (e.g., a phone) provides visual feedback to the user indicating that media transmitted to the accessory will be output by the accessory. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the information to the second electronic device is provided in a format that is compliant with a communication protocol (e.g., a wireless streaming protocol)) for identifying nearby devices that are available to receive content (e.g., media (e.g., audio, video)) of a predetermined content type (e.g., audio/video files) (e.g., FIG. 8B).

In accordance with some embodiments, the media includes audio, and the one or more output devices of the accessory include a speaker. In some embodiments, the one or more output devices are wired to the accessory. In some embodiments, the one or more outputs are wirelessly connected to the accessory.

Before detecting that the first electronic device is no longer connected to the accessory: while transmitting media to the accessory for presentation via the one or more output devices of the accessory, the first electronic device causes to be displayed, on at least one of the one or more output devices, a user interface of an application (e.g., 826) that corresponds to playback of media (e.g., a media application that corresponds to playing back a media application), wherein the user interface includes an affordance (e.g., 832) (e.g., boot off affordance (e.g., boot of affordance includes identifying information of the second electronic device)) (e.g., FIGS. 8G-8H). In some embodiments, the user interface is displayed on the first electronic device while or instead of displaying the user interface on a display screen of the accessory. In response to receiving user input (e.g., 895E) corresponding to a selection of the affordance, the first electronic device ceases transmission of the media to the accessory for presentation via the one or more output devices of the accessory (e.g., FIGS. 8G-8H). In some embodiments, ceasing transmission of the media to the accessory for presentation via the one or more output devices of the accessory disconnects the first and second electronic devices (e.g., FIGS. 8G-8H). In some embodiments, ceasing transmission of the media to the accessory for presentation via the one or more output devices of the accessory does not disconnect the first and second electronic devices. In some of these embodiments, the first electronic device is able to retransmit a different type of media than the one it previously transmitted to the accessory. In some embodiments, the affordance is displayed outside of the application that corresponds to the playback of media (e.g., in a settings application) (e.g., FIGS. 8G-8H).

Note that details of the processes described above with respect to method 900 (e.g., FIGS. 9A-9B) are also applicable in an analogous manner to the methods described below/above. For example, methods 700 and 1000 optionally includes one or more of the characteristics of the various methods described above with reference to method 900. For example, method 900 may be combined with methods 700 and 1000 to operate a display screen and multiple devices.

FIG. 10 is a flow diagram illustrating a method for coordinating access to media, using an electronic device in accordance with some embodiments. Method 1000 is performed at a first electronic device (e.g., 100, 300, 500) (e.g., a media storage device, a media transmitting device (e.g., a phone storing digital media)) with a display device and one or more input devices (e.g., Wi-Fi antenna, Bluetooth antenna, etc.). Some operations in method 1000 are, optionally, combined, the orders of some operations are, optionally, changed, and some operations are, optionally, omitted.

As described below, method 1000 provides an intuitive way for coordinating access to media. The method reduces the cognitive burden on a user for accessing media, thereby creating a more efficient human-machine interface. For battery-operated computing devices, enabling a user to access media faster and more efficiently conserves power and increases the time between battery charges.

The first electronic device (e.g., 800C) receives (1002), via the one or more input devices, a request to display available wireless media receiver devices (e.g., a digital media player, a digital media playback coordination device (e.g., FIG. 8A) (e.g., a phone configured to coordinate media playback)).

In response (1004) to receiving the request, the first electronic device displays, via the display device, a user interface (e.g., 802C) for selecting a wireless media receiver for media (e.g., digital audio and/or video) from the first electronic device, including: in accordance with a determination that a wireless connection to an accessory (e.g., display screen 800b) (e.g., an electronic device (e.g., a device including a second display device (e.g., a head unit installed in a car))) for receiving media via a wireless connection is available, displaying (1006) an affordance for selecting the accessory to receive wireless media (e.g., 806A, 806B, 806C), wherein the affordance for selecting the accessory to receive wireless media establishes a connection (e.g., 870b, 870d) between the first electronic device and a second electronic device (e.g., 800A, 800D) (e.g., a digital media player, a digital media playback coordination device (e.g., a phone configured to coordinate media playback)) that is connected to the accessory; and in accordance with a determination that a wireless connection to the accessory for receiving media via the wireless connection is not available, forgoing (1014) displaying the affordance for selecting the accessory to receive wireless media, wherein the connection to the accessory for receiving media via the wireless connection is not available when no devices (e.g., no digital media players or digital media playback coordination devices) are connected (e.g., wirelessly connected) to the accessory (e.g., FIG. 8K).

Choosing to display an affordance for selecting the accessory to receive wireless media in accordance with a determination that a wireless connection to the accessory is available for receiving media to quickly recognize whether there is a connection available to connect to the accessory. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the affordance for selecting the accessory to receive wireless media includes information (e.g., 808B) (e.g., a name) identifying the second electronic device by an identifier (e.g., 808B) that corresponds to the accessory (e.g., as the car source (e.g., identifying that a device connected to play audio, send and receive information, control an application such as maps)) or an identifier derived from an identifier of the accessory (e.g., Car Model Stereo" when the accessory is "Car Model"). In some embodiments, the identifier that corresponds to the accessory is an identifier of the accessory (e.g., "Car Model" when the accessory is "Car Model." Updating the information to reflect information identifying the first electronic device by an identifier that corresponds to the accessory (e.g., a car) and not the first electronic device (e.g., a phone) provides visual feedback to the user indicating that media transmitted to the accessory will be output by the accessory. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the request to display available media devices is a first request. The first electronic device receives, via the one or more input devices, a second request to display available wireless media receiver devices (e.g., at a later time) (e.g., a digital media player, a digital media playback coordination device (e.g., a phone configured to coordinate media playback)) (e.g., FIG. 8K). In response to receiving the second request, the first electronic device displays, via the display device, a user interface (e.g., 802c) for selecting a wireless media receiver for media (e.g., digital audio and/or video) from the first electronic device, including: in accordance with a determination that a second wireless connection (e.g., 870B, 870D) to an accessory (e.g., a second electronic device (e.g., a device including a second display device (e.g., a head unit installed in a car))) for receiving media via a wireless connection is available, displaying the affordance (e.g., 806B, 806C) for selecting the accessory to receive wireless media, wherein the affordance for selecting the accessory to receive wireless media establishes a connection between the first electronic device and a third electronic device (e.g., 808D, 808A) (e.g., a digital media player, a digital media playback coordination device (e.g., a phone configured to coordinate media playback); an electronic device that is different than the second electronic device) that is connected to the accessory, and wherein the affordance for selecting the accessory to receive wireless media includes information (e.g., a name) identifying the second electronic device by the identifier (e.g., 808B, 808C) that corresponds to the accessory; in accordance with a determination that a second wireless connection to the accessory for receiving media via the wireless connection is not available, forgoing displaying the affordance for selecting the accessory to receive wireless media, wherein the connection to the accessory for receiving media via the wireless connection is not available when no devices (e.g., no digital media players or digital media playback coordination devices) are connected (e.g., wirelessly connected) to the accessory (e.g., FIG. 8K with respect to device 800A). In some embodiments, other devices that are connected to accessory get the same name as the second electronic device that is connected to the same accessory. In some embodiments, the first electronic device displays multiple identical identifying information (e.g., "car" for second electronic device and "car" for third electronic device) (806A, 806B).

Updating the information to reflect information identifying the accessory (e.g., a car) and not the first electronic device (e.g., a phone) to two or more devices provides visual feedback to the user indicating that media transmitted to the accessory will be output by the accessory. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, while displaying the affordance for selecting the accessory to receive wireless media, the first electronic device receives (1008) user input (e.g., 895A) corresponding to a selection of the affordance for selecting the accessory to receive wireless media. In response to receiving user input corresponding to a selection of the affordance for selecting the accessory to receive wireless media: the first electronic device connects (1010) to the second electronic device (e.g., 870b, FIG. 8E). While connected to the second electronic device, the first electronic device displays (1014) an indication (e.g., 810B, 810C) that the first electronic device is connected to the accessory. Choosing to display an affordance in a state (e.g., connected) while connected to the second electronic device, which has connected to the second electronic device when user input is received that corresponds to a selection of an affordance provides a user with an indication of whether an electronic device is connected or not connected to the accessory after input is provided. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, while connected to the second electronic device, the first electronic device transmits media (e.g., 804) to the second electronic device for presentation via one or more output devices of the accessory (e.g., FIG. 8F). While transmitting media to the second electronic device for presentation via one or more output devices of the accessory, the first electronic device displays an indication (e.g., 804) of the media that is transmitting to the second electronic device for presentation via one or more output devices of the accessory.

In accordance with some embodiments, while transmitting media to the second electronic device for presentation via one or more output devices of the accessory, the first electronic device receives a request to cease transmission of media (e.g., FIGS. 8H-8I). In response to receiving the request to cease transmission of media, the first electronic device ceases transmission of the media the second electronic device that is connected to the accessory. In some embodiments, the first electronic device continues to be connected to the second electronic device. In some embodiments, the first electronic device does not continue to be connected to the second electronic device.

Note that details of the processes described above with respect to method 1000 (e.g., FIG. 10) are also applicable in an analogous manner to the methods described below/above. For example, methods 700 and 900 optionally includes one or more of the characteristics of the various methods described above with reference to method 1000. For example, method 1000 may be combined with methods 700 and 900 to operate a display screen and multiple devices. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery of applications based on individualize context. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted application functionality through widgets that are of greater interest to the user. Accordingly, use of such personal information data enables users to control of the delivery of the targeted application functionality through widgets within the scope of certain use contexts. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of application functionality delivery based on certain context, the present technology can be configured to allow users to select to "opt in" or "opt out" of participation in the collection of personal information data during registration for services or anytime thereafter. In another example, users can select not to provide personal information, such as the state of their devices and/or personal information, such as their current location. In yet another example, users can select to limit the length of time state of their devices and/or personal information, such as their current location, is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, application functionality can be selected and delivered to users by inferring preferences based on non-personal information data or a bare minimum amount of personal information, such as the content being requested by the device associated with a user, other non-personal information available to the application functionality delivery services, or publicly available information.

What is claimed is:

1. A first electronic device, comprising:
a display device;
one or more input devices;
one or more processors; and
memory storing one or more programs configured to be executed by the one or more processors, the one or more programs including instructions for:
receiving, via the one or more input devices, a request to display available wireless media receiver devices; and
in response to receiving the request, displaying, via the display device, a user interface for selecting a wireless media receiver for media from the first electronic device, including:
in accordance with a determination that a wireless connection to an accessory for receiving media via a wireless connection is available, displaying:
a first affordance for selecting the accessory to receive wireless media without displaying a second affordance for selecting a second electronic device that is connected to the accessory, wherein the first affordance for selecting the accessory to receive wireless media, when selected, establishes a connection between the first electronic device and the second electronic device that is connected to the accessory, and wherein the second electronic device is configured to transmit wireless media, based on user input detected via the second electronic device, to the accessory independent of the connection between the first electronic device and the second electronic device; and
a third affordance for selecting the first electronic device to output media; and
in accordance with a determination that a wireless connection to the accessory for receiving media via the wireless connection is not available:
displaying the third affordance; and
forgoing displaying the first affordance for selecting the accessory to receive wireless media, wherein the connection to the accessory for receiving media via the wireless connection is not available when no devices are connected to the accessory.

2. The first electronic device of claim 1, wherein the first affordance for selecting the accessory to receive wireless media includes an identifier that corresponds to the accessory.

3. The first electronic device of claim 2, wherein the request to display available media devices is a first request, and wherein the one or more programs further including instructions for:
receiving, via the one or more input devices, a second request to display available wireless media receiver devices; and
in response to receiving the second request, displaying, via the display device, a user interface for selecting a wireless media receiver for media from the first electronic device, including:
in accordance with a determination that a second wireless connection to an accessory for receiving media via a wireless connection is available, displaying the first affordance for selecting the accessory to receive wireless media,
wherein the first affordance for selecting the accessory to receive wireless media establishes a connection between the first electronic device and a third electronic device that is connected to the accessory, and
wherein the first affordance for selecting the accessory to receive wireless media includes the identifier that corresponds to the accessory; and
in accordance with a determination that a second wireless connection to the accessory for receiving media via the wireless connection is not available, forgoing displaying the first affordance for selecting the accessory to receive wireless media, wherein the connection to the accessory for receiving media via the wireless connection is not available when no devices are connected to the accessory.

4. The first electronic device of claim 1, wherein the one or more programs further include instructions for:
while displaying the first affordance for selecting the accessory to receive wireless media, receiving user input corresponding to a selection of the first affordance for selecting the accessory to receive wireless media;
in response to receiving user input corresponding to the selection of the first affordance for selecting the accessory to receive wireless media:
connecting to the second electronic device; and
while connected to the second electronic device, displaying an indication that the first electronic device is connected to the accessory.

5. The first electronic device of claim 4, wherein the one or more programs further include instructions for:
while connected to the second electronic device, transmitting media to the second electronic device for presentation via one or more output devices of the accessory; and
while transmitting media to the second electronic device for presentation via one or more output devices of the accessory, displaying an indication of the media that is transmitting to the second electronic device for presentation via one or more output devices of the accessory.

6. The first electronic device of claim 4, wherein the one or more programs further include instructions for:

while transmitting media to the second electronic device for presentation via one or more output devices of the accessory, receiving a request to cease transmission of media; and in response to receiving the request to cease transmission of media:

ceasing transmission of the media the second electronic device that is connected to the accessory.

7. The first electronic device of claim 1, wherein the one or more programs further include instructions for:

while displaying the first affordance in accordance with the determination that the wireless connection to the accessory for receiving media via the wireless connection is available, receiving, via the one or more input devices, user input corresponding to selection of the first affordance; and in response to receiving the user input corresponding to selection of the first affordance, establishing the connection between the first electronic device and the second electronic device that is connected to the accessory, wherein establishing the connection between the first electronic device and the second electronic device that is connected to the accessory includes:

in accordance with a determination that the first electronic device satisfies a set of one or more authorization criteria, transmitting the wireless media to the second electronic device that is connected to the accessory; and in accordance with a determination that the first electronic device does not satisfy the set of one or more authorization criteria, forgoing transmitting the wireless media to the second electronic device that is connected to the accessory.

8. The first electronic device of claim 1, wherein:

the second electronic device includes an integrated input device, and the second electronic device is configured to transmit the wireless media, based on user input detected via the integrated input device, to the accessory independent of the connection between the first electronic device and the second electronic device.

9. A non-transitory computer-readable storage medium storing one or more programs configured to be executed by one or more processors of a first electronic device with a display device and one or more input devices, the one or more programs including instructions for:

receiving, via the one or more input devices, a request to display available wireless media receiver devices; and in response to receiving the request, displaying, via the display device, a user interface for selecting a wireless media receiver for media from the first electronic device, including:

in accordance with a determination that a wireless connection to an accessory for receiving media via a wireless connection is available, displaying:

a first affordance for selecting the accessory to receive wireless media without displaying a second affordance for selecting a second electronic device that is connected to the accessory, wherein the first affordance for selecting the accessory to receive wireless media, when selected, establishes a connection between the first electronic device and the second electronic device that is connected to the accessory, and wherein the second electronic device is configured to transmit wireless media, based on user input detected via the second electronic device, to the accessory independent of the connection between the first electronic device and the second electronic device; and a third affordance for selecting the first electronic device to output media; and in accordance with a determination that a wireless connection to the accessory for receiving media via the wireless connection is not available:

displaying the third affordance; and forgoing displaying the first affordance for selecting the accessory to receive wireless media, wherein the connection to the accessory for receiving media via the wireless connection is not available when no devices are connected to the accessory.

10. The non-transitory computer-readable storage medium of claim 9, wherein the first affordance for selecting the accessory to receive wireless media includes an identifier that corresponds to the accessory.

11. The non-transitory computer-readable storage medium of claim 10, wherein the request to display available media devices is a first request, and wherein the one or more programs further including instructions for:

receiving, via the one or more input devices, a second request to display available wireless media receiver devices; and in response to receiving the second request, displaying, via the display device, a user interface for selecting a wireless media receiver for media from the first electronic device, including:

in accordance with a determination that a second wireless connection to an accessory for receiving media via a wireless connection is available, displaying the first affordance for selecting the accessory to receive wireless media, wherein the first affordance for selecting the accessory to receive wireless media establishes a connection between the first electronic device and a third electronic device that is connected to the accessory, and wherein the first affordance for selecting the accessory to receive wireless media includes the identifier that corresponds to the accessory; and in accordance with a determination that a second wireless connection to the accessory for receiving media via the wireless connection is not available, forgoing displaying the first affordance for selecting the accessory to receive wireless media, wherein the connection to the accessory for receiving media via the wireless connection is not available when no devices are connected to the accessory.

12. The non-transitory computer-readable storage medium of claim 9, wherein the one or more programs further include instructions for:

while displaying the first affordance for selecting the accessory to receive wireless media, receiving user input corresponding to a selection of the first affordance for selecting the accessory to receive wireless media;

in response to receiving user input corresponding to the selection of the first affordance for selecting the accessory to receive wireless media:

connecting to the second electronic device; and while connected to the second electronic device, displaying an indication that the first electronic device is connected to the accessory.

13. The non-transitory computer-readable storage medium of claim 12, wherein the one or more programs further include instructions for:
- while connected to the second electronic device, transmitting media to the second electronic device for presentation via one or more output devices of the accessory; and
- while transmitting media to the second electronic device for presentation via one or more output devices of the accessory, displaying an indication of the media that is transmitting to the second electronic device for presentation via one or more output devices of the accessory.

14. The non-transitory computer-readable storage medium of claim 12, wherein the one or more programs further include instructions for:
- while transmitting media to the second electronic device for presentation via one or more output devices of the accessory, receiving a request to cease transmission of media; and
- in response to receiving the request to cease transmission of media:
  - ceasing transmission of the media the second electronic device that is connected to the accessory.

15. The non-transitory computer-readable storage medium of claim 9, wherein the one or more programs further include instructions for:
- while displaying the first affordance in accordance with the determination that the wireless connection to the accessory for receiving media via the wireless connection is available, receiving, via the one or more input devices, user input corresponding to selection of the first affordance; and
- in response to receiving the user input corresponding to selection of the first affordance, establishing the connection between the first electronic device and the second electronic device that is connected to the accessory, wherein establishing the connection between the first electronic device and the second electronic device that is connected to the accessory includes:
  - in accordance with a determination that the first electronic device satisfies a set of one or more authorization criteria, transmitting the wireless media to the second electronic device that is connected to the accessory; and
  - in accordance with a determination that the first electronic device does not satisfy the set of one or more authorization criteria, forgoing transmitting the wireless media to the second electronic device that is connected to the accessory.

16. The non-transitory computer-readable storage medium of claim 9, wherein
- the second electronic device includes an integrated input device, and
- the second electronic device is configured to transmit the wireless media, based on user input detected via the integrated input device, to the accessory independent of the connection between the first electronic device and the second electronic device.

17. A method comprising:
- at a first electronic device with a display device and one or more input devices:
  - receiving, via the one or more input devices, a request to display available wireless media receiver devices; and
  - in response to receiving the request, displaying, via the display device, a user interface for selecting a wireless media receiver for media from the first electronic device, including:
    - in accordance with a determination that a wireless connection to an accessory for receiving media via a wireless connection is available, displaying:
      - a first affordance for selecting the accessory to receive wireless media without displaying a second affordance for selecting a second electronic device that is connected to the accessory, wherein the first affordance for selecting the accessory to receive wireless media, when selected, establishes a connection between the first electronic device and the second electronic device that is connected to the accessory, and wherein the second electronic device is configured to transmit wireless media, based on user input detected via the second electronic device, to the accessory independent of the connection between the first electronic device and the second electronic device; and
      - a third affordance for selecting the first electronic device to output media; and
    - in accordance with a determination that a wireless connection to the accessory for receiving media via the wireless connection is not available:
      - displaying the third affordance; and
      - forgoing displaying the first affordance for selecting the accessory to receive wireless media, wherein the connection to the accessory for receiving media via the wireless connection is not available when no devices are connected to the accessory.

18. The method of claim 17, wherein the first affordance for selecting the accessory to receive wireless media includes an identifier that corresponds to the accessory.

19. The method of claim 18, wherein the request to display available media devices is a first request, the method further comprising:
- receiving, via the one or more input devices, a second request to display available wireless media receiver devices; and
- in response to receiving the second request, displaying, via the display device, a user interface for selecting a wireless media receiver for media from the first electronic device, including:
  - in accordance with a determination that a second wireless connection to an accessory for receiving media via a wireless connection is available, displaying the first affordance for selecting the accessory to receive wireless media,
    - wherein the first affordance for selecting the accessory to receive wireless media establishes a connection between the first electronic device and a third electronic device that is connected to the accessory, and
    - wherein the first affordance for selecting the accessory to receive wireless media includes the identifier that corresponds to the accessory; and
  - in accordance with a determination that a second wireless connection to the accessory for receiving media via the wireless connection is not available, forgoing displaying the first affordance for selecting the accessory to receive wireless media, wherein the connection to the accessory for receiving media via the wireless connection is not available when no devices are connected to the accessory.

20. The method of claim 17, further comprising:
while displaying the first affordance for selecting the accessory to receive wireless media, receiving user input corresponding to a selection of the first affordance for selecting the accessory to receive wireless media;
in response to receiving user input corresponding to the selection of the first affordance for selecting the accessory to receive wireless media:
   connecting to the second electronic device; and
while connected to the second electronic device, displaying an indication that the first electronic device is connected to the accessory.

21. The method of claim 20, further comprising:
while connected to the second electronic device, transmitting media to the second electronic device for presentation via one or more output devices of the accessory; and
while transmitting media to the second electronic device for presentation via one or more output devices of the accessory, displaying an indication of the media that is transmitting to the second electronic device for presentation via one or more output devices of the accessory.

22. The method of claim 20, further comprising:
while transmitting media to the second electronic device for presentation via one or more output devices of the accessory, receiving a request to cease transmission of media; and
in response to receiving the request to cease transmission of media:
   ceasing transmission of the media the second electronic device that is connected to the accessory.

23. The method of claim 17, further comprising:
while displaying the first affordance in accordance with the determination that the wireless connection to the accessory for receiving media via the wireless connection is available, receiving, via the one or more input devices, user input corresponding to selection of the first affordance; and
in response to receiving the user input corresponding to selection of the first affordance, establishing the connection between the first electronic device and the second electronic device that is connected to the accessory, wherein establishing the connection between the first electronic device and the second electronic device that is connected to the accessory includes:
   in accordance with a determination that the first electronic device satisfies a set of one or more authorization criteria, transmitting the wireless media to the second electronic device that is connected to the accessory; and
   in accordance with a determination that the first electronic device does not satisfy the set of one or more authorization criteria, forgoing transmitting the wireless media to the second electronic device that is connected to the accessory.

24. The method of claim 17, wherein:
the second electronic device includes an integrated input device, and
the second electronic device is configured to transmit the wireless media, based on user input detected via the integrated input device, to the accessory independent of the connection between the first electronic device and the second electronic device.

* * * * *